(12) United States Patent
Higuchi et al.

(10) Patent No.: US 10,343,409 B2
(45) Date of Patent: Jul. 9, 2019

(54) LIQUID JET APPARATUS, TANK UNIT, AND PRINTER

(71) Applicant: Seiko Epson Corporation, Tokyo (JP)

(72) Inventors: Tomoyuki Higuchi, Shiojiri (JP); Takaaki Ishikawa, London (GB); Hidenao Suzuki, Matsumoto (JP); Naomi Kimura, Okaya (JP); Koji Kawai, Shiojiri (JP); Shoma Kudo, Shiojiri (JP); Takanori Matsuda, Shiojiri (JP); Ekie Purnomo, Banten (ID); Muhamad Gigih Agung Pratomo, Jawa Barat (ID); Muhamad Auf, Jawa Barat (ID)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/580,490

(22) PCT Filed: Jun. 8, 2016

(86) PCT No.: PCT/JP2016/002787
§ 371 (c)(1),
(2) Date: Dec. 7, 2017

(87) PCT Pub. No.: WO2016/199420
PCT Pub. Date: Dec. 15, 2016

(65) Prior Publication Data
US 2018/0170064 A1  Jun. 21, 2018

(30) Foreign Application Priority Data

Jun. 9, 2015 (JP) .................................. 2015-116410
Dec. 24, 2015 (JP) .................................. 2015-251076

(Continued)

(51) Int. Cl.
*B41J 2/175* (2006.01)
*B41J 29/13* (2006.01)
(Continued)

(52) U.S. Cl.
CPC ............. *B41J 2/17509* (2013.01); *B41J 2/01* (2013.01); *B41J 2/175* (2013.01); *B41J 2/1752* (2013.01);
(Continued)

(58) Field of Classification Search
CPC . B41J 2/01; B41J 2/175; B41J 2/17509; B41J 2/1752; B41J 2/1754; B41J 2/17553;
(Continued)

(56) References Cited

U.S. PATENT DOCUMENTS 5,751,319 A    5/1998  Robertson et al.
7,008,051 B2 *  3/2006  Akermalm ........... B41J 2/17509
                                                            347/85

(Continued)

FOREIGN PATENT DOCUMENTS

CN    104228340 A    12/2014
CN    104723869 A    6/2015
(Continued)

OTHER PUBLICATIONS 4842-9814-'4.42a1.1 — All References Considered /Atv/.

*Primary Examiner* — Anh T Vo
(74) *Attorney, Agent, or Firm* — Foley & Lardner LLP

(57) ABSTRACT

In conventional liquid jet apparatuses, improvement in usability is desired. A liquid jet apparatus including a liquid jet head, a liquid container that can store liquid, a housing that covers the liquid jet head and the liquid container, and an operation unit can be operated by a user, a liquid injection port that enables liquid to be injected is formed in the liquid container, when the operation unit is viewed from the front, (Continued)

the first liquid container is arranged between the operation unit and one side wall of the housing, and the second liquid container is arranged between the other side wall opposite to the one side wall of the housing and the operation unit, the housing includes a first cover that covers at least a portion of the first liquid container, and a second cover that covers at least a portion of the second liquid container, and the first cover and the second cover are independently configured to be openable/closable relative to the housing.

15 Claims, 38 Drawing Sheets

(30) Foreign Application Priority Data

Dec. 24, 2015 (JP) .................................. 2015-251077
Feb. 29, 2016 (JP) .................................. 2016-036802

(51) Int. Cl.
  *B41J 2/01* (2006.01)
  *H04N 1/00* (2006.01)
  *H04N 1/04* (2006.01)

(52) U.S. Cl.
  CPC ......... *B41J 2/1754* (2013.01); *B41J 2/17553* (2013.01); *B41J 29/13* (2013.01); *H04N 1/00543* (2013.01); *H04N 1/04* (2013.01)

(58) Field of Classification Search
  CPC ..... B41J 13/103; B41J 29/13; H04N 1/00543; H04N 1/04
  See application file for complete search history.

(56) References Cited

U.S. PATENT DOCUMENTS

| | | | |
|---|---|---|---|
| 8,926,073 B2 * | 1/2015 | Shimizu | B41J 2/17523 347/85 |
| 9,067,419 B2 * | 6/2015 | Tanaka | B41J 2/175 |
| 9,079,413 B2 * | 7/2015 | Kudo | B41J 2/175 |
| 9,290,001 B2 | 3/2016 | Kudo et al. | |
| 9,381,748 B2 | 7/2016 | Kimura et al. | |
| 9,498,968 B2 | 11/2016 | Tanaka | |
| 9,555,639 B2 | 1/2017 | Suzuki et al. | |
| 9,586,408 B2 | 3/2017 | Kimura et al. | |
| 2013/0169720 A1 | 7/2013 | Nakamura et al. | |
| 2014/0043408 A1 | 2/2014 | Kudo et al. | |
| 2014/0043410 A1 | 2/2014 | Nakano et al. | |
| 2014/0104349 A1 | 4/2014 | Kimura et al. | |
| 2014/0292955 A1 | 10/2014 | Kimura et al. | |
| 2014/0362133 A1 | 12/2014 | Tanaka et al. | |
| 2015/0103121 A1 | 4/2015 | Ito | |
| 2015/0109378 A1 | 4/2015 | Koike et al. | |
| 2015/0109386 A1 | 4/2015 | Koike et al. | |
| 2015/0109396 A1 | 4/2015 | Kawamoto | |
| 2015/0174906 A1 | 6/2015 | Sakamoto et al. | |
| 2015/0210081 A1 | 7/2015 | Suzuki et al. | |
| 2015/0258800 A1 | 9/2015 | Tanaka et al. | |
| 2015/0306882 A1 | 10/2015 | Kudo et al. | |
| 2016/0159099 A1 | 6/2016 | Kudo et al. | |
| 2016/0193847 A1 | 7/2016 | Suzuki et al. | |
| 2016/0207320 A1 | 7/2016 | Tanaka | |
| 2016/0221348 A1 | 8/2016 | Nakamura et al. | |
| 2016/0303861 A1 | 10/2016 | Kimura et al. | |
| 2017/0190183 A1 | 7/2017 | Tanaka | |
| 2018/0257383 A1 | 9/2018 | Nakamura et al. | |

FOREIGN PATENT DOCUMENTS

| | | |
|---|---|---|
| CN | 204382811 U | 6/2015 |
| JP | H01-040885 | 2/1989 |
| JP | 2005-169750 A | 6/2005 |
| JP | 2007-237705 A | 9/2007 |
| JP | 2007-333884 A | 12/2007 |
| JP | 2013-226726 A | 11/2013 |
| JP | 2014-037058 A | 2/2014 |
| JP | 2014-079908 A | 5/2014 |
| JP | 2014-079909 A | 5/2014 |
| JP | 2014-079910 A | 5/2014 |
| JP | 2014-195908 A | 10/2014 |
| JP | 2015-051552 A | 3/2015 |
| JP | 2015-077708 A | 4/2015 |
| JP | 2015-080873 A | 4/2015 |
| JP | 2015-163462 A | 9/2015 |
| WO | WO 2013-085023 A1 | 6/2013 |
| WO | WO-2015/029405 A1 | 3/2015 |

\* cited by examiner

LIQUID JET APPARATUS, TANK UNIT, AND PRINTER

CROSS-REFERENCE TO RELATED APPLICATIONS

This application is a national phase entry of International Application No. PCT/JP2016/002787 filed Jun. 8, 2016; which claims priority to Japanese Appl. Nos. 2015-116410 filed Jun. 9, 2015, 2015-251077 filed Dec. 24, 2015, 2015-251076 filed Dec. 24, 2015, and 2016-036802 filed Feb. 29, 2016; the disclosures of all of which are incorporated by reference herein in their entirety.

TECHNICAL FIELD

The present invention relates to a liquid jet apparatus, a tank unit, a printer, and the like.

BACKGROUND ART

Conventionally, inkjet printers are known as an example of a liquid jet apparatus. Inkjet printers can print onto a printing medium such as printing paper by ejecting ink, which is an example of liquid, from an ejecting head onto the printing medium. In such inkjet printers, conventionally, a configuration is known in which ink contained in a tank that is an example of a liquid container is supplied to the ejecting head. This tank is provided with an ink injection port. The user can refill ink into the tank from the ink injection port (for example, see Patent Literature 1).

In addition, conventionally, in inkjet printers, a configuration is known in which ink is supplied from a tank unit to an ejecting head (e.g., Patent Literatures 2 and 3). Patent Literature 2 discloses a tank unit that has a tank with an injection portion, and a cover configured to be rotatable between a closed position at which the injection portion of the tank is covered and an open position at which the injection portion is exposed. This tank unit is installed along with and to the side of the inkjet printer. Also, the rotation axis of the cover is provided closer to a side portion of the inkjet printer.

CITATION LIST

Patent Literature

[Patent Literature 1] JP-A-2014-195908
[Patent Literature 2] CN-C-204382811
[Patent Literature 3] JP-A-2015-163462

SUMMARY OF INVENTION

Technical Problem

In the above Patent Literature 1, a description is given regarding a configuration in which the tank is stored inside the housing of the inkjet printer, and a configuration in which the tank is arranged on the outside of the housing of the inkjet printer. In the configuration in which the tank is stored in the housing of the inkjet printer, the tank is covered by the housing, and thus it is difficult to access the ink injection port of the tank when injecting ink into the tank, for example. Also, in the configuration in which the tank is stored in the housing of the inkjet printer, the tank is covered by the housing, and thus it is difficult to visually confirm the amount of ink stored in the tank, for example. As described above, as a first issue, there is demand for improvement in usability in conventional liquid jet apparatuses.

In addition, in the printer described in the above Patent Literature 2, a rotatable range when the cover of the tank unit is rotated from the closed position to the open position ends at a position at which the cover abuts against the printer. This is because, in the tank unit, even if the cover can make one complete rotation relative to the tank, the cover collides with the printer. In the printer described in the above Patent Literature 2, it is conceivable that, when the cover of the tank unit is rotated to the open position, a portion of the cover will overlap an upper portion of the injection portion of the tank. In such a state, the upper portion of the injection portion is blocked by the cover, which is likely to obstruct the injection of ink. As described above, as a second issue, there is room for further improvement in conventional printers.

Moreover, the following description is given as a third issue. In the printer described in the above Patent Literature 3, the tank unit is arranged along with and to the side of the inkjet printer. In this printer, the tank unit extends outward relative to the inkjet printer, causing unevenness in the appearance of the inkjet printer, and thus there is an issue in that when the inkjet printer is transported and the like, the inkjet printer is likely to collide with the surrounding environment, for example. In addition, in this printer, in order to increase the capacity of ink that can be stored in the tank unit, it is conceivable to expand the tank unit in the width direction (a direction from the inkjet printer toward the tank unit). The unevenness caused in the appearance of the inkjet printer then becomes even more significant. Also, if the tank unit is expanded in the width direction, the size of the printer is likely to increase.

Solution to Problem

The present invention solves at least one of the above-described issues, and can be realized as the following modes or application examples. The above first issue can be solved by the following application examples 1 to 11. Also, the above second issue can be solved by the following application examples 12 to 15. Moreover, the above third issue can be solved by the following application examples 16 to 23. Additionally, the above second issue can also be solved by the following application examples 24 to 34.

Advantageous Effects of Invention

Application Example 1

A liquid jet apparatus including: a liquid jet head capable of ejecting a liquid; a liquid container that can store the liquid to be supplied to the liquid jet head; a housing that covers the liquid jet head and the liquid container; and an operation unit that is arranged on the outside of the housing, and can be operated by a user, wherein a liquid injection port that enables the liquid to be injected into the liquid container is formed in the liquid container, when the operation unit is viewed from front, a first liquid container is arranged between the operation unit and one side wall of the housing, and a second liquid container is arranged between the other side wall opposite to the one side wall of the housing and the operation unit, the housing includes a first cover that covers at least a portion of the first liquid container, and a second cover that covers at least a portion of the second liquid container, and the first cover and the second cover are independently configured to be openable/closable relative to the housing.

In this liquid jet apparatus, the first cover and the second cover are configured to be openable/closable, and thus the first liquid container can be exposed by opening the first cover, and the second liquid container can be exposed by opening the second cover. Therefore, the liquid injection port of the first liquid container and the liquid injection port of the second liquid container are easily accessed by opening the first cover and the second cover, respectively. As a result, it is easier to inject a liquid into the first liquid container and the second liquid container. This improves the usability of the liquid jet apparatus.

Application Example 2

The above-described liquid jet apparatus, in which at least a portion of a region of the housing overlapping the first liquid container and at least a portion of a region overlapping the second liquid container transmit light.

In this liquid jet apparatus, the first liquid container is visually confirmed with ease through the light-transmissive portion of the region of the housing overlapping the first liquid container. Also, the second liquid container is visually confirmed with ease through the light-transmissive portion of the region of the housing overlapping the second liquid container. Therefore, the amount of liquid stored in the first liquid container is visually confirmed with ease through the light-transmissive portion of the region of the housing overlapping the first liquid container. Also, the amount of liquid stored in the second liquid container is visually confirmed with ease through the light-transmissive portion of the region of the housing overlapping the second liquid container. This improves the usability of the liquid jet apparatus.

Application Example 3

The above-described liquid jet apparatus, in which, in an orientation when the liquid jet apparatus is used, an end face of the liquid injection port is directed in a direction intersecting a vertical direction.

In this liquid jet apparatus, in the orientation where the liquid jet apparatus is used, the end face of the liquid injection port is directed in a direction intersecting the vertical direction, and thus foreign substances are unlikely to adhere to the end face of the liquid injection port.

Application Example 4

A liquid jet apparatus including: a liquid jet head capable of ejecting a liquid; a liquid container that can store the liquid to be supplied to the liquid jet head; a housing that covers the liquid jet head and the liquid container; and an operation unit that is arranged on the outside of the housing, and can be operated by a user, wherein a liquid injection port that enables the liquid to be injected into the liquid container is formed in the liquid container, the liquid container is arranged between the operation unit and a side wall of the housing when the operation unit is viewed from front, the housing has a cover that covers at least a portion of the liquid container, the cover is configured to be openable/closable relative to the housing, and an outer face of the cover and an outer face of the operation unit are positioned in the same plane.

In this liquid jet apparatus, the outer face of the cover and the outer face of the operation unit are positioned in the same plane, and thus the appearance of the liquid jet apparatus is unlikely to be uneven. Therefore, when the liquid jet apparatus is transported and the like, the liquid jet apparatus is unlikely to collide with the surrounding environment. This makes it easier to transport the liquid jet apparatus, and thus the usability of the liquid jet apparatus is improved.

Application Example 5

A liquid jet apparatus including: a liquid jet head capable of ejecting a liquid; a liquid container that can store the liquid to be supplied to the liquid jet head; and a housing that covers the liquid jet head and the liquid container, wherein a liquid injection port that enables the liquid to be injected into the liquid container is formed in the liquid container, and the housing collectively covers the liquid jet head and the liquid container.

In this liquid jet apparatus, the housing collectively covers the liquid jet head and the liquid container. According to this configuration, the liquid jet head and the liquid container can be collectively covered by the housing by mounting the housing, and thus handling is easy. For example, when performing maintenance, failures such as not being able to remove the liquid container from the housing if the housing that covers the liquid jet head has not been removed are few, and the usability is improved. Also, the liquid jet head and the liquid container can be collectively covered by the housing, and thus the assemblability is easily improved.

Application Example 6

A liquid jet apparatus including: a liquid jet head capable of ejecting a liquid; a liquid container that can store the liquid to be supplied to the liquid jet head; and a housing that covers the liquid jet head and the liquid container, wherein a liquid injection port that enables the liquid to be injected into the liquid container is formed in the liquid container, and from a region in which at least a portion of the liquid container overlaps an upper face of the housing in a state where the upper face is seen in a planar view to a region in which the liquid jet head overlaps the upper face in the state where the upper face is seen in a planar view, the upper face is positioned in a plane.

In this liquid jet apparatus, from the region in which at least a portion of the liquid container overlaps the upper face to the region in which the liquid jet head overlaps the upper face, the upper face is positioned in a plane, and thus the appearance of the liquid jet apparatus is unlikely to be uneven. Therefore, when the liquid jet apparatus is transported and the like, the liquid jet apparatus is unlikely to collide with the surrounding environment.

Application Example 7

A liquid jet apparatus including: a liquid jet head capable of ejecting a liquid; a liquid container that can store the liquid to be supplied to the liquid jet head; a housing that covers the liquid jet head and the liquid container; and an operation unit that is arranged on the outside of the housing, and can be operated by a user operation, wherein a liquid injection port that enables the liquid to be injected into the liquid container is formed in the liquid container, the operation unit is provided on a front face of the housing, and the front face of the housing and an outer face of the operation unit are positioned in the same plane.

In this liquid jet apparatus, the front face of the housing and the outer face of the operation unit are positioned in the same plane, and thus the appearance of the liquid jet apparatus is unlikely to be uneven. Therefore, when the liquid jet apparatus is transported and the like, the liquid jet apparatus is unlikely to collide with the surrounding environment. This makes it easier to transport the liquid jet apparatus, and thus the usability of the liquid jet apparatus is improved.

Application Example 8

The above-described liquid jet apparatus, in which at least a portion of a region of the housing overlapping the liquid container transmits light.

In this liquid jet apparatus, the liquid container is visually confirmed with ease through the light-transmissive portion in the region of the housing overlapping the liquid container. Therefore, the amount of liquid stored in the liquid container is visually confirmed with ease through the light-transmissive portion in the region of the housing overlapping the liquid container.

Application Example 9

The above-described liquid jet apparatus, in which, when the liquid jet apparatus is viewed from front, the liquid container is arranged between the liquid jet head and one side wall of the housing, and the light-transmissive portion of the housing is provided in the side wall of the housing.

In this liquid jet apparatus, the liquid container is visually confirmed with ease through the light-transmissive portion in the side wall of the housing. Therefore, the amount of liquid stored in the liquid container is visually confirmed with ease through the light-transmissive portion in the side wall of the housing.

Application Example 10

The above-described liquid jet apparatus, in which in an orientation when the liquid jet apparatus is used, an end face of the liquid injection port is directed in a direction intersecting a vertical direction.

In this liquid jet apparatus, in the orientation when the liquid jet apparatus is used, the end face of the liquid injection port is directed in a direction intersecting the vertical direction, and thus foreign substances are unlikely to adhere to the end face of the liquid injection port.

Application Example 11

A liquid jet apparatus including: a liquid jet head capable of ejecting a liquid; a liquid container that can store the liquid to be supplied to the liquid jet head; and a display unit that can display information, wherein a liquid injection port that enables the liquid to be injected into the liquid container is formed in the liquid container, and the information includes information indicating a horizontal state.

In this liquid jet apparatus, liquid can be injected from the liquid injection port into the liquid container. At this time, if the horizontal state of the liquid jet apparatus is shifted, it becomes difficult to accurately recognize the amount of the liquid in the liquid container. For this, in the above-described liquid jet apparatus, the horizontal state can be checked based on the information displayed on the display unit. This makes it easy to accurately recognize the amount of the liquid in the liquid container, and thus the usability of the liquid jet apparatus is improved.

Application Example 12

A tank unit that can be arranged along with and to a side of a printing unit of a printer including the printing unit provided with a printing head capable of ejecting ink, and a scanner unit that includes a document placing face positioned above the printing unit, and that can read out an image drawn on a document placed on the document placing face, the tank unit including: a tank that can store the ink to be supplied to the printing head; and a housing that covers the tank, wherein the tank has an injection portion that enables the ink to be injected, the housing includes a main body that covers a portion of the tank excluding the injection portion, a cover that openably/closably rotates relative to the main body, and in a state of being closed relative to the main body, covers the injection portion, and a hinge unit that rotatably couples the main body and the cover, and when an orientation when the printer is used is assumed to be an in-use orientation of the printer, a rotation axis of the hinge unit is positioned at substantially the same height as the document placing face or higher than the document placing face in the in-use orientation.

In this tank unit, the rotation axis of the hinge unit that rotatably couples the main body and the cover of the housing is positioned at substantially the same height as the document placing face of the scanner unit or above the document placing face. According to this configuration, it is possible to make it easier to widen the rotatable range when the cover is open relative to the main body. Accordingly, it is possible to make it easier to avoid the cover overlapping the injection portion of the tank when the cover of the tank unit is rotated to an open position, and to thus make it easier to inject ink into the injection portion.

Application Example 13

A tank unit that can be arranged along with and to a side of a printing unit provided with a printing head capable of ejecting ink, the tank unit including: a tank that can store the ink to be supplied to the printing head; and a housing that covers the tank, wherein the tank has an injection portion that enables the ink to be injected, the housing includes a main body that covers a portion of the tank excluding the injection portion, a cover that openably/closably rotates relative to the main body, and in a state of being closed relative to the main body, covers the liquid injection portion, and a hinge unit that rotatably couples the main body and the cover, and when the tank unit is viewed from a direction along a rotation axis of the hinge unit, assuming a direction from the side of the printing unit toward the tank unit to be a first direction, in a state where the cover is closed relative to the main body, a distance along the first direction from an end portion on the printing unit side of the housing to the hinge unit is at least half a width dimension along the first direction of the tank unit.

In this tank unit, when viewed from the direction along the rotation axis of the hinge unit, in the state where the cover is closed relative to the main body, the distance along the first direction from the end portion on the printing unit side of the housing to the hinge unit is at least half the width dimension along the first direction of the tank unit. According to this configuration, it is possible to make it easier to widen the rotatable range when the cover is open relative to the main body. Accordingly, it is possible to make it easier to avoid the cover overlapping the injection portion of the tank when the cover of the tank unit is rotated to the open position, and thus it is possible to make it easier to inject ink into the injection portion.

Application Example 14

The above-described tank unit, in which a handle portion is provided in a portion of the cover facing in the same direction as a direction in which a front face of the printing unit is directed.

In this tank unit, the handle portion is provided in the cover, and thus the cover can be opened/closed by placing a hand finger on the handle portion.

Application Example 15

A printer including: a printing unit provided with a printing head capable of ejecting ink; a scanner unit that includes a document placing face positioned above the printing unit, and that can read out an image drawn on a document placed on the document placing face; and the above-described tank unit.

In this printer, when the cover of the tank unit is rotated to the open position, it is possible to make it easier to avoid the cover overlapping the injection portion of the tank, and thus it is possible to make it easier to inject ink into the injection portion.

Application Example 16

A printer including: a printing unit provided with a printing head capable of ejecting ink onto paper and a paper discharge unit for discharging the paper printed by the printing head; a scanner unit that is arranged above the printing unit, and can read out an image drawn on a document; and a tank unit that is arranged along with and to a side of the printing unit, wherein the tank unit includes a tank that can store the ink to be supplied to the printing head and a housing that covers the tank, the housing at least has a front face, side faces, a back face, and an upper face, and when a face on the paper discharge unit side is assumed to be the front face, a front face of the printing unit and a front face of the tank unit are positioned in the same plane.

In this printer, the front face of the printing unit and the front face of the tank unit are positioned in the same plane. According to this configuration, unevenness in the appearance of the printer can be reduced, and thus, when the printer is transported and the like, it is possible to make it less likely that the printer will collide with the surrounding environment.

Application Example 17

A printer including: a printing unit provided with a printing head capable of ejecting ink onto paper and a paper discharge unit for discharging the paper printed by the printing head; a scanner unit that is arranged above the printing unit, and can read out an image drawn on a document; and a tank unit arranged along with and to a side of the printing unit, wherein the tank unit includes a tank that can store the ink to be supplied to the printing head and a housing that covers the tank, the housing at least has a front face, side faces, a back face, and an upper face, and when a face on the paper discharge unit side is assumed to be the front face, a back face of the printing unit and a back face of the tank unit are positioned in the same plane.

In this printer, the back face of the printing unit and the back face of the tank unit are positioned in the same plane. According to this configuration, unevenness in the appearance of the printer can be reduced, and thus, when the printer is transported and the like, it is possible to make it less likely that the printer will collide with the surrounding environment.

Application Example 18

A printer including: a printing unit provided with a printing head capable of ejecting ink; a scanner unit that is arranged above the printing unit, and can read out an image drawn on a document; and a tank unit arranged along with and to a side of the printing unit, wherein the tank unit includes a tank that can store the ink to be supplied to the printing head, and a housing that covers the tank, the housing at least has a front face, side faces, a back face, and an upper face, and in an in-use orientation that is an orientation when the printing unit is used, an upper face of the tank unit is positioned above the printing unit.

In this printer, in the in-use orientation, the upper face of the tank unit is positioned above the printing unit. According to this configuration, unevenness in the appearance of the printer can be reduced, and thus, when the printer is transported and the like, it is possible to make it less likely that the printer will collide with the surrounding environment. In addition, in this printer, it is possible to increase the capacity of ink that can be stored in the tank unit by expanding the tank unit upward. This makes it easier to reduce lateral enlargement of the printer 1.

Application Example 19

The above-described printer, in which the scanner unit has a document placing face on which the document can be placed, and in the in-use orientation, the upper face of the tank unit is positioned at substantially the same height as the document placing face.

Application Example 20

The above-described printer, in which a supply port capable of supplying a medium onto which printing is performed and a lid that blocks the supply port are provided on an upper face of the printing unit, and in the in-use orientation, the upper face of the tank unit is positioned at substantially the same height as the lid.

Application Example 21

The above-described printer, in which the tank has an injection portion that enables the ink to be injected.

In this printer, ink can be injected into the tank via the injection portion.

Application Example 22

The above-described printer, in which the housing includes a main body that covers a portion of the tank excluding the injection portion, and a cover that openably/closably rotates relative to the main body, and exposes the injection portion in a state of being open relative to the main body.

In this printer, the injection portion can be accessed by exposing the injection portion in the state where the cover is open relative to the main body.

Application Example 23

The above-described printer, in which the tank unit is fixed to the printing unit using a screw.

Application Example 24

A tank unit that can be arranged along with and to a side of a printing unit of a printer that includes the printing unit provided with a printing head capable of ejecting ink, the tank unit including: a tank that can store the ink to be supplied to the printing head; and a housing that covers the tank, wherein the tank has an injection portion that enables the ink to be injected, the housing includes a main body that covers a portion of the tank excluding the injection portion, a cover that openably/closably rotates relative to the main body, and in a state of being closed relative to the main body, covers the injection portion, and a hinge unit that rotatably couples the main body and the cover, the cover is configured to be rotatable between a closed position at which the injection portion is covered and an open position at which the injection portion is exposed, when the tank unit is viewed in an axial direction of a rotation axis of the hinge unit, when a direction intersecting the axial direction that is a direction from the side of the printing unit toward the tank unit is assumed to be a first direction, in a state where the cover is at the closed position, a distance along the first direction from an end portion on the printing unit side of the housing to the hinge unit is at least half a width dimension along the first direction of the tank unit, and the cover has a wall portion that is displaced to a position at which the cover rotated at an angle of 180° or an angle exceeding 180° using the rotation axis as a rotation center when the cover is changed from the closed position to the open position.

In this tank unit, when the cover is changed from the closed position to the open position, the wall portion of the cover displaces to the position at which the cover is rotated to the angle of 180° or an angle exceeding 180°. Therefore, at least an angle of 180° can be realized as the rotation angle of the cover. Furthermore, in this tank unit, in the state where the cover is closed relative to the main body, a distance along the first direction from the end portion on the printing unit side of the housing to the hinge unit is at least half the width dimension along the first direction of the tank unit. Therefore, in a state of being rotated at the rotation angle of 180° from the state where the cover is closed, when the tank unit is viewed vertically downward, the region occupied by the cover is easily included in the region of the tank unit. Accordingly, in the state where the cover is open relative to the main body, it is easy to avoid the cover hitting the printing unit. As a result, it is possible to make it easier to widen the rotatable range when the cover is open relative to the main body. Accordingly, it is possible to make it easier to avoid the cover overlapping the injection portion of the tank when the cover of the tank unit is open relative to main body, and thus it is possible to make it easier to inject ink into the injection portion.

Application Example 25

The above-described tank unit, in which the wall portion has a first outer wall face extending in the first direction in the state where the cover is at the closed position, when viewed in the axis direction.

In this tank unit, when the cover of the tank unit is open relative to the main body, it is possible to make it easier to avoid the cover overlapping the injection portion of the tank, and thus it is possible to make it easier to inject ink into the injection portion.

Application Example 26

The above-described tank unit, in which when an orientation when the printer is used is assumed to be an in-use orientation of the printer, in the in-use orientation, in the state where the cover is at the closed position, the first outer wall face extends in a horizontal direction.

In this tank unit, when the cover is rotated from the closed position to the open position, the first outer wall face extends in the horizontal direction. Therefore, when the cover is rotated from the closed position to the open position, the position of the cover is likely to stay at the open position.

Application Example 27

The above-described tank unit, in which the main body has a second outer wall face extending in the first direction when viewed in the axis direction.

In this tank unit, when the cover is rotated from the closed position to the open position, the first outer wall face opposes the second outer wall face. At this time, the first outer wall face and the second outer wall face extend in the same direction, and thus the position of the first outer wall face can be restricted by the second outer wall face in a stable manner.

Application Example 28

The above-described tank unit, in which, when an orientation when the printer is used is assumed to be an in-use orientation of the printer, in the in-use orientation, the cover further has a third outer face that intersects the first outer wall face and extends in a vertical downward direction in the state where the cover is at the closed position, when viewed in the axis direction.

In this tank unit, when the cover is at the open position, it possible to make it easier to avoid the cover overlapping the injection portion of the tank, and thus it is possible to make it easier to inject ink into the injection portion.

Application Example 29

The above-described tank unit, in which when the orientation when the printer is used is assumed to be the in-use orientation of the printer, in the in-use orientation, in a state where the cover is at the open position, when viewed in the axis direction, a centroid of the cover is positioned in an opposite direction to the first direction relative to the rotation axis.

In this tank unit, the centroid of the cover is positioned in the opposite direction to the first direction relative to the rotation axis, and thus when the cover is rotated from the closed position to the open position, the position of the cover is likely to stay at the open position.

Application Example 30

The above-described tank unit, in which the tank unit includes a holding portion for holding the cover at the open position.

In this tank unit, the holding portion for holding the cover at the open position is provided, and thus when the cover is rotated from the closed position to the open position, the position of the cover is likely to stay at the open position.

Application Example 31

The above-described tank unit, in which the tank unit includes a second hinge unit positioned in the first direction of the hinge unit in a state where the cover is at the closed position in the in-use orientation.

In this tank unit, the cover can be rotated via a plurality of hinge units.

Application Example 32

The above-described tank unit, in which the cover is configured to be foldable into an accordion shape.

In this tank unit, the cover is foldable into an accordion shape, and thus a space occupied by the cover can be reduced.

Application Example 33

The above-described tank unit, in which when viewed in the axis direction, at least a portion of the injection portion is positioned in the first direction relative to the rotation axis.

In this tank unit, in the state where the cover is at the open position, it is possible to make it easier to avoid the cover overlapping the injection portion of the tank from above, and thus it is possible to make it easier to inject ink into the injection portion.

Application Example 34

A printer including: a printing unit provided with a printing head capable of ejecting ink; and the above-described tank unit.

In this printer, it is possible to make it easier to avoid the cover overlapping the injection portion of the tank from above in a state where the cover of the tank unit is open relative to the main body, and thus it is possible to make it easier to inject ink into the injection portion.

DESCRIPTION OF EMBODIMENTS

Figure 1:
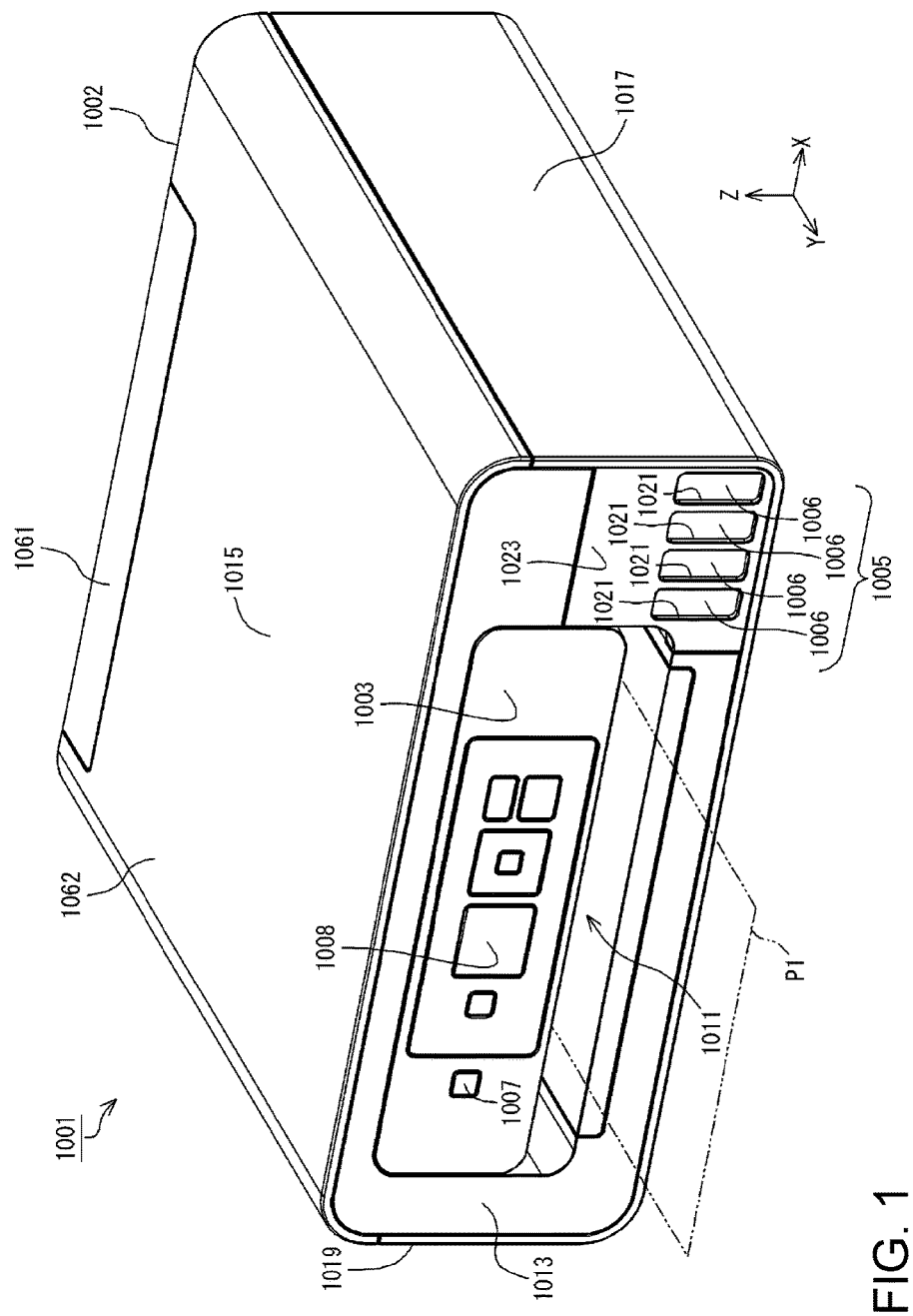
FIG. 1 is a perspective diagram showing the appearance of a liquid jet apparatus in a first embodiment.

Embodiments will be described with reference to the drawings by way of example of an inkjet printer (hereinafter, referred to as a printer), which is an example of a liquid jet apparatus. Note that in the drawings, the scales of the constituent elements and members may have been changed so as to be of a size at which the constituent elements can be recognized.

First Embodiment

As shown in FIG. 1, a printer 1001 in this embodiment has a housing 1002. The housing 1002 constitutes the outer shell of the printer 1001. The printer 1001 also has tanks 1006, an operation panel 1003, and a tank unit 1005. In this embodiment, the tank unit 1005 includes four tanks 1006. Note that the number of tanks 1006 in the tank unit 1005 is not limited to four, and a number smaller than four or a number greater than four can also be adopted.

The tank unit 1005 is stored inside the housing 1002. Specifically, the four tanks 1006 of the tank unit 1005 are covered by the housing 1002. The operation panel 1003 is arranged on the outside of the housing 1002. The operation panel 1003 includes a power supply button 1007, a display panel 1008 that is an example of a display unit, and the like. Note that as the display panel 1008, for example, a panel to which a user can perform input such as a touch panel can be adopted. As described above, the operation panel 1003 is an example of an operation unit that can be operated by the user. The tank 1006 is an example of a liquid container. The printer 1001 can print on a recording medium P1 such as recording paper using ink that is an example of liquid.

Note that X, Y, and Z axes that are coordinate axes orthogonal to each other are given in FIG. 1. The X, Y, and Z axes are also given in the drawings shown after this as necessary. In this embodiment, the state where the printer 1001 is arranged on a horizontal plane (an XY plane) defined by the X axis and the Y axis, is the in-use state of the printer 1001. The orientation of the printer 1001 when the printer 1001 is arranged on the XY plane is called the in-use orientation of the printer 1001. The Z axis is an axis orthogonal to the horizontal plane. In the in-use state of the printer 1001, a Z axis direction is the vertical upward direction. In addition, in the in-use state of the printer 1001, in FIG. 1, a −Z axis direction is the vertical downward direction. Note that regarding each of the X, Y, and Z axes, the direction of the arrow indicates a +(positive) direction, and the opposite direction to the direction of the arrow indicates a − (negative) direction.

The printer 1001 is provided with a paper discharge portion 1011. In the printer 1001, the recording medium P1 is discharged from the paper discharge portion 1011. In the printer 1001, a face in which the paper discharge portion 1011 is provided is assumed to be a front face 1013. In this embodiment, the front face 1013 of the printer 1001 is also the front face 1013 of the housing 1002. The housing 1002 has an upper face 1015 intersecting the front face 1013 and a side wall 1017 intersecting the front face 1013 and the upper face 1015. When the front face 1013 is viewed from the front, or in other words, when the front face 1013 is viewed in a −Y axis direction, the side wall 1017 is positioned in an X axis direction of the front face 1013. Note that the housing 1002 has a side wall 1019 intersecting the front face 1013 and the upper face 1015, and positioned in a −X axis direction of the side wall 1017 with the front face 1013 therebetween.

The operation panel 1003 is arranged on the front face 1013 of the printer 1001. The operation panel 1003 is provided on the outside of the housing 1002. The outer face of the operation panel 1003 is directed in a Y axis direction. When the operation panel 1003 is viewed from the front, or in other words when the operation panel 1003 is viewed in the −Y axis direction, the tank unit 1005 is positioned between the operation panel 1003 and the side wall 1017. From another viewpoint, when the printer 1001 is viewed from the front, or in other words, when the printer 1001 is viewed in the −Y axis direction, the tank unit 1005 is positioned between the paper discharge portion 1011 and the side wall 1017.

The front face 1013 of the housing 1002 is provided with window portions 1021. When the operation panel 1003 is viewed from the front, or in other words, when the operation panel 1003 is viewed in the −Y axis direction, the window portions 1021 are positioned between the operation panel 1003 and the side wall 1017. In this embodiment, the window portions 1021 are respectively provided for the tanks 1006. When the operation panel 1003 is viewed from the front, or in other words, when the operation panel 1003 is viewed in the −Y axis direction, the window portions 1021 are provided at positions overlapping the tanks 1006. In this embodiment, the window portions 1021 are directed in the Y axis direction.

The window portions 1021 transmit light. Therefore, the user can visually check the four tanks 1006 via the window portions 1021. In this embodiment, the window portions 1021 are constituted by a light-transmissive member. The user can visually check the four tanks 1006 via the window portions 1021 constituted by light-transmissive members. Note that it suffices for the window portions 1021 to transmit light, and may or may not be transparent. In addition, the window portion 1021 is not limited to a light-transmissive member, and may be constituted by an opening formed in the housing 1002, for example.

In this embodiment, at least a portion of the section of each of the tanks 1006 facing the window portion 1021 transmits light. Ink in each of the tanks 1006 can be visually confirmed from the light-transmissive section of the tank 1006. Therefore, the user can visually confirm the amounts of ink in the tanks 1006 by visually checking the four tanks 1006 via the window portions 1021. Accordingly, in the tank 1006, at least a portion of the section facing the window portion 1021 can be used as a visual checking portion that enables visual confirmation of the amount of ink.

The housing 1002 has a cover 1023. The cover 1023 constitutes a portion of the housing 1002. When the operation panel 1003 is viewed from the front, or in other words, when the operation panel 1003 is viewed in the −Y axis direction, the cover 1023 is positioned between the operation panel 1003 and the side wall 1017. When the operation panel 1003 is viewed from the front, or in other words, when the operation panel 1003 is viewed in the −Y axis direction, the cover 1023 is provided at a position overlapping the tank unit 1005. Note that positions between the operation panel 1003 and the side wall 1019 when the operation panel 1003 is viewed from the front can also be adopted as the position of the tank unit 1005 and the position of the cover 1023 in the printer 1001.

The cover 1023 is arranged on the front face 1013 of the printer 1001. The outer face of the cover 1023 is directed in the Y axis direction. As described above, the outer face of the operation panel 1003 is also directed in the Y axis direction. In this embodiment, the outer face of the cover 1023 and the outer face of the operation panel 1003 are positioned in the same plane. In other words, in the in-use orientation of the printer 1001, the position in the Y axis direction of the outer face of the cover 1023 and the position of in the Y axis direction of the outer face of the operation panel 1003 are the same. Therefore, the outer face of the cover 1023 and the outer face of the operation panel 1003 are positioned in the same plane, and thus the appearance of the printer 1001 is unlikely to be uneven. Therefore, when the printer 1001 is transported and the like, the printer 1001 is unlikely to come into contact with, be caught on, or collide with articles, structures and the like arranged in the surrounding environment. Note that being positioned in a plane is not limited to coinciding with being in a complete plane, and also includes being positioned on a plane including unevenness due to an error, tolerance, and the like, and a step of a joint between constituent parts and the like.

In addition, in this embodiment, the outer face of the front face 1013 of the housing 1002 is also directed in the Y axis direction. In this embodiment, the outer face of the front face 1013 of the housing 1002 and the outer face of the operation panel 1003 are positioned in the same plane. In other words, in the in-use orientation of the printer 1001, the position in the Y axis direction of the outer face of the front face 1013 of the housing 1002 and the position in the Y axis direction of the outer face of the operation panel 1003 are the same. Therefore, the outer face of the front face 1013 of the housing 1002 and the outer face of the operation panel 1003 are positioned in the same plane, and thus the appearance of the printer 1001 is unlikely to be uneven. Therefore, when the printer 1001 is transported and the like, the printer 1001 is unlikely to come into contact with, be caught on, or collide with articles, structures and the like arranged in the surrounding environment. Note that being positioned in a plane is not limited to coinciding with being in a complete plane, and also includes being positioned in a plane including unevenness due to an error, tolerance, and the like, and a step of a joint between constituent parts and the like.

Note that a structure can also be adopted in which the inclination of the operation panel 1003 can be adjusted (also referred to as tilt adjustment). If the inclination of the operation panel 1003 can be adjusted, the user can view and operate the operation panel 1003 at a desired inclination, and thus is highly convenient. In a configuration in which the inclination of the operation panel 1003 can be adjusted, in the state where the operation panel 1003 is closed, or in other words, in the state where the outer face of the operation panel 1003 intersects the XY plane, the outer face of the cover 1023 and the outer face of the operation panel 1003 are positioned in the same plane.

The cover 1023 covers at least a portion of the tanks 1006. The cover 1023 is configured to be openable/closable relative to the housing 1002. When the cover 1023 is open relative to the housing 1002, a portion of each of the tanks 1006 is exposed. In the state where the cover 1023 is open relative to the housing 1002, the user can inject ink into the tanks 1006. Note that in this embodiment, the window portions 1021 are provided in the cover 1023.

Figure 2:
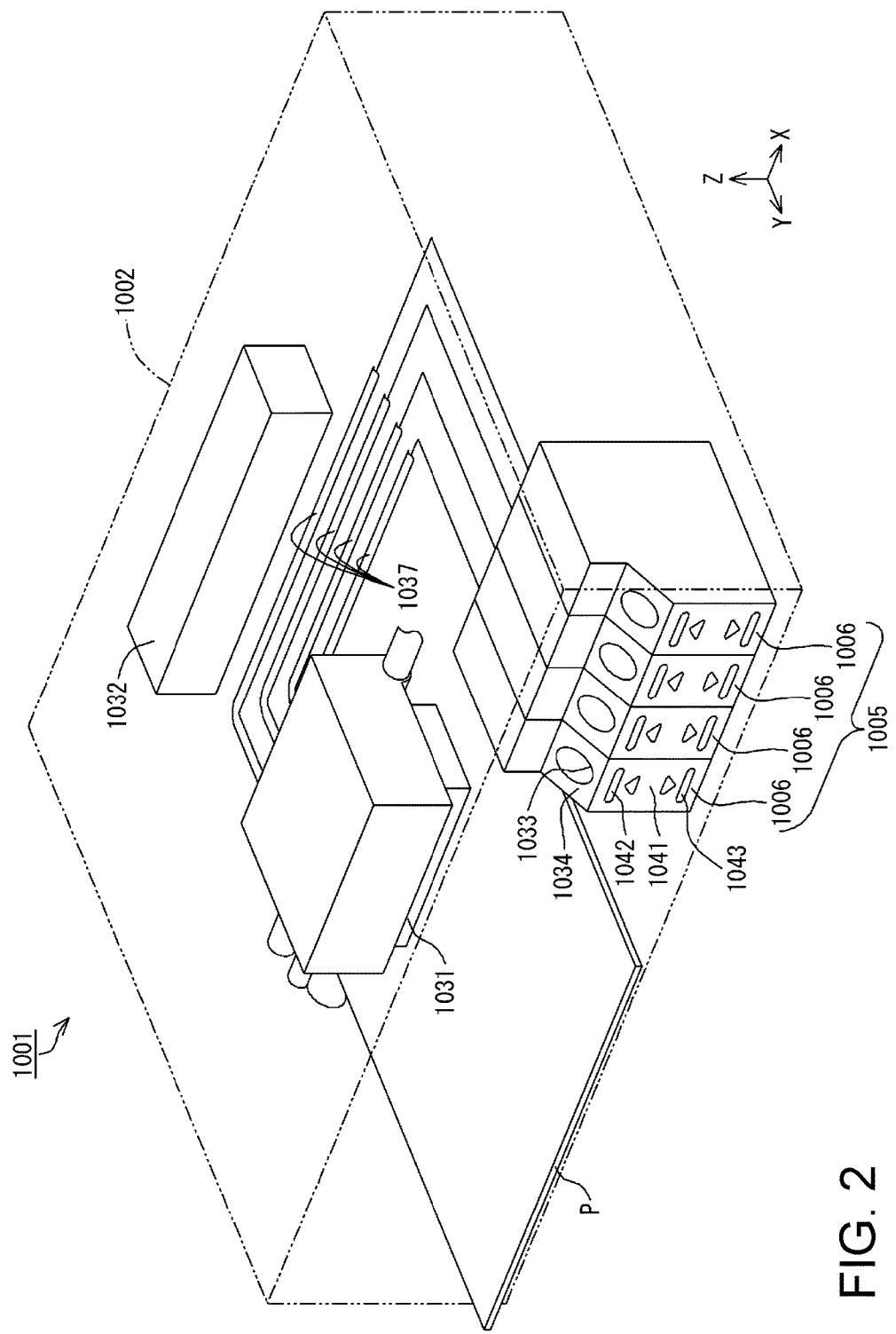
FIG. 2 is a perspective diagram showing a main configuration of the liquid jet apparatus in the first embodiment.

As shown in FIG. 2, the printer 1001 has a recording head 1031 and a control unit 1032. In the printer 1001, the recording head 1031 and the control unit 1032 are stored in the housing 1002. Therefore, in this embodiment, the recording head 1031 and the tank unit 1005 are stored in the same the housing 1002. Accordingly, the housing 1002 collectively covers the recording head 1031 and the tank unit 1005. Here, in a configuration in which the tank unit 1005 is arranged outside the housing 1002, mounting of the housing 1002 to the printer 1001 and mounting of the tank unit 1005 to the housing 1002 are separate processes, and thus the assemblability is likely to decrease. For this, in this embodiment, a configuration is adopted in which the housing 1002 collectively covers the recording head 1031 and the tank unit 1005, and thus by mounting the housing 1002, the recording head 1031 and the tank unit 1005 can be collectively covered by the housing 1002, and thus the assemblability is easily improved.

The recording head 1031 is an example of a liquid jet head, and performs recording on the recording medium P1 by discharging ink as ink droplets. The recording head 1031 performs recording on the recording medium P1 that is conveyed in the Y axis direction by a conveyance apparatus (not illustrated), using ink that is an example of liquid. Note that the conveyance apparatus (not illustrated) intermittently conveys the recording medium P1 such as recording paper in the Y axis direction. The recording head 1031 is configured to be movable reciprocally along the X axis by a movement apparatus (not illustrated). The control unit 1032 controls driving of the above-described constituent elements. Note that in this embodiment, the four tanks 1006 are aligned along the X axis.

Here, a direction along the X axis is not limited to the direction completely parallel to the X axis, and also includes directions inclined due to an error, tolerance, and the like, excluding directions orthogonal to the X axis. Similarly, a direction along the Y axis is not limited to the direction completely parallel to the Y axis, and also includes directions inclined due to an error, tolerance and the like, excluding directions orthogonal to the Y axis. A direction along the Z axis is not limited to the direction completely parallel to the Z axis, and also includes directions inclined due to an error, tolerance and the like, excluding directions orthogonal to the Z axis. Accordingly, a direction along any axis or face is not limited to the direction completely parallel to such axis or face, and includes directions inclined due to an error, tolerance and the like, excluding directions orthogonal to such axis or face.

In this embodiment, a plurality of tanks 1006 are configured separately from each other. However, the configuration of the tank 1006 that is an example of a liquid container is not limited thereto. As the configuration of the liquid container, a configuration can also be adopted in which a plurality of tanks 1006 are integrated as one liquid container. In this case, one liquid container is provided with a plurality of liquid storage portions. The plurality of liquid storage portions are partitioned individually from each other, and configured to be able to store liquid of different types. In this case, for example, ink of different colors can be individually stored in the plurality of liquid storage portions.

Ink that is an example of liquid is stored in the tanks 1006. A liquid injection port 1033 is formed in each tank 1006. In the tanks 1006, ink can be injected from outside the tank 1006 into the tank 1006 via the liquid injection port 1033. Note that a configuration can also be adopted in which the liquid injection port 1033 is sealed with a cap (not illustrated). The user can remove the cap, open the liquid injection port 1033, and then inject ink, when injecting ink into the tank 1006.

In this embodiment, the liquid injection port 1033 is configured as an opening formed in an outer shape face 1034 constituting the outer shape of the tank 1006. Additionally, in this embodiment, in the in-use orientation of the printer 1001, the outer shape face 1034 is inclined. The outer shape face 1034 is inclined in the direction toward the −Y axis direction from the −Z axis direction toward the Z axis direction. Therefore, the outer shape face 1034 is directed in a direction intersecting the vertical direction. The outer shape face 1034 is an example of the end face of the liquid injection port 1033. If the outer shape face 1034 is directed in a direction intersecting the vertical direction, foreign substances such as dust are unlikely to be collected on the outer shape face 1034. Therefore, foreign substances such as dust are unlikely to adhere to the outer shape face 1034. This makes it easy to avoid foreign substances such as dust entering the liquid injection port 1033.

Figure 3:
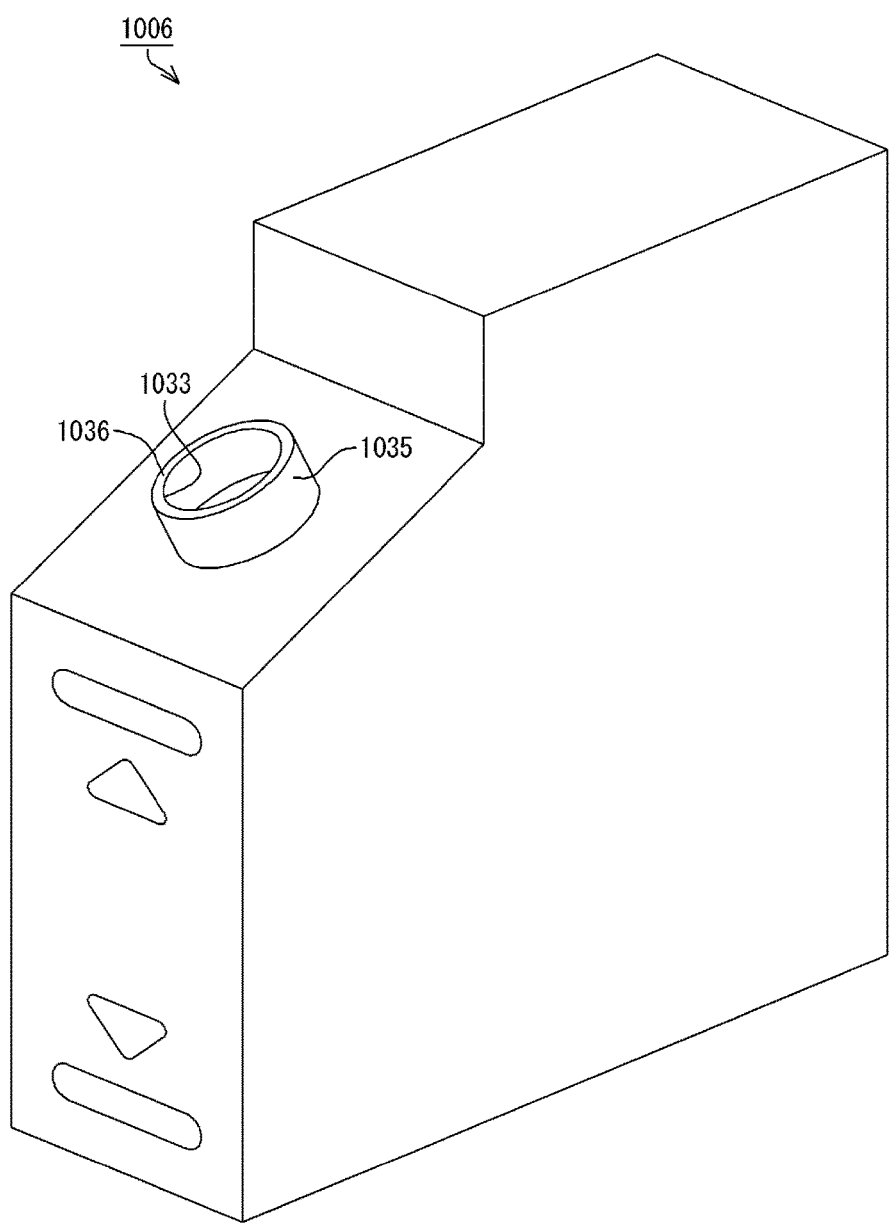
FIG. 3 is a perspective diagram schematically showing another example of a tank in the first embodiment.

Note that the configuration of the tank 1006 is not limited to the above. As the configuration of the tank 1006, for example, as shown in FIG. 3, a configuration can also be adopted in which a tubular liquid injection portion 1035 protruding from the outer shape face of the tank 1006 is provided. In this case, the liquid injection port 1033 is open in an end face 1036 at the tip end portion on the opposite side to the tanks 1006 side of the tubular liquid injection portion 1035 protruding from the outer shape face of the tank 1006. Also in this configuration, from the viewpoint of unlikeliness of adherence of foreign substances such as dust, a configuration is preferred in which the end face 1036 is inclined.

As shown in FIG. 2, ink supply tubes 1037 are respectively connected to the tanks 1006. Ink in the tanks 1006 is supplied to the recording head 1031 via the ink supply tubes 1037. The ink supplied to the recording head 1031 is then discharged as ink droplets from nozzles (not illustrated) directed toward the recording medium P1.

Note that in the above-described example, the tank unit 1005 has been described as one constituent element of the printer 1001, but the tank unit 1005 and the printer 1001 can be configured separately from each other. If the tank unit 1005 and the printer 1001 are configured separately from each other, the tank unit 1005 is arranged outside the housing 1002. Accordingly, if the tank unit 1005 and the printer 1001 are configured separately from each other, the tank unit 1005 is not covered by the housing 1002. If the tank unit 1005 and the printer 1001 are configured to be separate from each other, for example, a configuration is conceivable in which the tank unit 1005 is stored in a housing other than the housing 1002, and the housing that stores the tank unit 1005 is coupled to the housing 1002. As a method for coupling the housing that stores the tank unit 1005 and the housing 1002, various coupling methods such as coupling using a screw and coupling by engagement are conceivable.

Note that as the tank 1006, a configuration can also be adopted in which an upper limit mark 1042, a lower limit mark 1043 and the like are added to a visual checking face 1041 that enables visual confirmation of the ink storage amount. The user can comprehend the amount of ink in the tank 1006 by using the upper limit mark 1042 and the lower limit mark 1043 as indicators. Note that the upper limit mark 1042 indicates a guide for the amount of ink that will not overflow from the liquid injection portion 1035 when ink is injected from the liquid injection portion 1035. Also, the lower limit mark 1043 indicates a guide for the amount of ink when ink injection is prompted. A configuration can also be adopted in which at least one of the upper limit mark 1042 and the lower limit mark 1043 is provided in the tank 1006. The visual checking face 1041 is directed in the Y axis direction.

In the printer 1001 having the above-described configuration, recording is performed on the recording medium P1 by conveying the recording medium P1 in the Y axis direction, and causing the recording head 1031 to discharge ink droplets at a predetermined position while reciprocally moving the recording head 1031 along the X axis. These operations are controlled by the control unit 1032.

Ink is not limited to either water-based ink or oil-based ink. In addition, as water-based ink, either ink having a configuration in which a solute such as dye is dissolved in an aqueous solvent or ink having a configuration in which a dispersoid such as pigment is dispersed in an aqueous dispersion medium may be adopted. Also, as oil-based ink, either ink having a configuration in which a solute such as dye is dissolved in an oil-based solvent or ink having a configuration in which a dispersoid such as pigment is dispersed in an oil-based dispersion medium may be adopted.

Figure 4:
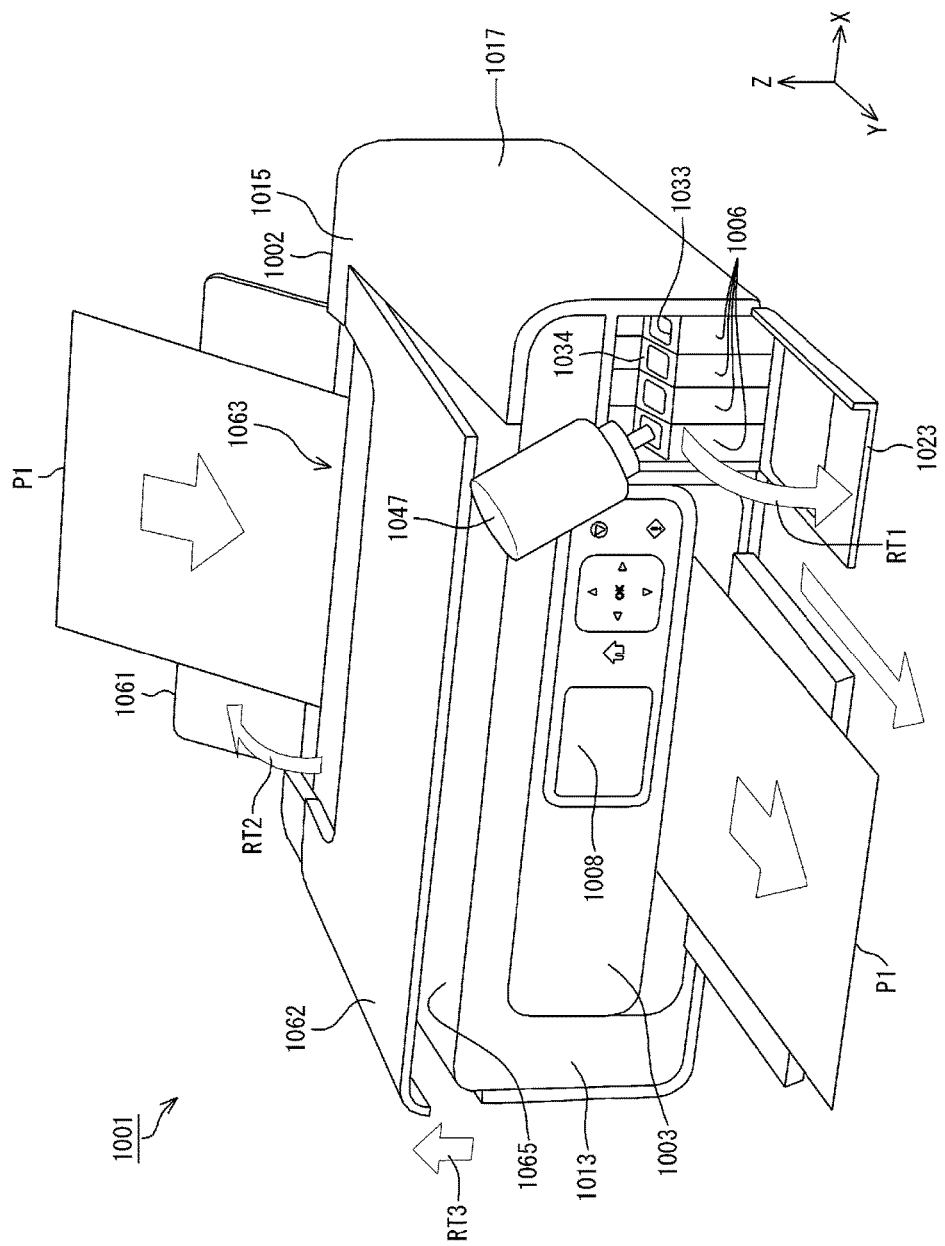
FIG. 4 is a perspective diagram showing the appearance of the liquid jet apparatus in the first embodiment.

As shown in FIG. 4, the cover 1023 is configured to be rotatable relative to the housing 1002 in an RT1 direction in the drawing. The RT1 direction is equivalent to the counterclockwise direction when a YZ plane is seen from the X axis direction in a planar view, in which an axis along the X axis is used as a rotation axis. By rotating the cover 1023 relative to the housing 1002 in the RT1 direction, the cover 1023 can be open relative to the housing 1002. The state where the cover 1023 is open relative to the housing 1002 is written as an open state of the cover 1023. By rotating the cover 1023 in the opposite direction to the RT1 direction from the open state of the cover 1023, the cover 1023 can be closed relative to the housing 1002. In this embodiment, the cover 1023 is configured to be openable/closable relative to the housing 1002 in this manner. The state where the cover 1023 is closed relative to the housing 1002 is written as a closed state of the cover 1023.

Note that the appearance of the printer 1001 is not limited to the texture and colors expressed in FIG. 4. As the appearance of the printer 1001, an appearance with a surface that has undergone emboss processing and the like can also be adopted, for example.

A direction in which the cover 1023 is open relative to the housing 1002 is not limited to the RT1 direction. As a direction in which the cover 1023 is open relative to the housing 1002, the clockwise direction when the YZ plane is seen from the X axis direction in a planar view, with the rotation axis along the X axis being positioned at the end portion in the Z axis direction of the cover 1023, can also be adopted. Also, as a direction in which the cover 1023 is open relative to the housing 1002, the counterclockwise direction when the XY plane is seen from the Z axis direction in a planar view, with the rotation axis along the Z axis being positioned at the end portion in the X axis direction of the cover 1023, can also be adopted. In addition, as a direction in which the cover 1023 is open relative to the housing 1002, the clockwise direction when the XY plane is seen from the Z axis direction in a planar view, with the rotation axis along the Z axis being positioned at the end portion in the −X axis direction of the cover 1023, can also be adopted.

If the cover 1023 is brought into the open state, the liquid injection ports 1033 of the tanks 1006 are exposed. Therefore, the user can access the liquid injection ports 1033 of the tanks 1006 from outside the housing 1002. In the open state of the cover 1023, the user can then inject ink stored in a bottle 1047 or the like from the liquid injection port 1033 into the tank 1006. At this time, the user can inject ink into the liquid injection port 1033 while confirming the amount of ink in the tank 1006 through the visual checking face 1041.

At this time, if the horizontal state of the printer 1001 is shifted, there are cases where the amount of ink in the tank 1006 that is visually confirmed through the visual checking face 1041 lacks in accuracy. This is because, if the horizontal state is shifted, the position of the liquid surface of the ink relative to the visual checking face 1041 is shifted. If this occurs, ink is likely to be injected to an extent where ink overflows from the liquid injection port 1033 when ink is injected into the liquid injection port 1033. Also, when the printer 1001 is used, in the closed state of the cover 1023, if the horizontal state of the printer 1001 is shifted, there are cases where the amount of ink in the tank 1006 that is visually confirmed through the window portion 1021 lacks in accuracy. If this occurs, it is conceivable that a situation will occur in which ink is not supplied to the recording head 1031 although the amount of ink in the tank 1006 is higher than the lower limit mark 1043 (FIG. 2).

Figure 5:
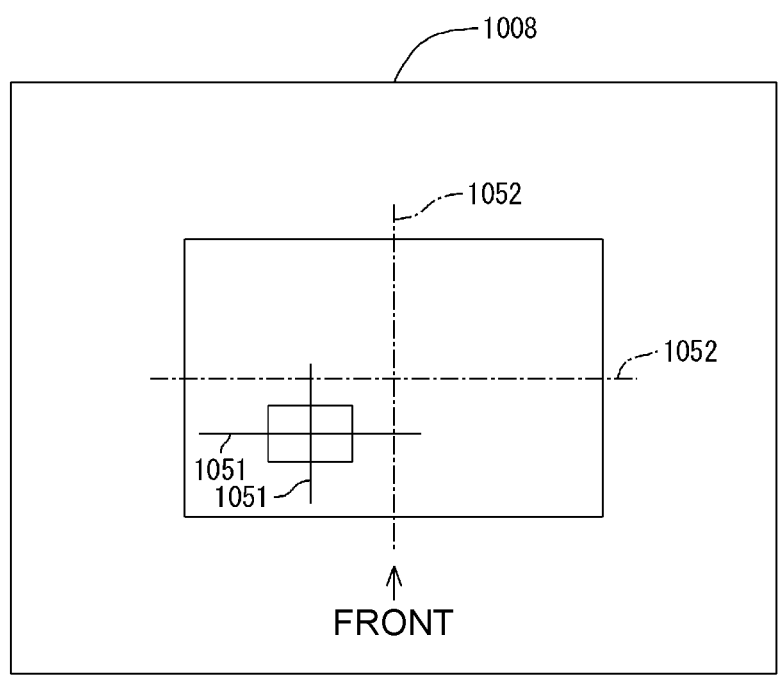
FIG. 5 is a diagram showing an example of display on a display unit in the first embodiment.

In this embodiment, information indicating the horizontal state of the printer 1001 is displayed on the display panel 1008. In other words, the display panel 1008 can display the horizontal state of the printer 1001. As shown in FIG. 5, information that is displayed on the display panel 1008 includes information regarding the comparison between an indicator 1051 instructing the horizontal state of the printer 1001 and a line of sight 1052 that is the position when the printer 1001 is horizontal, for example.

The user can recognize that the printer 1001 is in a horizontal state based on the information indicating the horizontal state displayed on the display panel 1008. When the horizontal state of the printer 1001 is shifted, the user can adjust the horizontal state of the printer 1001 such that the indicator 1051 displayed on the display panel 1008 approaches the line of sight 1052. Accordingly, a situation in which ink overflows from the liquid injection port 1033 when ink is injected into the liquid injection port 1033, and a situation in which ink is not supplied to the recording head 1031 are easily avoided.

In addition, in the printer 1001, the housing 1002 has a cover 1061 and a cover 1062 as shown in FIG. 4. Each of the cover 1061 and the cover 1062 constitute a portion of the housing 1002. The cover 1061 and the cover 1062 are provided in the upper face 1015 of the housing 1002. The cover 1061 is provided on one end side in the −Y axis direction of the upper face 1015. The cover 1062 is positioned in the Y axis direction of the cover 1061.

The cover 1061 is configured to be rotatable in an RT2 direction in the drawing. The RT2 direction is equivalent to the clockwise direction when the YZ plane is seen from the X axis direction in a planar view, with an axis along the X axis serving as a rotation axis. By rotating the cover 1061 relative to the housing 1002 in the RT2 direction, the cover 1061 can be open relative to the housing 1002. By rotating the cover 1061 in the opposite direction to the RT2 direction from the state where the cover 1061 is opened, the cover 1061 can be closed relative to the housing 1002. In this embodiment, the cover 1061 is configured to be openable/closable relative to the housing 1002 in this manner.

The cover 1062 is configured to be rotatable in an RT3 direction in the drawing. The RT3 direction is equivalent to the clockwise direction when the YZ plane is seen from the X axis direction in a planar view, with an axis along the X axis serving as a rotation axis. By rotating the cover 1062 relative to the housing 1002 in the RT3 direction, the cover 1062 can be open relative to the housing 1002. By rotating the cover 1062 in the opposite direction to the RT3 direction from the state where the cover 1062 is opened, the cover 1062 can be closed relative to the housing 1002. In this embodiment, the cover 1062 is configured to be openable/closable relative to the housing 1002 in this manner.

When the cover 1061 is open relative to the housing 1002, a paper feeding unit 1063 is exposed. The recording medium P1 can be supplied from the paper feeding unit 1063 to the printer 1001. When the recording medium P1 is supplied from the paper feeding unit 1063 to the printer 1001, the cover 1061 can support the recording medium P1. Accordingly, in this embodiment, the cover 1061 has a function as a paper support.

When the cover 1062 is open relative to the housing 1002, a scanner unit 1065 is exposed. In this embodiment, the printer 1001 includes the scanner unit 1065. In the in-use orientation of the printer 1001, the scanner unit 1065 is positioned in the Z axis direction of the recording head 1031 (FIG. 2). The scanner unit 1065 is of a flat bed type, and has an imaging element such as an image sensor (not illustrated). The scanner unit 1065 can read, as image data, an image and the like recorded on a medium such as paper, via the imaging element. Therefore, the scanner unit 1065 functions as an apparatus for reading out images and the like. Note that FIG. 4 shows the state where the cover 1062 is open relative to the housing 1002, and the readout face of the scanner unit 1065 is exposed.

Second Embodiment

Figure 6:
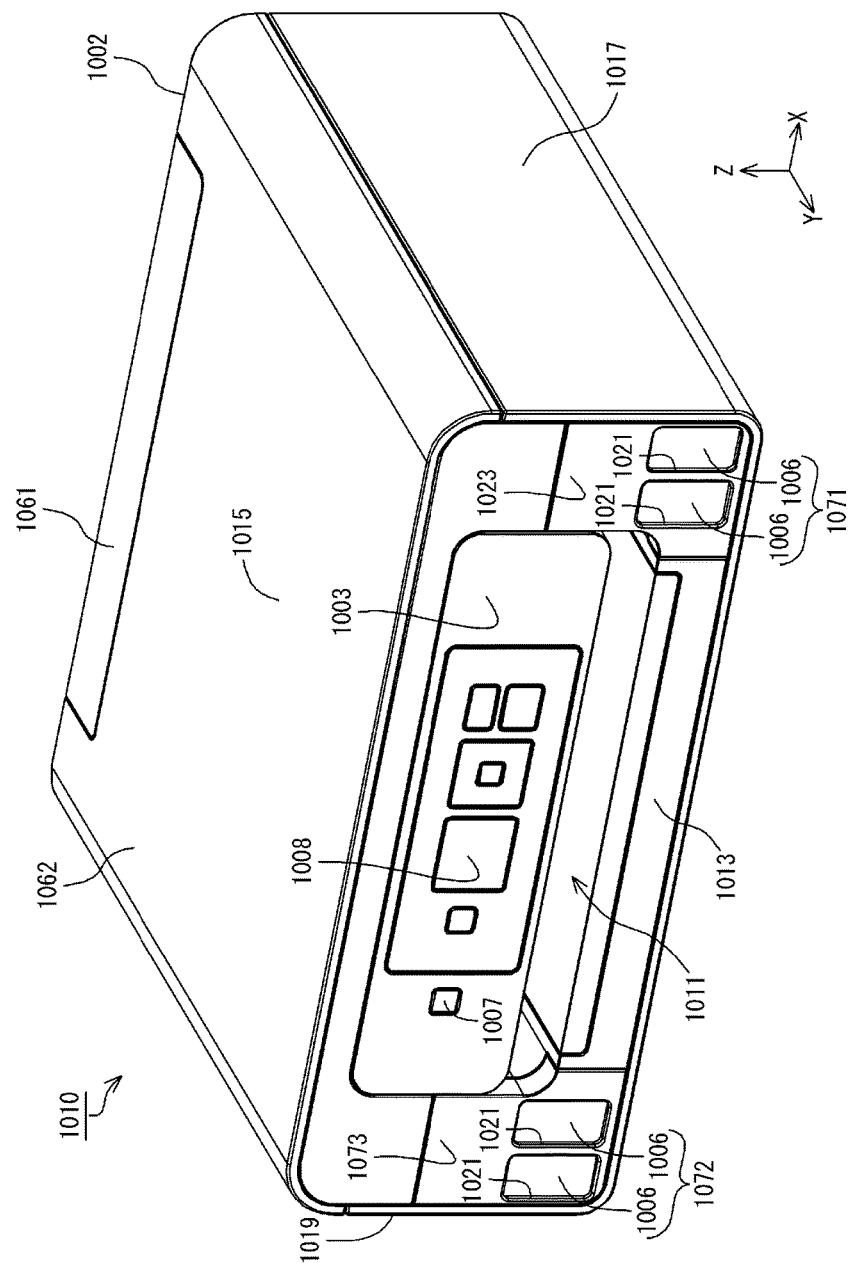
FIG. 6 is a perspective diagram showing the appearance of a liquid jet apparatus in a second embodiment.

A printer 1010 in a second embodiment has a first tank unit 1071 and a second tank unit 1072 as shown in FIG. 6. In the printer 1010 in the second embodiment, the tank unit 1005 of the printer 1001 in the first embodiment is replaced by the first tank unit 1071 and the second tank unit 1072. In addition, in the printer 1010, a housing 1002 has a cover 1073. Except for these, the printer 1010 has the same configuration as the printer 1001. Therefore, in the following description, the same reference numerals as the first embodiment are given to the same constituent elements as the printer 1001 among the constituent elements of the printer 1010, and detailed description thereof is omitted.

In this embodiment, each of the first tank unit 1071 and the second tank unit 1072 includes two tanks 1006. The tanks 1006 in the second embodiment have the same configuration as the tanks 1006 in the first embodiment. Note that the number of tanks 1006 in each of the first tank unit 1071 and the second tank unit 1072 is not limited to two, and one tank 1006 and more than two tanks 1006 can also be adopted. In this embodiment, one tank 1006 out of a plurality of the tanks 1006 included in the first tank unit 1071 corresponds to a first liquid container. Also, one tank 1006 out of a plurality of the tanks 1006 included in the second tank unit 1072 corresponds to a second liquid container. In addition, in this embodiment, the cover 1023 corresponds to a first cover, and the cover 1073 corresponds to a second cover.

The printer 1010 has a configuration in which the four tanks 1006 of the tank unit 1005 in the first embodiment are divided between the first tank unit 1071 and the second tank unit 1072. In addition, from another viewpoint, the printer 1010 can be regarded to have a configuration in which the number of the tanks 1006 in the tank unit 1005 in the printer 1010 of the first embodiment is two, and the second tank unit 1072 is added to the printer 1. Also in the printer 1010, similarly to the first embodiment, the housing 1002 collectively covers a recording head 1031 and the tanks 1006.

In the printer 1010, the first tank unit 1071 and the second tank unit 1072 are stored inside the housing 1002. Accordingly, the four tanks 1006 of the first tank unit 1071 and the second tank unit 1072 are covered by the housing 1002. In the printer 1010, the first tank unit 1071 is positioned between an operation panel 1003 and a side wall 1017 when the operation panel 1003 is viewed from the front, or in other words, when the operation panel 1003 is viewed in the −Y axis direction. The second tank unit 1072 is positioned between the operation panel 1003 and a side wall 1019 when the operation panel 1003 is viewed from the front. In other words, when the operation panel 1003 is viewed from the front, the second tank unit 1072 is arranged between the other side wall 1019 on the opposite side to the one side wall 1017 of the housing 1002 and the operation panel 1003.

From another viewpoint, when the operation panel 1003 is viewed from the front, the first tank unit 1071 and the second tank unit 1072 are provided at positions facing each other with the operation panel 1003 therebetween. Furthermore, from another viewpoint, when the operation panel 1003 is viewed from the front, the first tank unit 1071 and the second tank unit 1072 are provided at positions facing each other, sandwiching a paper discharge unit 1011. Note that in the first tank unit 1071, the two tanks 1006 are aligned along the X axis. Similarly, in the second tank unit 1072, the two tanks 1006 are aligned along the X axis.

In this embodiment, the cover 1073 constitutes a portion of the housing 1002. The cover 1073 is arranged on a front face 1013 of the printer 1010. The outer face of the cover 1073 is directed in the Y axis direction. As described above, the outer face of the operation panel 1003 is also directed in the Y axis direction. In this embodiment, the outer face of the cover 1073 and the outer face of the operation panel 1003 are positioned in the same plane. In other words, in the in-use orientation of the printer 1010, the position in the Y axis direction of the outer face of the cover 1073 is the same as the position in the Y axis direction of the outer face of the operation panel 1003. Therefore, the outer face of the cover 1073 and the outer face of the operation panel 1003 are positioned in the same plane, and thus the appearance of the printer 1010 is unlikely to be uneven. Therefore, when the printer 1010 is transported and the like, the printer 1010 is unlikely to come into contact with, be caught on, or collide with articles, structures and the like arranged in the surrounding environment. Note that being positioned in a plane is not limited to coinciding with being in a complete plane, and includes being positioned in a plane including unevenness due to an error, tolerance, and the like, and a step of a joint between constituent parts and the like.

In addition, in this embodiment, the outer face of the front face 1013 of the housing 1002 is also directed in the Y axis direction. In this embodiment, the outer face of the front face 1013 of the housing 1002 and the outer face of the operation panel 1003 are positioned in the same plane. In other words, in the in-use orientation of the printer 1010, the position in the Y axis direction of the outer face of the front face 1013 of the housing 1002 is the same as the position in the Y axis direction of the outer face of the operation panel 1003. Therefore, the outer face of the front face 1013 of the housing 1002 and the outer face of the operation panel 1003 are positioned in the same plane, and thus the appearance of the printer 1010 is unlikely to be uneven. Therefore, when the printer 1010 is transported and the like, the printer 1010 is unlikely to come into contact with, be caught on, or collide with articles, structures and the like arranged in the surrounding environment. Note that being positioned in a plane is not limited to coincidence in a complete plane, and includes being positioned in a plane including unevenness due to an error, tolerance and the like, and a step of a joint between constituent parts and the like.

The cover 1073 covers at least a portion of the tanks 1006. The cover 1073 is configured to be openable/closable relative to the housing 1002. When the cover 1073 is open relative to the housing 1002, a portion of each of the tanks 1006 is exposed. In the state where the cover 1073 is open relative to the housing 1002, the user can inject ink into the tanks 1006 of the second tank unit 1072. Note that also in this embodiment, window portions 1021 are provided at positions overlapping the tanks 1006 of the second tank unit 1072. Also in this embodiment, the window portions 1021 are provided in the cover 1073. The window portions 1021 provided in the cover 1073 are also directed in the Y axis direction similarly to the window portions 1021 provided in the cover 1023.

Figure 7:
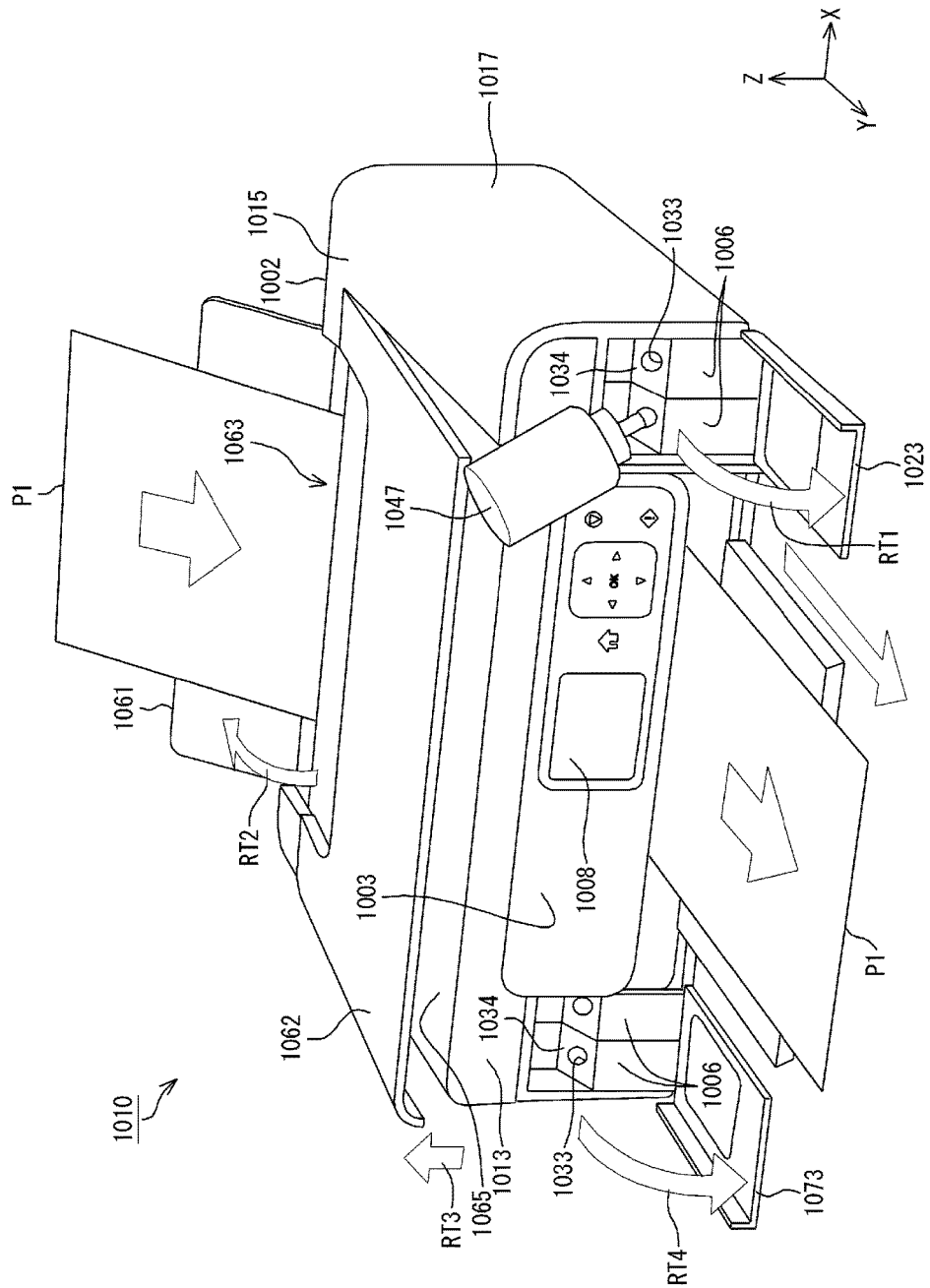
FIG. 7 is a perspective diagram showing the appearance of the liquid jet apparatus in the second embodiment.

As shown in FIG. 7, the cover 1073 is configured to be rotatable relative to the housing 1002 in an RT4 direction in the drawing. The RT4 direction is equivalent to the counterclockwise direction when the YZ plane is seen from the X axis direction in a planar view, with an axis along the X axis serving as a rotation axis. By rotating the cover 1073 relative to the housing 1002 in the RT4 direction, the cover 1073 can be open relative to the housing 1002. By rotating the cover 1073 in the opposite direction to the RT4 direction from the open state of the cover 1073, the cover 1073 can be closed relative to the housing 1002. In this embodiment, the cover 1073 is configured to be openable/closable relative to the housing 1002 in this manner.

Note that the appearance of the printer 1010 is not limited to the texture and colors expressed in FIG. 7. As the appearance of the printer 1010, for example, an appearance with a surface that has undergone emboss processing and the like can also be adopted.

A direction in which the cover 1073 is open relative to the housing 1002 is not limited to the RT4 direction. As a direction in which the cover 1073 is open relative to the housing 1002, the clockwise direction when the YZ plane is seen from the X axis direction in a planar view, with the rotation axis along the X axis being positioned at the end portion in the Z axis direction of the cover 1073, can also be adopted. In addition, as a direction in which the cover 1073 is open relative to the housing 1002, the counterclockwise direction when the XY plane is seen from the Z axis direction in a planar view, with the rotation axis along the Z axis being positioned at the end portion in the X axis direction of the cover 1073, can also be adopted. In addition, as a direction in which the cover 1073 is open relative to the housing 1002, the clockwise direction when the XY plane is seen from the Z axis direction in a planar view, with the rotation axis along the Z axis being positioned at the end portion in the −X axis direction of the cover 1073, can also be adopted.

When the cover 1023 and the cover 1073 are brought into the open state, liquid injection ports 1033 of the tanks 1006 of the first tank unit 1071 and the second tank unit 1072 are exposed. Therefore, the user can access the liquid injection ports 1033 of the tanks 1006 from outside the housing 1002. In the open state of the cover 1023 and the cover 1073, the user can inject ink stored in the bottle 1047 or the like from a liquid injection port 1033 into a tank 1006. At this time, the user can inject the ink into the liquid injection port 1033 while confirming the amount of ink in the tank 1006 through a visual checking face 1041.

Also in the printer 1010, similarly to the printer 1001, a cover 1061, a cover 1062, and a scanner unit 1065 are provided. Opening/closing of the cover 1061 and the cover 1062 is similar to the first embodiment, and thus detailed description thereof is omitted. In addition, the scanner unit 1065 is also similar to the first embodiment, and thus detailed description thereof is omitted. Also in the printer 1010 of the second embodiment, similar effects to those of the printer 1001 of the first embodiment are achieved. Note that FIG. 7 shows the state where the cover 1062 is open relative to the housing 1002, and the readout face of the scanner unit 1065 is exposed.

Third Embodiment

Figure 8:
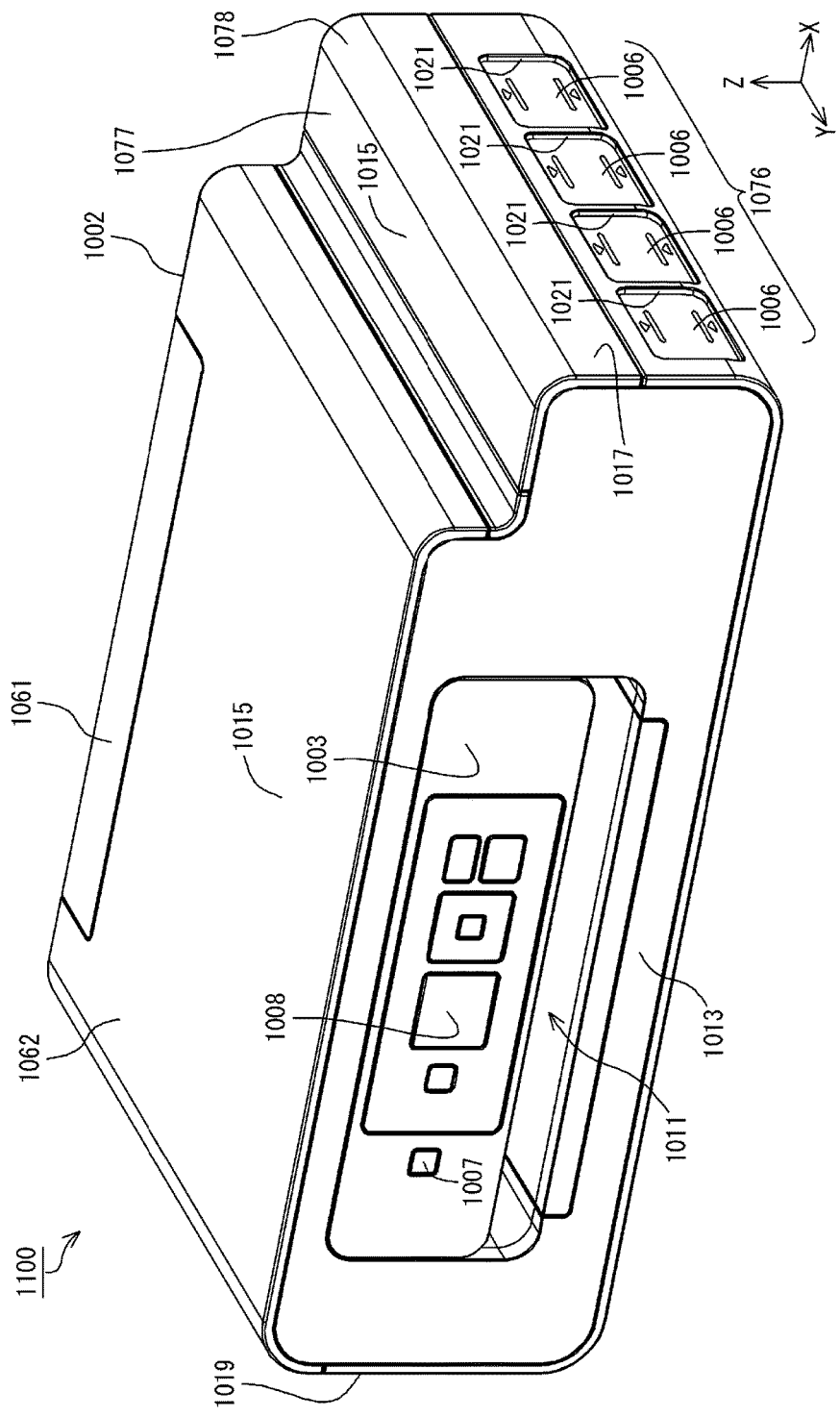
FIG. 8 is a perspective diagram showing the appearance of a liquid jet apparatus in a third embodiment.

As shown in FIG. 8, a printer 1100 in a third embodiment has a tank unit 1076. In the printer 1100 in the third embodiment, the tank unit 1005 of the printer 1001 in the first embodiment is replaced by the tank unit 1076. In addition, in the printer 1100, a step portion 1077 is provided in an upper face 1015 of a housing 1002. Except for these, the printer 1100 has the same configuration as the printer 1001. Therefore, in the following description, the same reference numerals as the first embodiment are given to the same constituent elements as those of the printer 1001 among the constituent elements of the printer 1100, and detailed description thereof is omitted.

In this embodiment, the tank unit 1076 includes four tanks 1006. The tanks 1006 in the third embodiment have the same configuration as the tanks 1006 in the first embodiment. Note that the number of the tanks 1006 in the tank unit 1076 is not limited to four, and less than four tanks 1006 or more than four tanks 1006 can also be adopted. Also in the printer 1100, similarly to the first embodiment, the housing 1002 collectively covers a recording head 1031 and the tanks 1006.

When an operation panel 1003 is viewed from the front, or in other words, when the operation panel 1003 is viewed in the −Y axis direction, the tank unit 1076 is positioned between the operation panel 1003 and a side wall 1017. From another viewpoint, when the printer 1100 is viewed from the front, or in other words, when the printer 1100 is viewed in the −Y axis direction, the tank unit 1076 is positioned between a paper discharge unit 1011 and the side wall 1017. In this embodiment, the four tanks 1006 are aligned along the Y axis.

In this embodiment, window portions 1021 are provided in the side wall 1017. In this embodiment, the window portions 1021 are directed in the X axis direction. When the side wall 1017 is viewed from the front, or in other words, when the printer 1100 is viewed in the −X axis direction, the window portions 1021 are provided at positions overlapping the tanks 1006

The step portion 1077 has a configuration in which, in the in-use orientation of the printer 1100, a portion of the upper face 1015 is lowered in the −Z axis direction. The step portion 1077 is provided on one end side in the X axis direction of the printer 1100, or in other words, on the side wall 1017 side of the housing 1002. The step portion 1077 is provided in a region overlapping at least a portion of the tank unit 1076. In this embodiment, the step portion 1077 is provided spanning the depth of the housing 1002 along the Y axis. The step portion 1077 makes it easier to recognize the position of the tank unit 1076.

In this embodiment, the housing 1002 has a cover 1078. In this embodiment, the cover 1078 constitutes a portion of the housing 1002. The cover 1078 is provided in the step portion 1077 of the housing 1002. The cover 1078 is connected from the upper face 1015 in the step portion 1077 to a portion of the side wall 1017 intersecting this upper face 1015. Accordingly, the cover 1078 constitutes a portion of the upper face 1015 and a portion of the side wall 1017. Note that in this embodiment, in the in-use orientation of the printer 1100, the window portions 1021 are positioned in the −Z axis direction relative to the cover 1078. Accordingly, in this embodiment, the window portions 1021 are provided outward of the range of the cover 1078. In other words, in this embodiment, the window portions 1021 are provided in the housing 1002 excluding the cover 1078.

In addition, in this embodiment, the outer face of a front face 1013 of the housing 1002 is also directed in the Y axis direction. In this embodiment, the outer face of the front face 1013 of the housing 1002 and the outer face of an operation panel 1003 are positioned in the same plane. In other words, in the in-use orientation of the printer 1100, the position in the Y axis direction of the outer face of the front face 1013 of the housing 1002 and the position in the Y axis direction of the outer face of the operation panel 1003 are the same. Therefore, the outer face of the front face 1013 of the housing 1002 and the outer face of the operation panel 1003 are positioned in the same plane, and thus the appearance of the printer 1100 is unlikely to be uneven. Therefore, when the printer 1100 is transported and the like, the printer 1100 is unlikely to come into contact with, be caught on, or collide with articles, structures and the like arranged in the surrounding environment. Note that being positioned in a plane is not limited to coinciding with being in a complete plane, and also includes being positioned in a plane including unevenness due to an error, tolerance, and the like, and a step of a joint between constituent parts and the like.

The cover 1078 covers at least a portion of the tanks 1006. The cover 1078 is configured to be openable/closable relative to the housing 1002. When the cover 1078 is open relative to the housing 1002, a portion of each of the tanks 1006 is exposed. In the state where the cover 1078 is open relative to the housing 1002, the user can inject ink into the tanks 1006. Note that as the position of the tank unit 1076 in the printer 1100, a position between the operation panel 1003 and a side wall 1019 when the operation panel 1003 is viewed from the front can also be adopted. In a configuration in which the tank unit 1076 is arranged between the operation panel 1003 and the side wall 1019, it suffices to change the positions of the step portion 1077, the cover 1078, and the window portions 1021 according to the position of the tank unit 1076.

Figure 9:
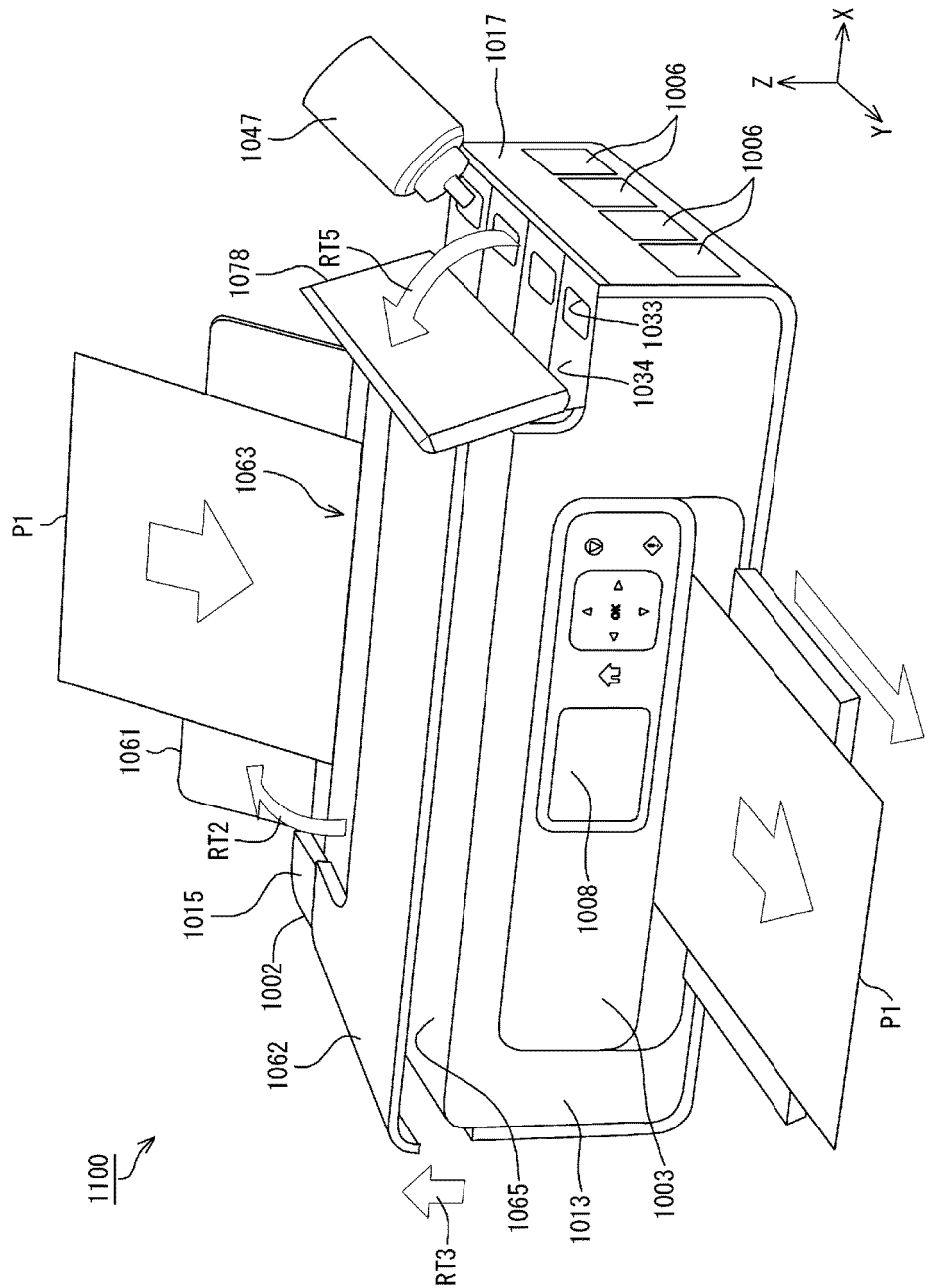
FIG. 9 is a perspective diagram showing the appearance of the liquid jet apparatus in the third embodiment.

As shown in FIG. 9, the cover 1078 is configured to be rotatable relative to the housing 1002 in an RT5 direction in the drawing. The RT5 direction is equivalent to the counterclockwise direction when an XZ plane is seen from the Y axis direction in a planar view, with an axis along the Y axis serving as a rotation axis. By rotating the cover 1078 relative to the housing 1002 in the RT5 direction, the cover 1078 can be opened relative to the housing 1002. By rotating the cover 1078 in the opposite direction to the RT5 direction from the open state of the cover 1078, the cover 1078 can be closed relative to the housing 1002. In this embodiment, the cover 1078 is configured to be openable/closable relative to the housing 1002 in this manner. Note that, also in the third embodiment, similarly to the first embodiment, in the tank 1006, an outer shape face 1034 on which a liquid injection port 1033 is formed is inclined.

Note that the appearance of the printer 1100 is not limited to the texture and colors expressed in FIG. 9. As the appearance of the printer 1100, for example, an appearance with a surface that has undergone emboss processing and the like can also be adopted.

In this embodiment, the step portion 1077 (FIG. 8) is provided, and thus when the cover 1078 is open relative to the housing 1002, the rotation position of the cover 1078 is restricted by the upper face 1015 positioned in the Z axis direction relative to the step portion 1077. Accordingly, a step in the upper face 1015 created by the step portion 1077 functions as a stopper of rotation when the cover 1078 is brought into the open state.

A direction in which the cover 1078 is open relative to the housing 1002 is not limited to the RT5 direction shown in FIG. 9. As a direction in which the cover 1078 is open relative to the housing 1002, the clockwise direction when the XZ plane is seen from the Y axis direction in a planar view, with the rotation axis along the Y axis being positioned at the end portion on the side wall 1017 side of the cover 1078, can also be adopted. In addition, as a direction in which the cover 1078 is open relative to the housing 1002, the clockwise direction when the YZ plane is seen from the X axis direction in a planar view, with the rotation axis along the X axis being positioned at the end portion in the −Y axis direction of the upper face 1015 of the cover 1078, can also be adopted. In addition, as a direction in which the cover 1078 is open relative to the housing 1002, the counterclockwise direction when the YZ plane is seen from the X axis direction in a planar view, with the rotation axis along the X axis being positioned at the end portion in the Y axis direction of the upper face 1015 of the cover 1078, can also be adopted.

Also in the printer 1100, a cover 1061, a cover 1062, and a scanner unit 1065 are provided similarly to the printer 1001. Opening/closing of the cover 1061 and the cover 1062 is similar to the first embodiment, and thus a detailed description thereof is omitted. In addition, the scanner unit 1065 is also similar to the first embodiment, and thus detailed description thereof is omitted. Also in the printer 1100 of the third embodiment, similar effects as the first embodiment and the second embodiment are acquired. Note that FIG. 9 shows the state where the cover 1062 is open relative to the housing 1002, and the readout face of the scanner unit 1065 is exposed.

Fourth Embodiment

Figure 10:
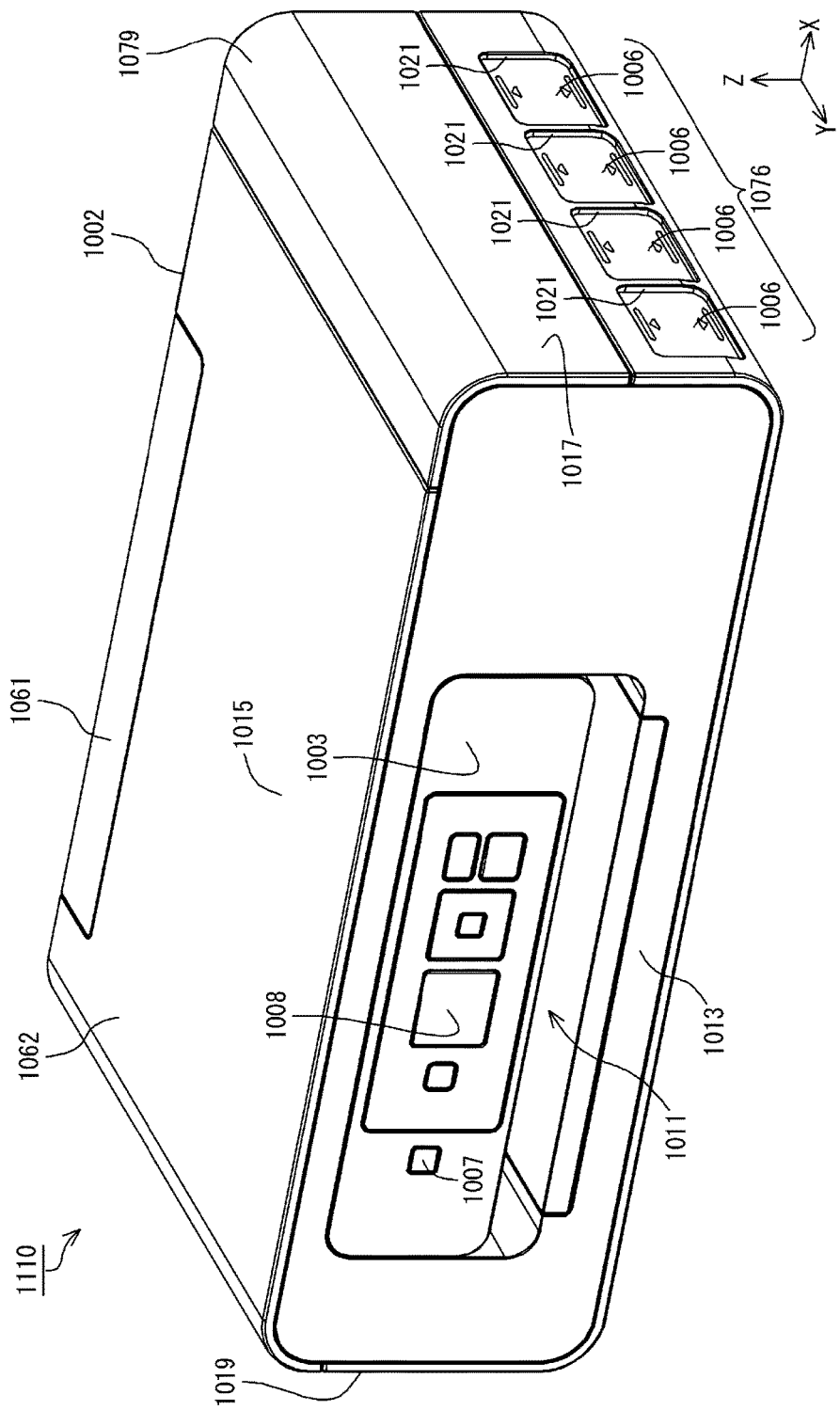
FIG. 10 is a perspective diagram showing the appearance of a liquid jet apparatus in a fourth embodiment.

A printer 1110 in a fourth embodiment will be described. In the printer 1110 in the fourth embodiment, as shown in FIG. 10, the step portion 1077 in the printer 1100 in the third embodiment (FIG. 8) is omitted. Except for this, the printer 1110 in the fourth embodiment has the same configuration as the printer 1100 in the third embodiment. Therefore, in the following description, the same reference numerals as the third embodiment are given to the same constituent elements as the printer 1100 among the constituent elements of the printer 1110, and detailed description thereof is omitted. Also in the printer 1110, similarly to the first embodiment, a housing 1002 collectively covers a recording head 1031 and tanks 1006.

In this embodiment, the housing 1002 has a cover 1079. In this embodiment, the cover 1079 constitutes a portion of the housing 1002. The cover 1079 is connected from one end side in the X axis direction of an upper face 1015 to a portion of a side wall 1017 intersecting the upper face 1015. Accordingly, the cover 1079 constitutes a portion of the upper face 1015 and a portion of the side wall 1017. Note that also in this embodiment, similarly to the third embodiment, in the in-use orientation of the printer 1110, window portions 1021 are positioned in the −Z axis direction relative to the cover 1079. Also in this embodiment, the window portions 1021 are provided outward of the range of the cover 1079. In other words, also in this embodiment, the window portions 1021 are provided in the housing 1002 excluding the cover 1079.

In addition, in this embodiment, the outer face of a front face 1013 of the housing 1002 is also directed in the Y axis direction. In this embodiment, the outer face of the front face 1013 of the housing 1002 and the outer face of an operation panel 1003 are positioned in the same plane. In other words, in the in-use orientation of the printer 1110, the position in the Y axis direction of the outer face of the front face 1013 of the housing 1002 and the position in the Y axis direction of the outer face of the operation panel 1003 are the same. Therefore, the outer face of the front face 1013 of the housing 1002 and the outer face of the operation panel 1003 are positioned in the same plane, and thus the appearance of the printer 1110 is unlikely to be uneven. Therefore, when the printer 1110 is transported and the like, the printer 1110 is unlikely to come into contact with, be caught on, or collide with articles, structures, and the like arranged in the surrounding environment. Note that being positioned in a plane is not limited to coinciding with being in a complete plane, and also includes being positioned in a plane including unevenness due to an error, tolerance, and the like, and a step of a joint between constituent parts and the like.

The cover 1079 covers at least a portion of the tanks 1006. The cover 1079 is configured to be openable/closable relative to the housing 1002. When the cover 1079 is open relative to the housing 1002, a portion of each of the tanks 1006 is exposed. In the state where the cover 1079 is open relative to the housing 1002, the user can inject ink into the tanks 1006. Note that as the position of the tank unit 1076 in the printer 1110, a position between the operation panel 1003 and a side wall 1019 when the operation panel 1003 is viewed from the front can also be adopted. In a configuration in which the tank unit 1076 is arranged between the operation panel 1003 and the side wall 1019, it suffices that the positions of the cover 1079 and the window portions 1021 are changed according to the position of the tank unit 1076.

As described above, in this embodiment, the step portion 1077 in the third embodiment is omitted. Therefore, a region in the upper face 1015 of the housing 1002 included in the cover 1079 and a region in the upper face 1015 included in the cover 1062 are positioned in the same plane. In other words, in the in-use orientation of the printer 1110, the position in the Z axis direction of the region in the upper face 1015 included in the cover 1079 and the position in the Z axis direction of the region in the upper face 1015 included in the cover 1062 are the same. From another viewpoint, it can be said that the upper face 1015 is positioned in a plane from a region in which at least a portion of the tanks 1006 overlaps the upper face 1015 in the state where the upper face 1015 of the housing 1002 is seen in the −Z axis direction in a planar view to a region in which the recording head 1031 (FIG. 2) overlaps the upper face 1015 in the state where the upper face 1015 is seen in a planar view. Note that being positioned in a plane is not limited to coinciding with being in a complete plane, and also includes being positioned in a plane including unevenness due to an error, tolerance, and the like, and a step of a joint between constituent parts and the like.

According to this configuration, the region in the upper face 1015 included in the cover 1079 and the region in the upper face 1015 included in the cover 1062 are positioned in the same plane, and thus the appearance of the printer 1110 is unlikely to be uneven. Therefore, when the printer 1110 is transported and the like, the printer 1110 is unlikely to come into contact with, be caught on, or collide with articles, structures, and the like arranged in the surrounding environment.

Figure 11:
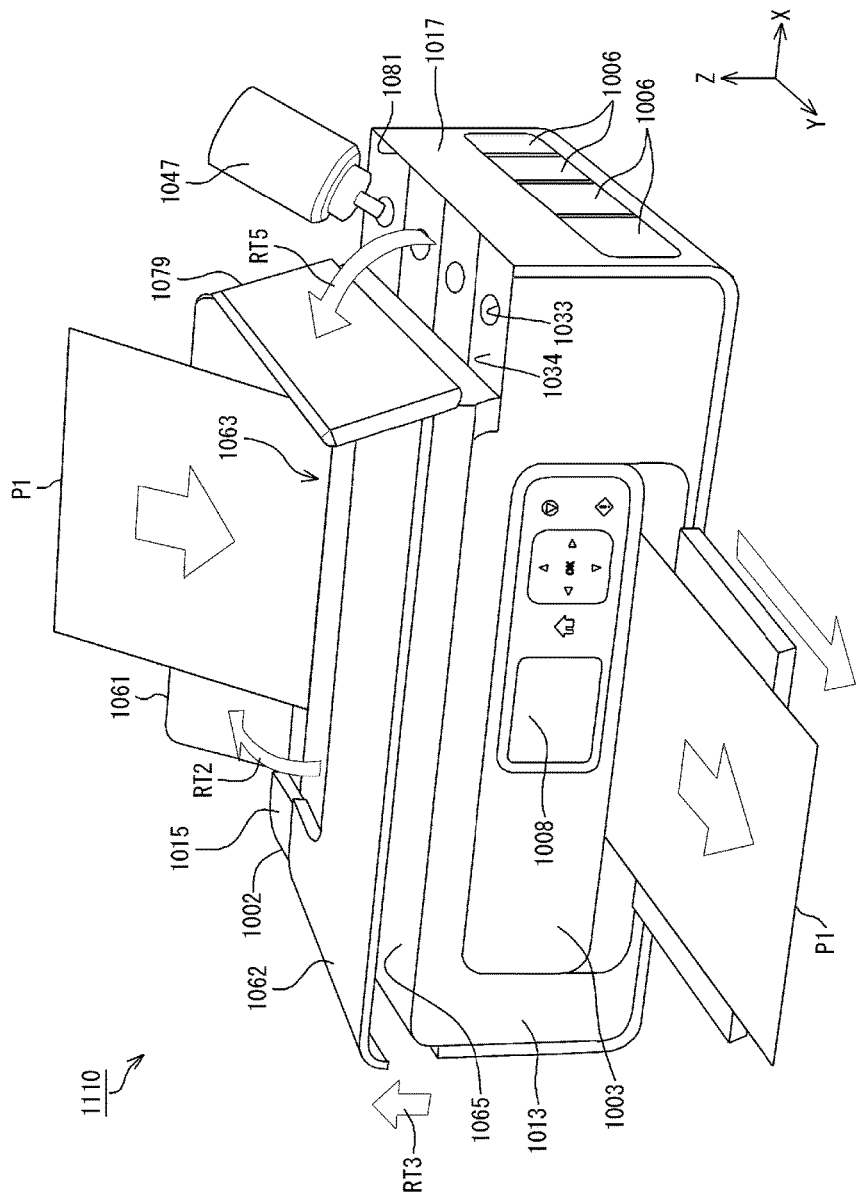
FIG. 11 is a perspective diagram showing the appearance of the liquid jet apparatus in the fourth embodiment.

As shown in FIG. 11, the cover 1079 is configured to be rotatable relative to the housing 1002 in the RT5 direction. The RT5 direction is equivalent to the counterclockwise direction when the XZ plane is seen from the Y axis direction in a planar view, with an axis along the Y axis serving as a rotation axis. By rotating the cover 1079 relative to the housing 1002 in the RT5 direction, the cover 1079 can be open relative to the housing 1002. By rotating the cover 1079 from the open state of the cover 1079 in the opposite direction to the RT5 direction, the cover 1079 can be closed relative to the housing 1002. In this embodiment, the cover 1079 is configured to be openable/closable relative to the housing 1002 in this manner. Note that a direction in which the cover 1079 is open relative to the housing 1002 is not limited to the RT5 direction, and various directions similar to the third embodiment can be adopted. Note that, also in the fourth embodiment, similarly to the first embodiment, in the tanks 1006, an outer shape face 1034 in which a liquid injection port 1033 is formed is inclined.

Note that the appearance of the printer 1110 is not limited to the texture and colors expressed in FIG. 11. As the appearance of the printer 1110, an appearance with a surface that has undergone emboss processing and the like can also be adopted, for example.

Also in the printer 1110, a cover 1061, a cover 1062, and a scanner unit 1065 are provided similarly to the printer 1001. Opening/closing of the cover 1061 and the cover 1062 is similar to the first embodiment, and thus a detailed description thereof is omitted. In addition, the scanner unit 1065 is also similar to the first embodiment, and thus detailed description thereof is omitted. Also in the printer 1110 of the fourth embodiment, effects similar to those of the first to third embodiments are acquired.

Note that FIG. 11 shows the state where the cover 1062 is open relative to the housing 1002, and the readout face of the scanner unit 1065 is exposed. In this embodiment, in the in-use orientation of the printer 1110, the readout face of the scanner unit 1065 and an end face 1081 of a portion of the housing 1002 overlapping the tanks 1006 are positioned in the same plane. In other words, in the in-use orientation of the printer 1110, the position in the Z axis direction of the readout face of the scanner unit 1065 and the position in the Z axis direction of the end face 1081 of the portion of the housing 1002 overlapping the tanks 1006 are the same. Note that being positioned in a plane is not limited to coinciding with being in a complete plane, and also includes being positioned in plane including unevenness due to an error, tolerance and the like, and a step of a joint between constituent parts and the like.

Fifth Embodiment

A fifth embodiment will be described with reference to the drawings. Note that in the drawings, the scales of the constituent elements and members may have been changed so as to be of a size at which the constituent elements can be recognized.

Figure 12:
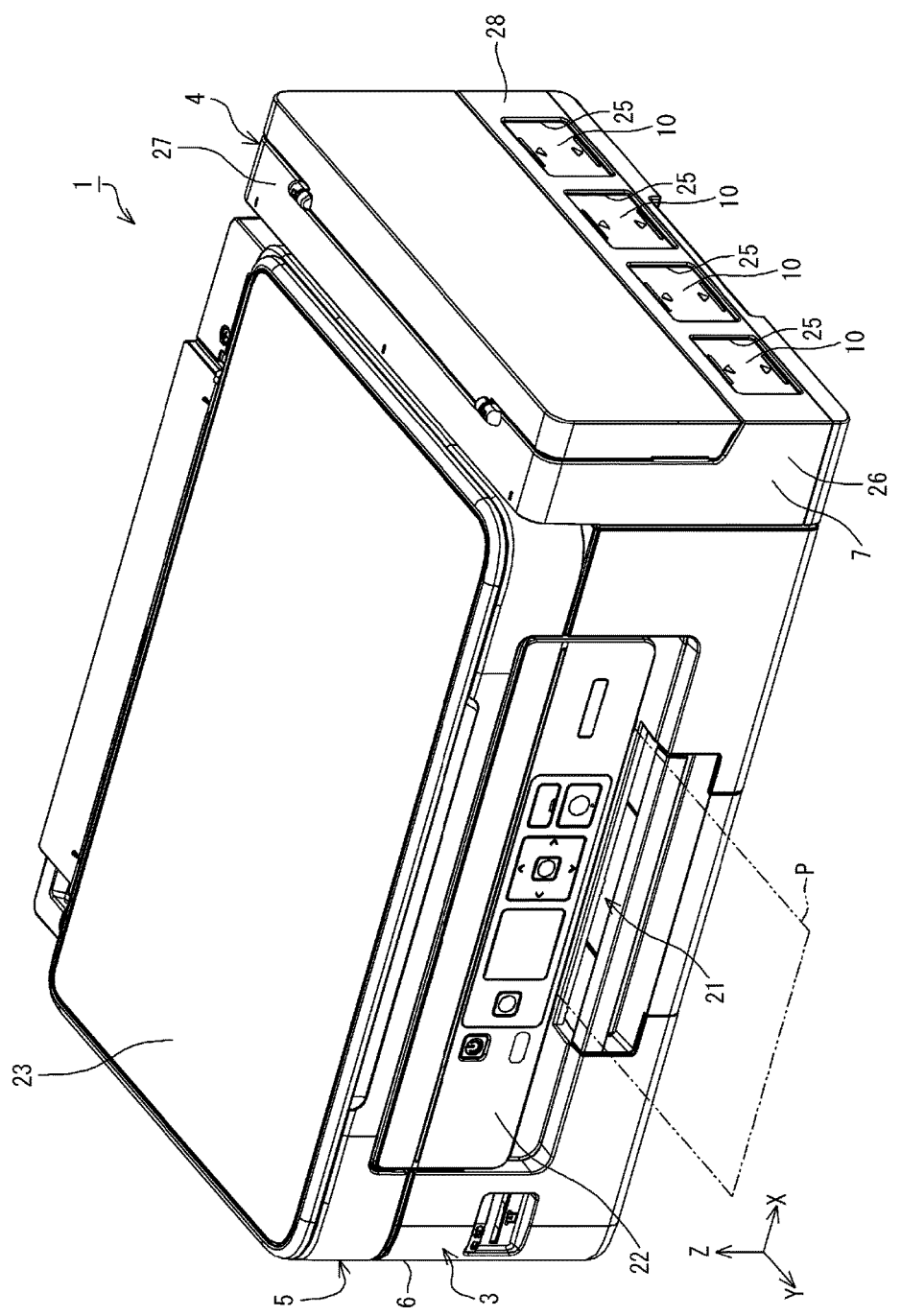
FIG. 12 is a perspective diagram showing a main configuration of a printer in a fifth embodiment.

As shown in FIG. 12, a printer 1 in the fifth embodiment has a printing unit 3 that is an example of a liquid jet apparatus, a tank unit 4 arranged along with and to a side of the printing unit 3, and a scanner unit 5. The printing unit 3 has a housing 6. The housing 6 constitutes the outer shell of the printing unit 3. A mechanism unit (to be described later) of the printing unit 3 is stored inside the housing 6. The tank unit 4 has a housing 7 and a plurality of (two or more) tanks 10. Note that in the fifth embodiment, the four tanks 10 are provided. The housing 6, the housing 7, and the scanner unit 5 constitute the outer shell of the printer 1. Note that, as the printer 1, a configuration can also be adopted in which the scanner unit 5 is omitted. The printer 1 can print on a printing medium P such as printing paper using ink. The printing medium P is an example of a medium on which printing is performed.

Here, in FIG. 12, the X, Y, and Z axes that are coordinate axes orthogonal to each other are assigned. The X, Y, and Z axes are assigned also in the drawings shown after this as necessary. In this case, the X, Y, and Z axes in the drawings correspond to the X, Y, and Z axes in FIG. 12. FIG. 12 illustrates the state where the printer 1 is arranged on the XY plane defined by the X axis and the Y axis. In the fifth embodiment, a state when the printer 1 is arranged on the XY plane in the state where the XY plane coincides with the horizontal plane is the in-use state of the printer 1. The orientation of the printer 1 when the printer 1 is arranged on the XY plane that coincides with the horizontal plane is called the in-use orientation of the printer 1.

In the following description, if the X axis, the Y axis, and the Z axis are written in diagrams showing or in descriptions regarding the constituent parts and units of the printer 1, the X axis, the Y axis, and the Z axis apply to those in the state where the constituent parts and the units are incorporated (mounted to) in the printer 1. In addition, orientations of the constituent parts and units in the in-use orientation of the printer 1 are referred to as the in-use orientations of those constituent parts and units. Additionally, hereinafter, description regarding the printer 1 and the constituent parts and units thereof is a description regarding the printer 1 and the constituent parts and units thereof in their in-use orientations, unless particularly stated otherwise.

The Z axis is an axis orthogonal to the XY plane. In the in-use state of the printer 1, the Z axis direction is the vertical upward direction. Also, in the in-use state of the printer 1, the −Z axis direction is the vertical downward direction in FIG. 12. Note that regarding each of the X, Y, and Z axes, the direction of the arrow indicates a + (positive) direction, and the opposite direction to the direction of the arrow indicates a − (negative) direction. Note that the above-described four tanks 10 are aligned along the Y axis. Therefore, the Y axis direction can also be defined as a direction in which the four tanks 10 are arranged.

The printing unit 3 is provided with a paper discharge unit 21. In the printing unit 3, the printing medium P is discharged from the paper discharge unit 21. In the printing unit 3, a face on which the paper discharge unit 21 is provided is assumed to be a front face 22. The front face 22 of the printing unit 3 and the front face 22 of the scanner unit 5 are positioned in the same plane. Accordingly, the front face 22 of the printer 1 includes the front face 22 of the printing unit 3 and the front face 22 of the scanner unit 5.

In the printer 1, a face of the scanner unit 5 directed vertically upward is assumed to be an upper face 23. The tank unit 4 is provided on a side portion facing in the X axis direction out of the side portions intersecting the front face 22 and the upper face 23. The housing 7 is provided with window portions 25. In the housing 7, the window portions 25 are provided in a side face 28 intersecting a front face 26 and an upper face 27. Here, the front face 26 of the tank unit 4 is directed in the same direction as the front face 22 of the printer 1 (in the fifth embodiment, the Y axis direction). The front face 26 of the tank unit 4 is positioned in the same plane as the front face 22 of the printer 1. Accordingly, the front face 26 of the tank unit 4 is positioned in the same plane as the front face 22 of the printing unit 3. Accordingly, in the appearance of the printer 1, unevenness between the printing unit 3 and the tank unit 4 can be reduced, and thus, it is possible to make the printer 1 unlikely to collide with the surrounding environment when the printer 1 is transported and the like.

In addition, the upper face 27 of the tank unit 4 is positioned in the Z axis direction relative to the printing unit 3. Accordingly, the upper face 27 of the tank unit 4 is positioned above the printing unit 3. Accordingly, in the appearance of the printer 1, unevenness between the printing unit 3 and the tank unit 4 can be reduced, and thus, it is possible to make the printer 1 unlikely to collide with the surrounding environment when the printer 1 is transported and the like. In addition, in this printer 1, the capacity of ink that can be stored in the tank unit 4 can be increased by expanding the tank unit 4 upward. This makes it easier to reduce lateral enlargement of the printer 1 (in the fifth embodiment, in the X axis direction).

In the tank unit 4, the window portions 25 transmit light. Additionally, the above-described four tanks 10 are provided at positions overlapping the window portions 25. Therefore, a worker that uses the printer 1 can visually check the four tanks 10 via the window portions 25. In the fifth embodiment, the window portion 25 is provided as an opening formed in the housing 7. The worker can visually check the four tanks 10 via the window portions 25 that are openings. Note that the window portion 25 is not limited to an opening, and may be constituted by a light-transmissive member, for example.

In the fifth embodiment, at least a portion of a section of each of the tanks 10 facing the window portion 25 transmits light. Ink in the tank 10 can be visually confirmed from the light-transmissive section of the tank 10. Therefore, the worker can visually confirm the amounts of ink in the tanks 10 by visually checking the four tanks 10 via the window portions 25. Accordingly, in the tank 10, at least a portion of the section facing the window portion 25 can be used as a visual checking portion that enables visual confirmation of the amount of ink.

Figure 13:
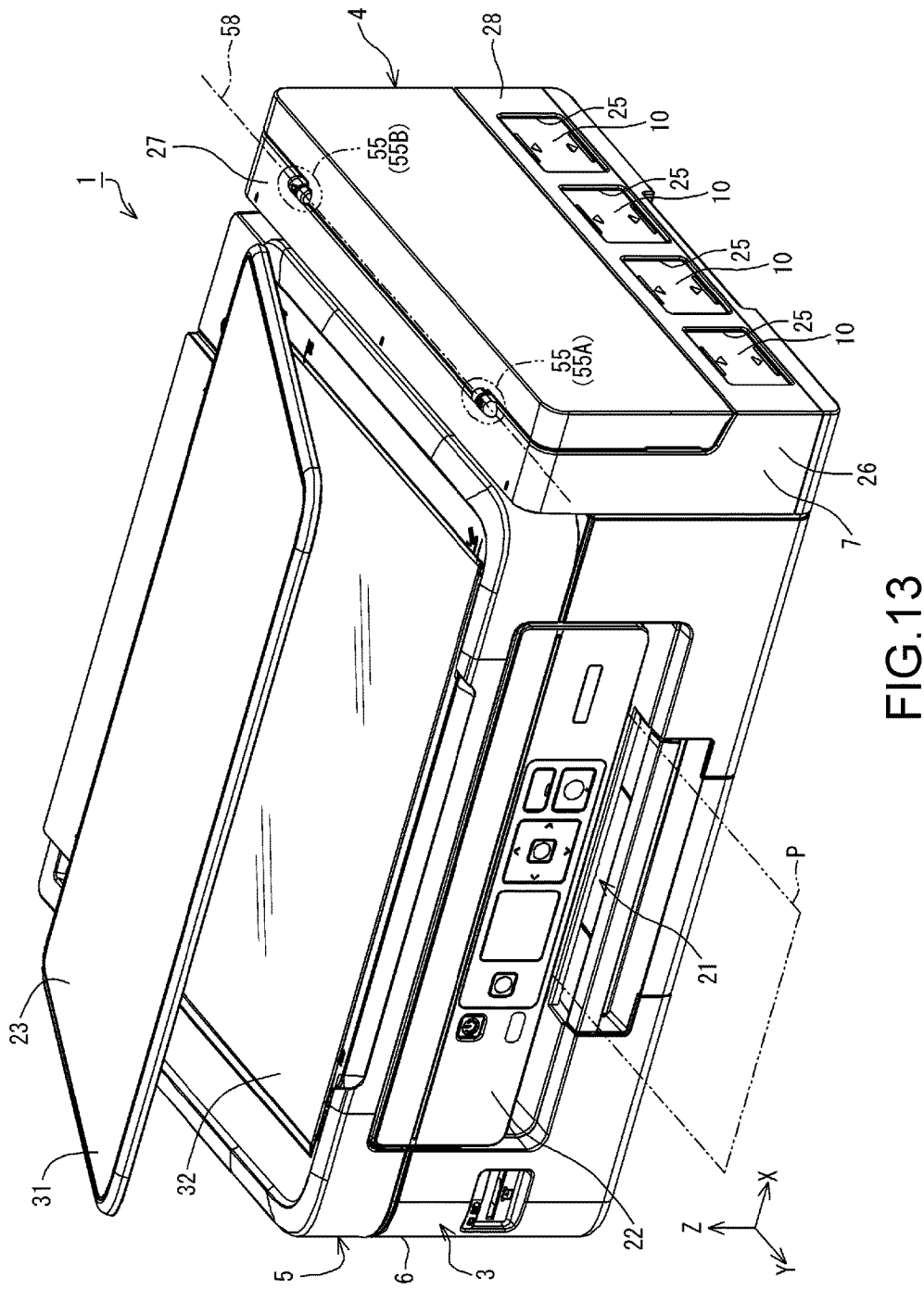
FIG. 13 is a perspective diagram showing a main configuration of the printer in the fifth embodiment.

In the printer 1, the printing unit 3 and the scanner unit 5 are overlapped on each other. In the state where the printing unit 3 is used, the scanner unit 5 is positioned vertically above the printing unit 3. The scanner unit 5 is of a flat bed type, and has a document cover 31 that rotates in an openable/closable manner, and a document placing face 32 that is exposed in the state where the document cover 31 is opened, as shown in FIG. 13. Note that FIG. 13 illustrates the state where the document cover 31 is opened. The scanner unit 5 has an imaging element (not illustrated) such as an image sensor. The scanner unit 5 can read out, as image data, an image drawn in a document such as paper placed on the document placing face 32, via the imaging element. Therefore, the scanner unit 5 functions as an apparatus for reading out an image and the like.

Here, in the in-use orientation of the printer 1, the upper face 27 of the tank unit 4 is positioned at substantially the same height as the document placing face 32 of the scanner unit 5. From the viewpoint of reducing unevenness in the appearance of the printer 1, the difference in height along the Z axis between the document placing face 32 and the upper face 27 of the tank unit 4 is preferably 10 mm or smaller. More preferably, the difference in height along the Z axis between the document placing face 32 and the upper face 27 of the tank unit 4 is 5 mm or smaller.

Figure 14:
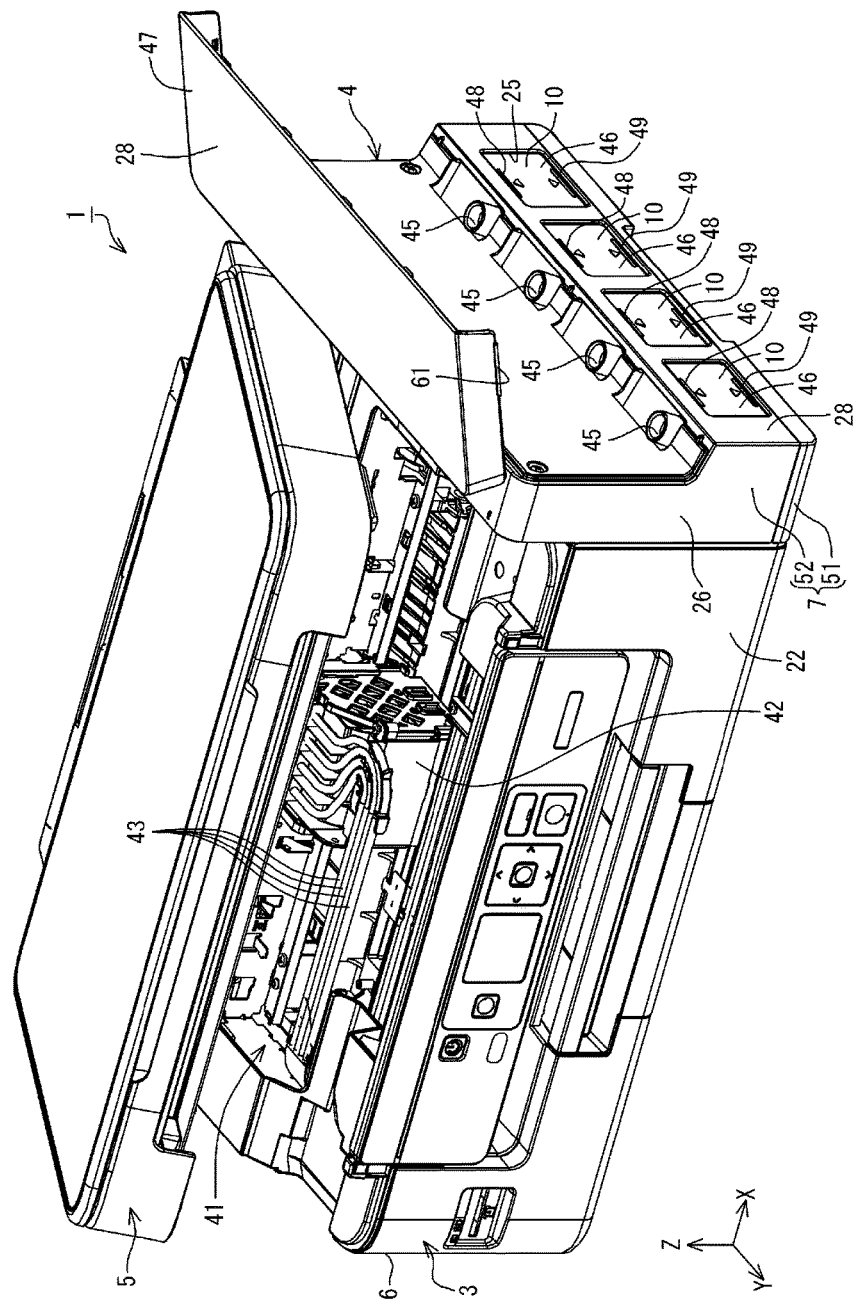
FIG. 14 is a perspective diagram showing a main configuration of the printer in the fifth embodiment.

As shown in FIG. 14, the scanner unit 5 is configured to be rotatable relative to the printing unit 3. The scanner unit 5 also functions as a lid of the printing unit 3. The worker can rotate the scanner unit 5 relative to the printing unit 3 by lifting the scanner unit 5 in the Z axis direction. Accordingly, the scanner unit 5 that functions as the lid of the printing unit 3 can be open relative to the printing unit 3. FIG. 14 illustrates the state where the scanner unit 5 is open relative to the printing unit 3.

As shown in FIG. 14, the printing unit 3 has a mechanism unit 41. The mechanism unit 41 has a printing portion 42. In the printing unit 3, the printing portion 42 is stored in the housing 6. The printing portion 42 prints onto the printing medium P that is conveyed in the Y axis direction by a conveyance apparatus (not illustrated), using ink. Note that the conveyance apparatus (not illustrated) intermittently conveys the printing medium P in the Y axis direction. The printing portion 42 is configured to be movable reciprocally along the X axis by a movement apparatus (not illustrated). The tank unit 4 supplies ink to the printing portion 42. Note that in the printer 1, at least a portion of the tank unit 4 protrudes outside the housing 6. Note that the printing portion 42 is stored in the housing 6. Accordingly, the printing portion 42 can be protected by the housing 6.

Here, a direction along the X axis is not limited to the direction completely parallel to the X axis, and also includes directions inclined due to an error, tolerance and the like, excluding directions orthogonal to the X axis. Similarly, a direction along the Y axis is not limited to the direction completely parallel to the Y axis, and also includes directions inclined due to an error, tolerance and the like, excluding directions orthogonal to the Y axis. A direction along the Z axis is not limited to the direction completely parallel to the Z axis, and also includes directions inclined due to an error, tolerance and the like, excluding directions orthogonal to the Z axis. Accordingly, directions along any axis and face are not limited to directions completely parallel to such axis and face, and also include directions inclined due to an error, tolerance and the like, except for directions orthogonal to such axis and face.

The tank unit 4 has the tanks 10. In the fifth embodiment, the tank unit 4 has a plurality of (four, in the fifth embodiment) tanks 10. The plurality of tanks 10 are positioned outside the housing 6 of the printing unit 3. The plurality of tanks 10 are stored inside the housing 7. Accordingly, the tanks 10 can be protected by the housing 7. The housing 7 is positioned outside the housing 6. The housing 7 is fixed to the housing 6 using a screw. Accordingly, the tank unit 4 is fixed to the printing unit 3 using a screw.

Note that in the fifth embodiment, the tank unit 4 has a plurality of (four) tanks 10. However, the number of the tanks 10 is not limited to four, and three tanks 10, less than three tanks 10, and more than four tanks 10 can also be adopted.

Furthermore, in the fifth embodiment, the plurality of tanks 10 are configured to be separated from each other. However, the configuration of the tank 10 that is an example of a liquid container is not limited thereto. As the configuration of the liquid container, a configuration can also be adopted in which the plurality of tanks 10 are integrated into one liquid container. In this case, one liquid container is provided with a plurality of liquid storage portions. The plurality of liquid storage portions are individually partitioned from each other, and are configured to be able to store different types of liquid. In this case, for example, ink of different colors can be individually stored in the plurality of liquid storage portions.

As shown in FIG. 14, ink supply tubes 43 are connected to the tanks 10. Ink in the tanks 10 is supplied from the tank unit 4 to the printing portion 42 via the ink supply tubes 43. The printing portion 42 is provided with a printing head (not illustrated). Nozzle openings (not illustrated) directed on the printing medium P side are formed in the printing head. The printing head is a so-called inkjet printing head. Ink supplied from the tank unit 4 to the printing portion 42 via the ink supply tubes 43 is supplied to the printing head. The ink supplied to the printing portion 42 is then discharged as ink droplets from the nozzle openings of the printing head toward the printing medium P. Note that in the above-described example, the printing unit 3 and the tank unit 4 have been described as separate constituent elements, but the tank unit 4 can be included in the configuration of the printing unit 3.

The tank 10 has an injection portion 45 and a visual checking face 46. In the tank 10, ink can be injected from outside the tank 10 into the tank 10 via the injection portion 45. Note that the worker can access the injection portion 45 of the tank 10 from outside the housing 7 by opening a cover 47 of the housing 7. The visual checking face 46 opposes the window portion 25. The worker can visually confirm the amount of ink in the tank 10 by visually checking the visual checking face 46 of the tank 10 via the window portion 25.

Note that as the tank 10, a configuration can also be adopted in which an upper limit mark 48, a lower limit mark 49, and the like are added to the visual checking face 46. The worker can understand the amount of ink in the tank 10 using the upper limit mark 48 and the lower limit mark 49 as indicators. Note that the upper limit mark 48 indicates a guide for the amount of ink that will not overflow from the injection portion 45 when ink is injected from the injection portion 45. Also, the lower limit mark 49 indicates a guide for the amount of ink when ink injection is prompted. A configuration can also be adopted in which at least one of the upper limit mark 48 and the lower limit mark 49 is provided in the tank 10.

In addition, the housing 7 and the housing 6 may be separated from each other or may be integrated. If the housing 7 and the housing 6 are integrated, it can be said that the plurality of tanks 10 are stored inside the housing 6 along with the printing portion 42 and the ink supply tubes 43. If the housing 7 and the housing 6 are integrated, the housing 6 corresponds to an exterior portion that stores the liquid containers and the liquid jet head.

In addition, the arrangement location of the tanks 10 is not limited to the side portion side in the X axis direction of the housing 6 (FIG. 12). As the arrangement location of the tanks 10, the front face side in the Y axis direction of the housing 6 can also be adopted, for example.

In the printer 1 having the above-described configuration, by conveying the printing medium P in the Y axis direction, and causing the printing head of the printing portion 42 to discharge ink droplets at a predetermined position while reciprocally moving the printing portion 42 along the X axis, printing is performed onto the printing medium P.

Ink is not limited to either water-based ink or oil-based ink. In addition, as water-based ink, either ink having a configuration in which a solute such as dye is dissolved in an aqueous solvent or ink having a configuration in which a dispersoid such as pigment is dispersed in an aqueous dispersion medium may be adopted. Also, as oil-based ink, either ink having a configuration in which a solute such as dye is dissolved in an oil-based solvent or ink having a configuration in which a dispersoid such as pigment is dispersed in an oil-based dispersion medium may be adopted.

In the tank unit 4, the housing 7 includes a first housing 51 and a second housing 52, as shown in FIG. 14. The first housing 51 is positioned in the −Z axis direction relative to the plurality of tanks 10. The plurality of tanks 10 are supported by the first housing 51 and the housing 6. However, a configuration for supporting the tanks 10 is not limited thereto. In addition, the second housing 52 is positioned in the Z axis direction relative to the first housing 51, and covers the plurality of tanks 10 from the Z axis direction of the first housing 51. The plurality of tanks 10 are covered by the first housing 51 and the second housing 52.

Figure 15:
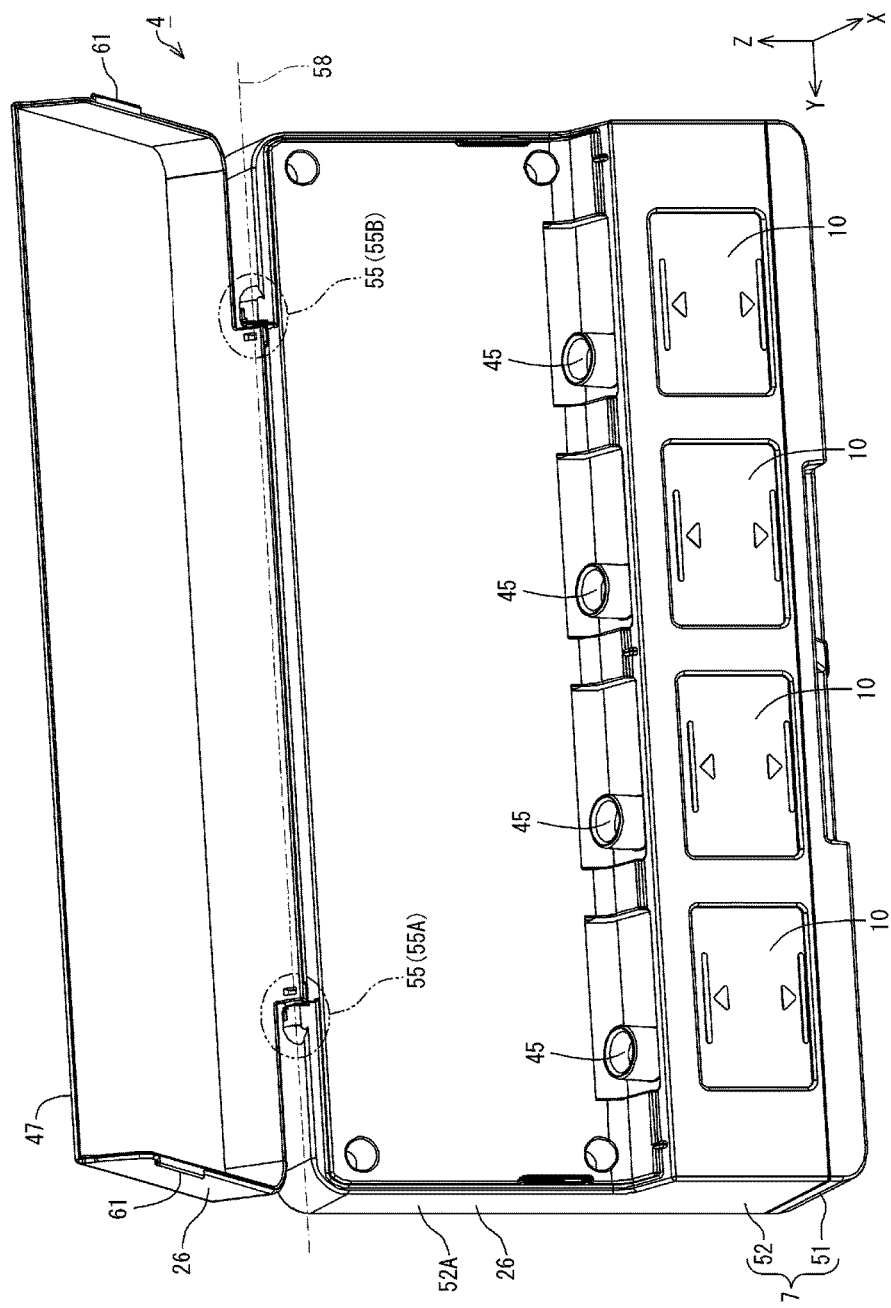
FIG. 15 is a perspective diagram showing a tank unit in the fifth embodiment.

The second housing 52 has the cover 47. The cover 47 is positioned at the end portion in the X axis direction of the second housing 52. The cover 47 constitutes a portion of the side face 28 facing in the X axis direction. As shown in FIG. 15, the cover 47 is configured to be rotatable relative to a main body 52A of the second housing 52. FIGS. 14 and 15 illustrate the state where the cover 47 is open relative to the main body 52A of the second housing 52. When the cover 47 is open relative to the main body 52A of the second housing 52, the injection portions 45 of the plurality of tanks 10 are exposed. This makes it possible for the worker to access the injection portion 45 of the tank 10 from outside the housing 7. Note that the injection portion 45 is sealed by a cap member (not illustrated). When ink is injected into the tank 10, the cap member is removed from the injection portion 45 to release the injection portion 45, and ink is then injected. Note that in the printer 1, in the in-use orientation, the injection portion 45 is directed upward relative to the horizontal direction.

Rotation of the cover 47 relative to the main body 52A of the second housing 52 can be achieved by hinge units 55 shown in FIG. 15. The hinge units 55 are provided in the upper face 27 of the second housing 52. In the fifth embodiment, two hinge units 55 are provided. The two hinge units 55 are aligned along the Y axis. Hereinafter, if each of the two hinge units 55 are to be identified, the two hinge units 55 are written as a hinge unit 55A and a hinge unit 55B. The hinge units 55 are provided between the cover 47 and the main body 52A of the second housing 52. Note that the hinge unit 55A is positioned in the Y axis direction relative to the hinge unit 55B. The hinge unit 55A and the hinge unit 55B are configured to be symmetrical to each other relative to the XZ plane.

Figure 16:
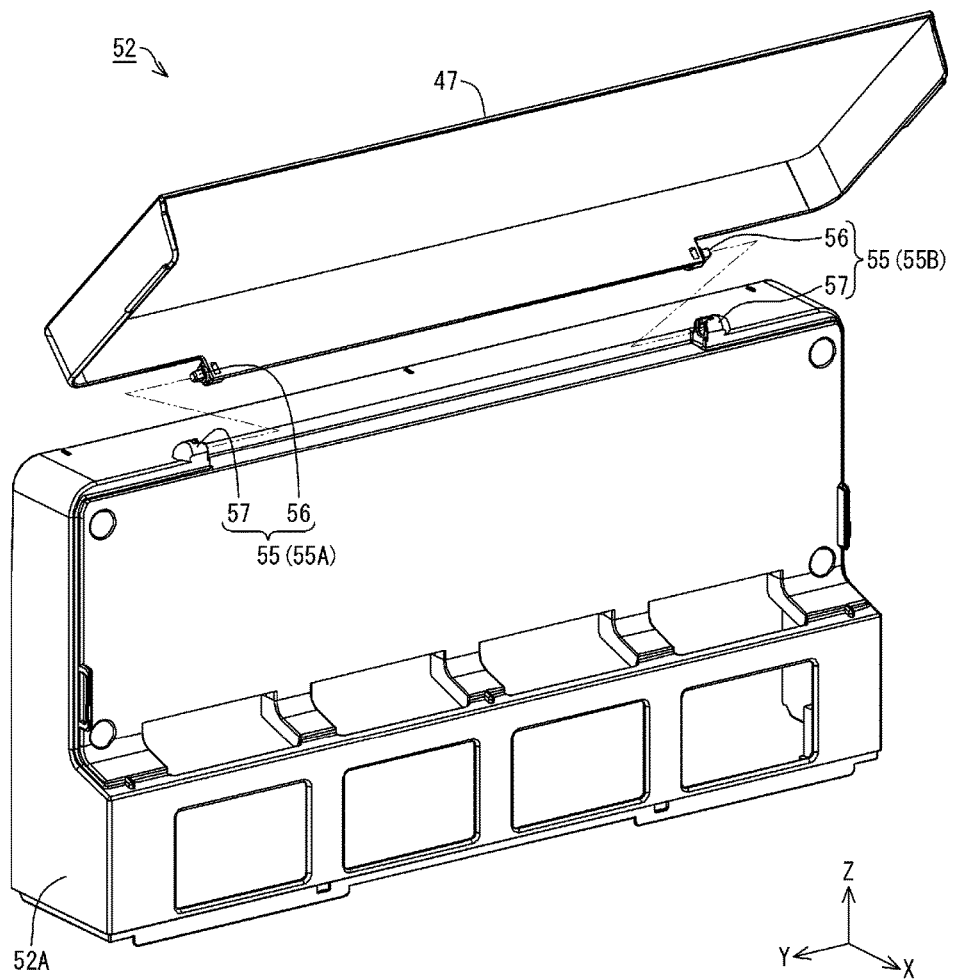
FIG. 16 is an exploded perspective diagram showing a housing of the tank unit in the fifth embodiment.

As shown in FIG. 16, the hinge unit 55 includes a hinge shaft 56 and a bearing 57. In the fifth embodiment, the hinge shaft 56 is provided in the cover 47, and the bearing 57 is provided in the main body 52A. However, the configuration of the hinge unit 55 is not limited to this, and a configuration can also be adopted in which the hinge shaft 56 is provided in the main body 52A, and the bearing 57 is provided in the cover 47. The hinge shaft 56 extends along the Y axis. In the hinge unit 55A, the hinge shaft 56 protrudes from the cover 47 in the Y axis direction. Also, in the hinge unit 55B, the hinge shaft 56 protrudes from the cover 47 in the −Y axis direction. The bearing 57 is configured such that the hinge shaft 56 can be inserted thereinto.

In the state where the cover 47 is closed relative to the main body 52A, or in other words, in the state of the in-use orientation, the hinge shaft 56 is provided at the end portion in the Z axis direction of the cover 47. The bearing 57 is provided at the end portion in the Z axis direction of the main body 52A. The hinge shaft 56 of the hinge unit 55A is inserted into the bearing 57 of the hinge unit 55A, and the hinge shaft 56 of the hinge unit 55B is inserted into the bearing 57 of the hinge unit 55B. Accordingly, in the second housing 52, as shown in FIG. 15, the cover 47 is configured to be rotatable relative to the main body 52A using a rotation axis 58 as a rotation center. Note that the rotation axis 58 runs along a direction in which the Y axis extends.

In addition, as shown in FIG. 15, the cover 47 is provided with handle portions 61. A handle portion 61 is provided in the front face 26 of the tank unit 4. In addition, a handle portion 61 is also provided in the back face that is on the opposite side to the front face 26. In the fifth embodiment, the handle portion 61 provided in the front face 26 protrudes from the front face 26 of the cover 47 in the −Y axis direction. In the cover 47, the handle portion 61 provided in the back face that is on the opposite side to the front face 26 protrudes from the back face of the cover 47 in the −Y axis direction.

As described above, the front face 26 of the tank unit 4 is directed in the same direction as the front face 22 of the printer 1 (FIG. 14) (in the fifth embodiment, the Y axis direction). The front face 22 of the printer 1 is also the front face 22 of the printing unit 3. Accordingly, the handle portion 61 provided in the front face 26 out of the handle portions 61 of the tank unit 4 is provided in a portion facing in the same direction as a direction in which the front face 22 of the printing unit 3 is directed. In this tank unit 4, the cover 47 is provided with the handle portions 61, and thus the cover 47 can be opened/closed by placing the fingers of a hand on the handle portions 61. Note that the number of the handle portions 61 is not limited to two, and one handle portion 61 or two or more handle portions 61 can also be adopted.

Figure 17:
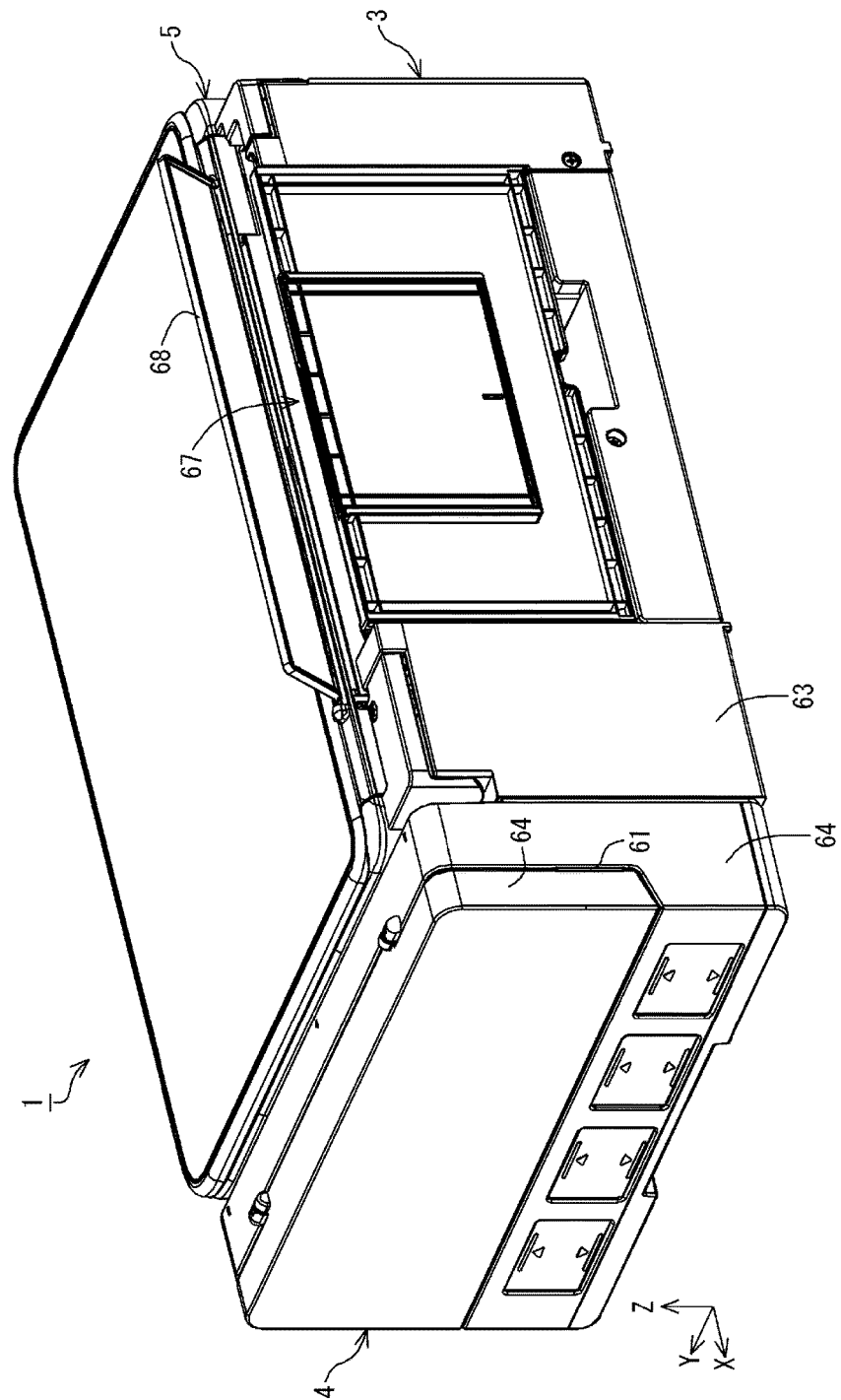
FIG. 17 is a perspective diagram showing a main configuration of the printer in the fifth embodiment.

Here, a back face 63 is positioned on the opposite side to the front face 22 of the printer 1, as shown in FIG. 17. The back face 63 of the printer 1 is also the back face 63 of the printing unit 3. In addition, in the tank unit 4, a face directed in the same direction as the back face 63 of the printer 1 (in the fifth embodiment, the −Y axis direction) is a back face 64 of the tank unit 4. The handle portion 61 positioned on the opposite side to the front face 26 (FIG. 15) out of the above-described handle portions 61 is provided in the back face 64 of the cover 47.

The back face 64 of the tank unit 4 is directed in the same direction as the back face 63 of the printer 1 (in the fifth embodiment, the −Y axis direction). In the fifth embodiment, the back face 64 of the tank unit 4 is positioned in the same plane as the back face 63 of the printer 1. In other words, the back face 64 of the tank unit 4 is positioned in the same plane as the back face 63 of the printing unit 3. Accordingly, in the appearance of the printer 1, unevenness between the printing unit 3 and the tank unit 4 can be reduced, and thus, when the printer 1 is transported and the like, the printer 1 can be made unlikely to collide with the surrounding environment.

Figure 18:
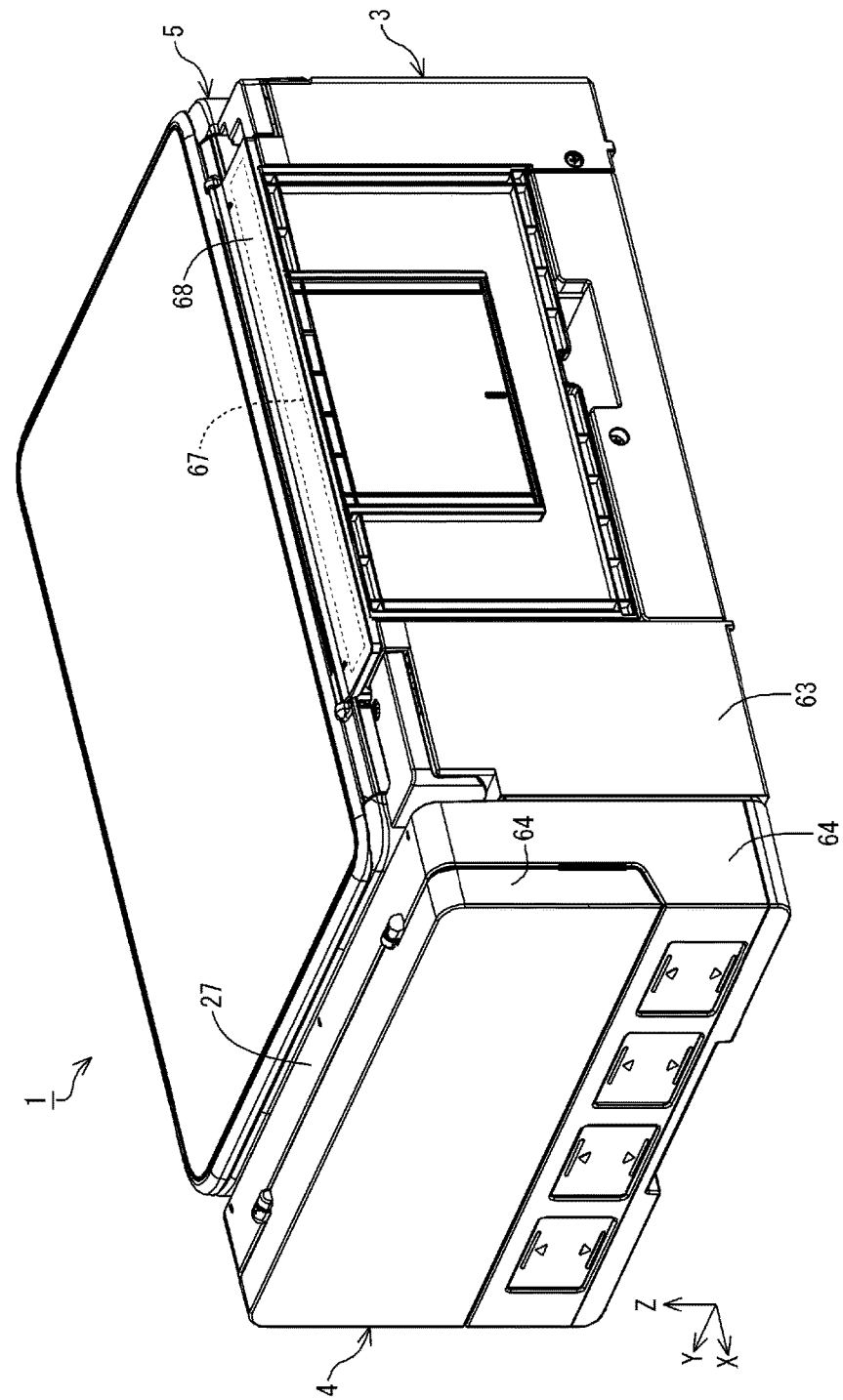
FIG. 18 is a perspective diagram showing a main configuration of the printer in the fifth embodiment.

In addition, in the printer 1, a supply port 67 through which the printing medium P can be supplied is provided in the upper face of the printing unit 3. The printing medium P fed into the supply port 67 is supplied from the supply port 67 to the mechanism unit 41 (FIG. 14) of the printing unit 3. A lid 68 is provided in the upper face of the printing unit 3. The lid 68 is configured to be rotatable relative to the printing unit 3, and opens/closes the supply port 67. FIG. 17 illustrates the state where the lid 68 is open relative to the printing unit 3. The worker supplies the printing medium P to the supply port 67 in the state where the lid 68 is open relative to the printing unit 3. When the lid 68 is closed relative to the printing unit 3, as shown in FIG. 18, the supply port 67 is blocked by the lid 68. The lid 68 is provided in the Z axis direction of the supply port 67. When the lid 68 is closed relative to the printing unit 3, the supply port 67 is blocked by the lid 68 from above, or in other words, from the Z axis direction of the supply port 67.

Here, in the in-use orientation of the printer 1, in the state where the lid 68 is closed relative to the printing unit 3, the upper face 27 of the tank unit 4 is positioned at substantially the same height as the upper face of the lid 68. Accordingly, in the appearance of the printer 1, unevenness between the printing unit 3 and the tank unit 4 can be reduced, and thus, when the printer 1 is transported and the like, the printer 1 can be made unlikely to collide with the surrounding environment. From the viewpoint of reducing unevenness in the appearance of the printer 1, the difference in height along the Z axis between the lid 68 and the upper face 27 of the tank unit 4 is preferably 10 mm or smaller. More preferably, the difference in height along the Z axis between the lid 68 and the upper face 27 of the tank unit 4 is 5 mm or smaller.

In addition, in the fifth embodiment, in the in-use orientation of the printer 1, the rotation axis 58 of the hinge units 55 shown in FIG. 13 is positioned at substantially the same height as the document placing face 32 of the scanner unit 5. According to this configuration, it is possible to make it easier to widen the rotatable range when the cover 47 is open relative to the main body 52A. Accordingly, it is possible to make it easier to avoid the cover 47 overlapping the injection portion 45 of the tank 10 from above when the cover 47 of the tank unit 4 is rotated to the open position, and thus it is possible to make it easier to inject ink into the injection portion 45. Note that the difference in height along the Z axis between the document placing face 32 and the rotation axis 58 of the tank unit 4 is preferably 5 mm or smaller from the viewpoint of widening the rotatable range. More preferably, the difference in height along the Z axis between the document placing face 32 and the rotation axis 58 of the tank unit 4 is 2 mm or smaller.

Figure 19:
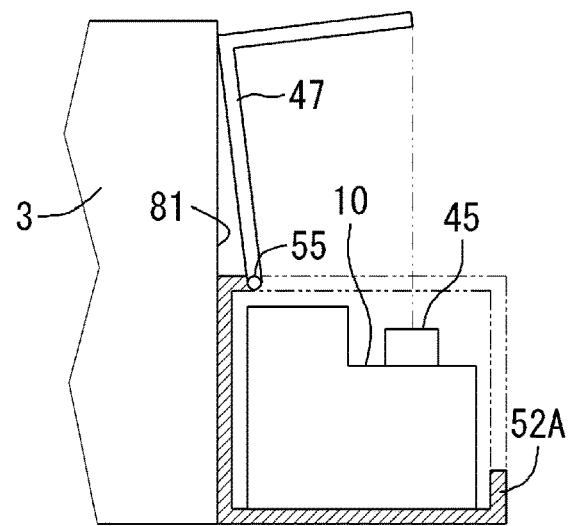
FIG. 19 is a schematic cross-sectional diagram illustrating issues of conventional techniques.

Here, in a configuration in which the rotation axis 58 is positioned below the document placing face 32 so as to exceed the above-described range, as shown in FIG. 19, when the cover 47 is opened, the cover 47 hits a side portion 81 of the printer 1, and the rotation range is likely to be narrow. In this configuration, it is conceivable that a portion of the cover 47 overlaps the injection portion 45 of the tank 10 when the cover 47 of the tank unit 4 is rotated to the open position. An upper portion of the injection portion 45 is then blocked by the cover 47, which is likely to obstruct the injection of ink.

Figure 20:
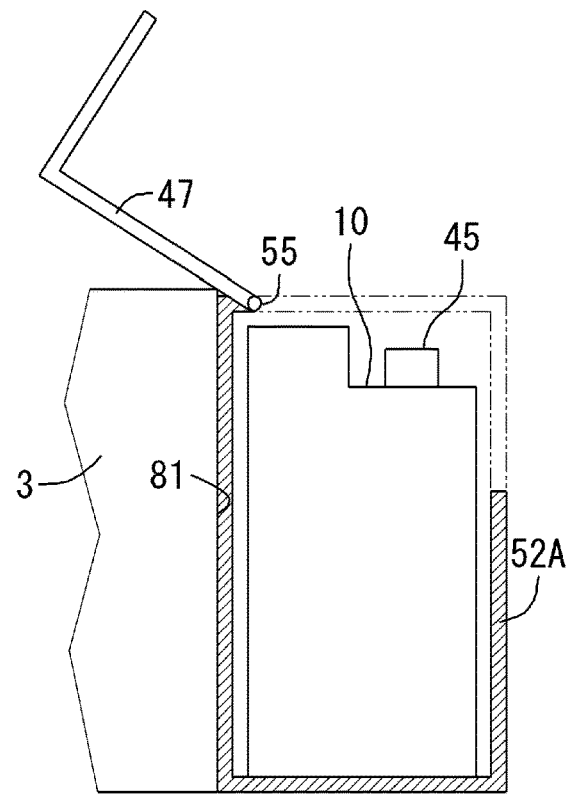
FIG. 20 is a schematic cross-sectional diagram illustrating effects in the fifth embodiment.

For such an issue, in the fifth embodiment, as shown in FIG. 20, the rotation range of the cover 47 can be widened, and thus it is possible to make it easier to avoid the cover 47 overlapping the injection portion 45 of the tank 10 from above when the cover 47 of the tank unit 4 is rotated to the open position.

The configuration of the printer 1 is not limited to a configuration in which the rotation axis 58 of the hinge units 55 is at substantially the same height as the document placing face 32 of the scanner unit 5. As the configuration of the printer 1, a configuration can also be adopted in which the rotation axis 58 of the hinge units 55 is positioned higher than the document placing face 32 of the scanner unit 5. If the rotation axis 58 is positioned higher than the document placing face 32, the rotation range of the cover 47 can be further widened. Therefore, it possible to make it easier to avoid the cover 47 overlapping the injection portion 45 of the tank 10 from above when the cover 47 of the tank unit 4 is rotated to the open position.

Figure 21:
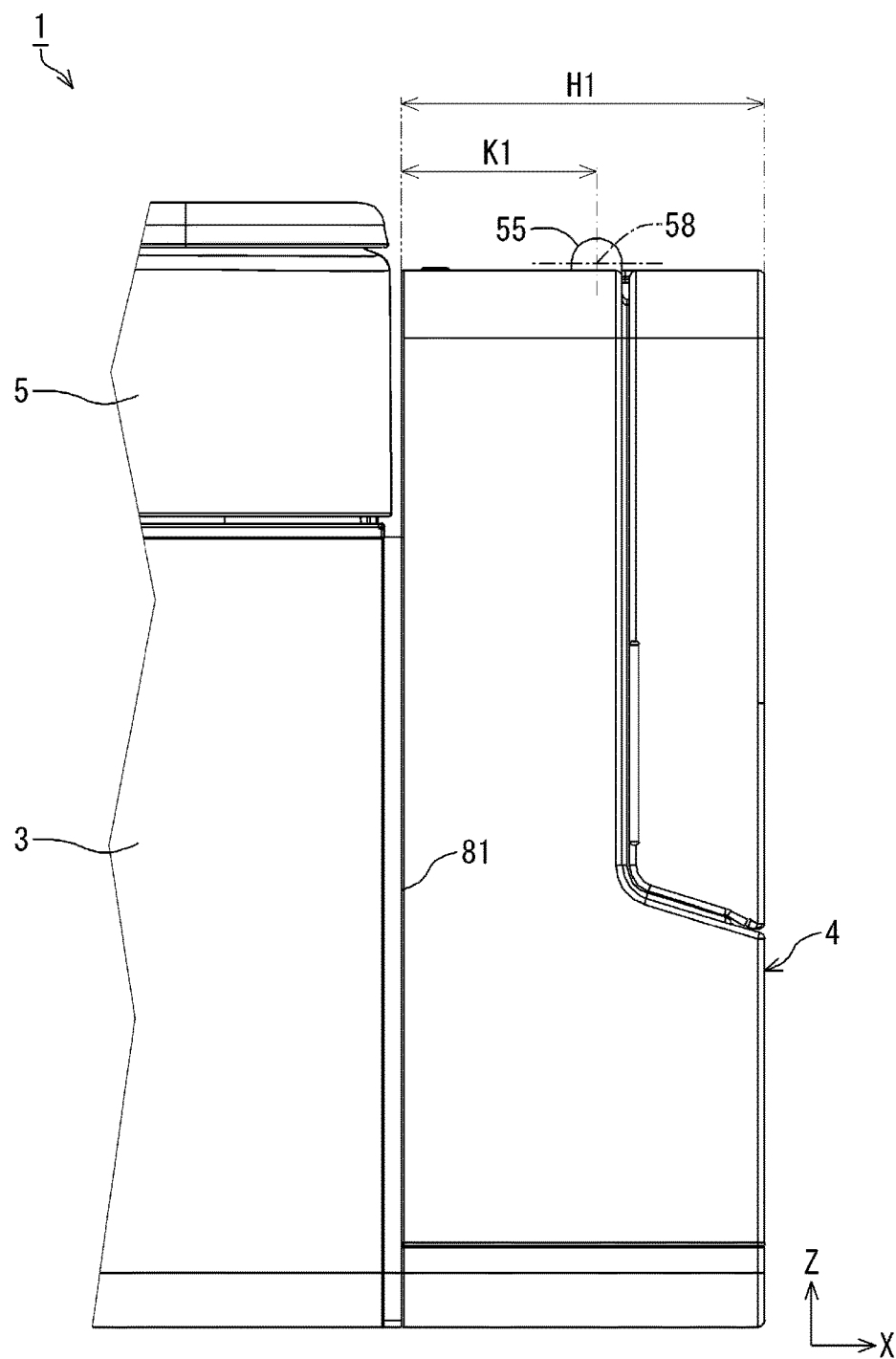
FIG. 21 is a front diagram showing the tank unit in the fifth embodiment.

In addition, in the fifth embodiment, as shown in FIG. 21, when the tank unit 4 is viewed in the −Y axis direction, in the state where the cover 47 is closed relative to the main body 52A, a distance K1 along the X axis direction from the end portion on the printing unit 3 side of the housing 7 to the hinge unit 55 is at least half a width dimension H1 of the tank unit 4. The state where the tank unit 4 is viewed in the −Y axis direction corresponds to the state where the tank unit 4 is viewed in the direction along the rotation axis 58 of the hinge units 55. In addition, in the fifth embodiment, the X axis direction corresponds to the first direction. Accordingly, in the fifth embodiment, the X axis direction is a direction from the side portion 81 of the printing unit 3 toward the tank unit 4.

Figure 22:
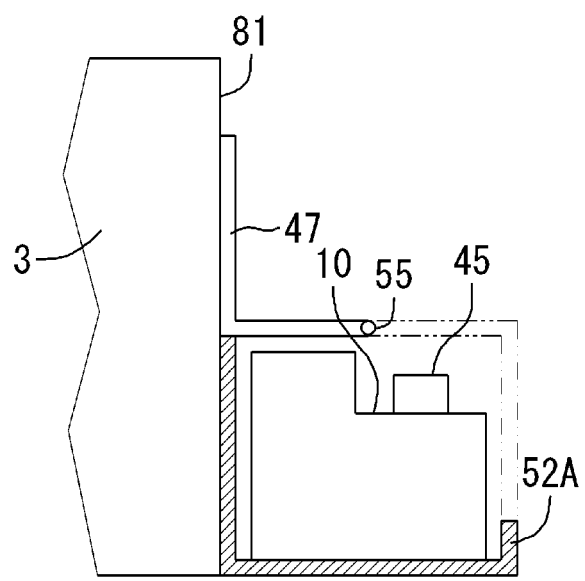
FIG. 22 is a schematic cross-sectional diagram illustrating effects in the fifth embodiment.

According to the above-described configuration, as shown in FIG. 22, it is easy to avoid the cover 47 hitting the side portion 81 of the printer 1 when the cover 47 is opened. Therefore, the rotation range of the cover 47 can be widened, and thus it is possible to make it easier to avoid the cover 47 overlapping the injection portion 45 of the tank 10 from above when the cover 47 of the tank unit 4 is rotated to the open position. As a result, it is possible to make it easier to inject ink into the injection portion 45. Note that in the fifth embodiment, the value of the distance K1 is larger than the value of half of the width dimension H1. Accordingly, it is possible to further widen the rotatable range when the cover 47 is open relative to the main body 52A.

Various working examples of the housing 7 of the tank unit 4 in the fifth embodiment will be described. Note that in the following description, in order to identify the housing 7 for each working example, alphabetical characters, signs and the like different for each working example are added to the reference numeral of the housing 7.

Working Example 1

Figure 24:
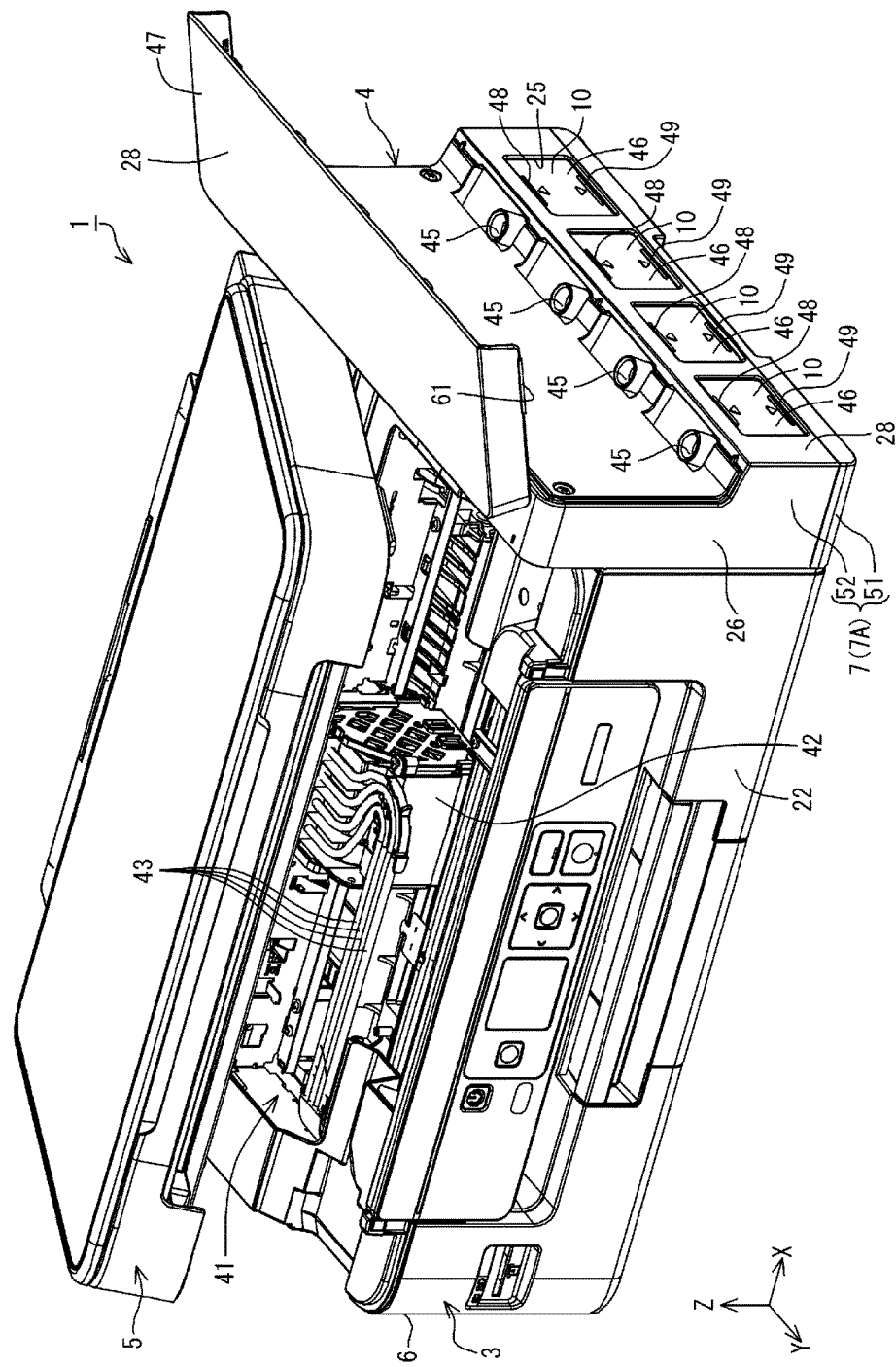
FIG. 24 is a perspective diagram showing a main configuration of the printer in the fifth embodiment
Figure 26:
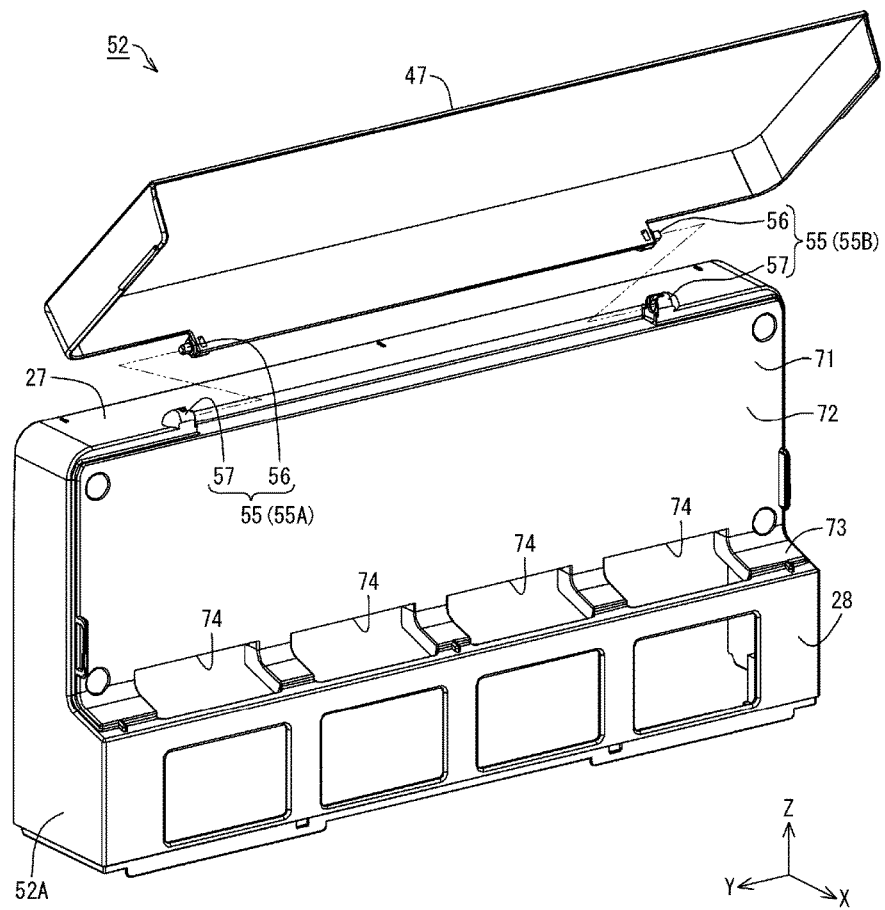
FIG. 26 is an exploded perspective diagram showing a housing of the tank unit in Working Example 1.

A housing 7A of Working Example 1 will be described. As shown in FIG. 24, the housing 7A includes a first housing 51 and a second housing 52. As shown in FIG. 26, a main body 52A of the second housing 52 has a portion to be covered 71. The portion to be covered 71 is a portion that is covered by a cover 47 in a state where the cover 47 is closed relative to the main body 52A. The portion to be covered 71 includes a wall 72 facing in the X axis direction and a wall 73 facing in a direction intersecting the wall 72. The wall 72 is positioned in the −X axis direction relative to a side face 28. The wall 73 is positioned in the −Z axis direction relative to an upper face 27. Four opening portions 74 are formed in the portion to be covered 71. The four opening portions 74 are respectively formed in correspondence with the arrangement of tanks 10. The opening portions 74 are formed at the intersection between the wall 72 and the wall 73.

Figure 23:
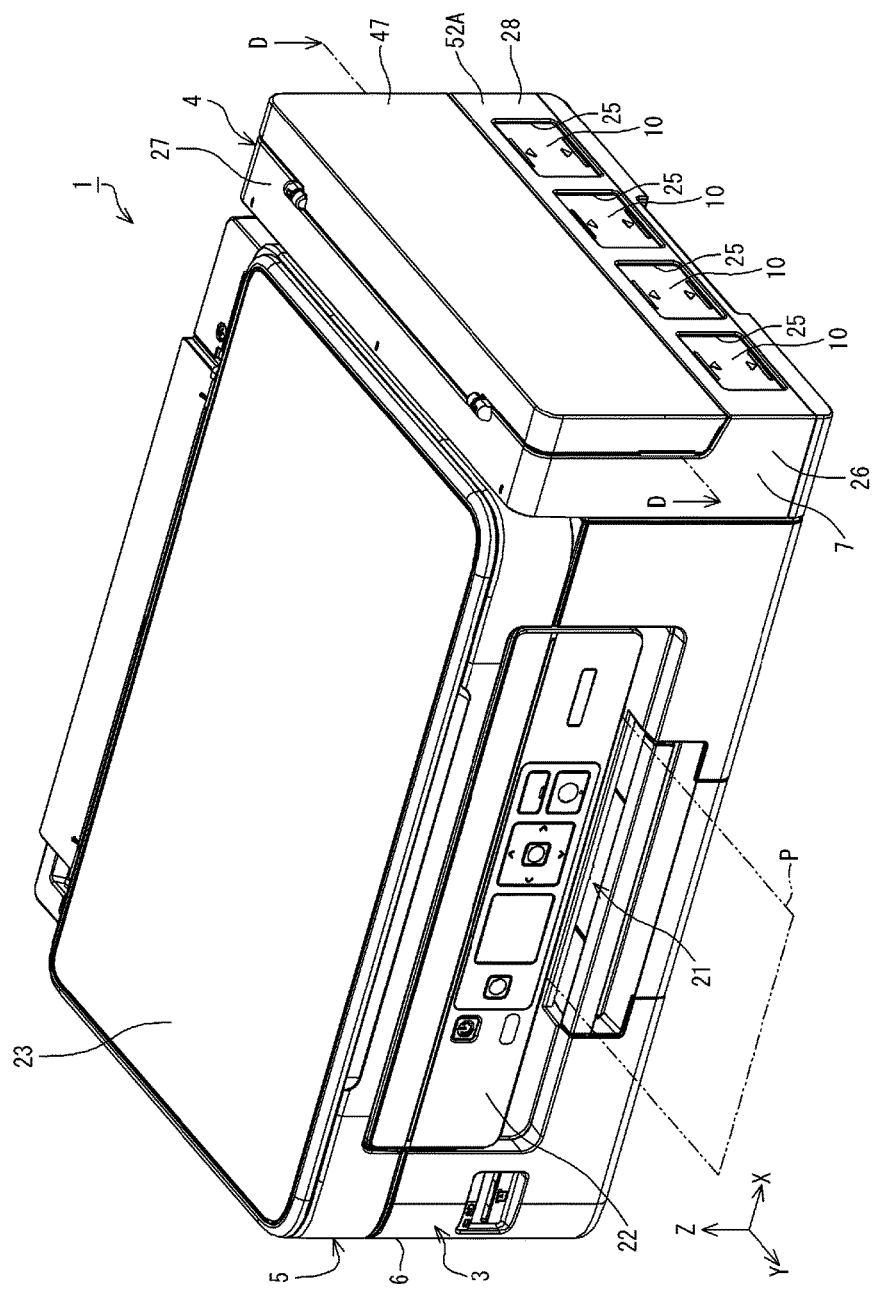
FIG. 23 is a perspective diagram showing a main configuration of the printer in the fifth embodiment.
Figure 25:
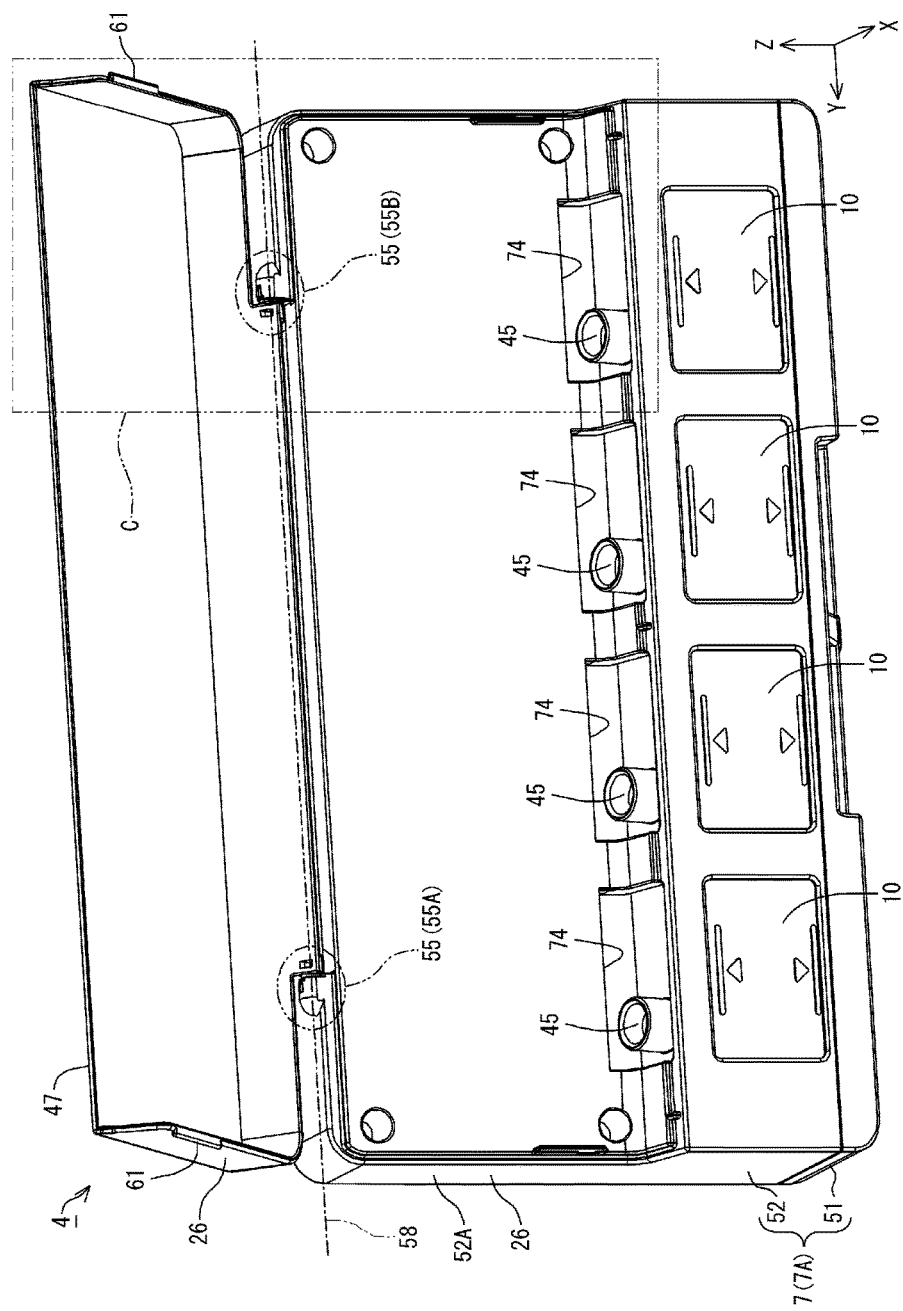
FIG. 25 is a perspective diagram showing a tank unit in Working Example 1.

As shown in FIG. 25, in the state where the tanks 10 are stored in the main body 52A of the second housing 52, the injection portions 45 of the tanks 10 are exposed from the opening portions 74. In addition, as shown in FIG. 23, in the state where the cover 47 is closed relative to the main body 52A, the portion to be covered 71 of the main body 52A and the injection portions 45 of the tanks 10 (FIG. 25) are covered by the cover 47. Note that the position of the cover 47 relative to the main body 52A in the state where the cover 47 is closed relative to the main body 52A, or in other words, in the state where the portion to be covered 71 of the main body 52A and the injection portions 45 of the tanks 10 (FIG. 25) are covered by the cover 47 is written as a closed position.

Figure 27:
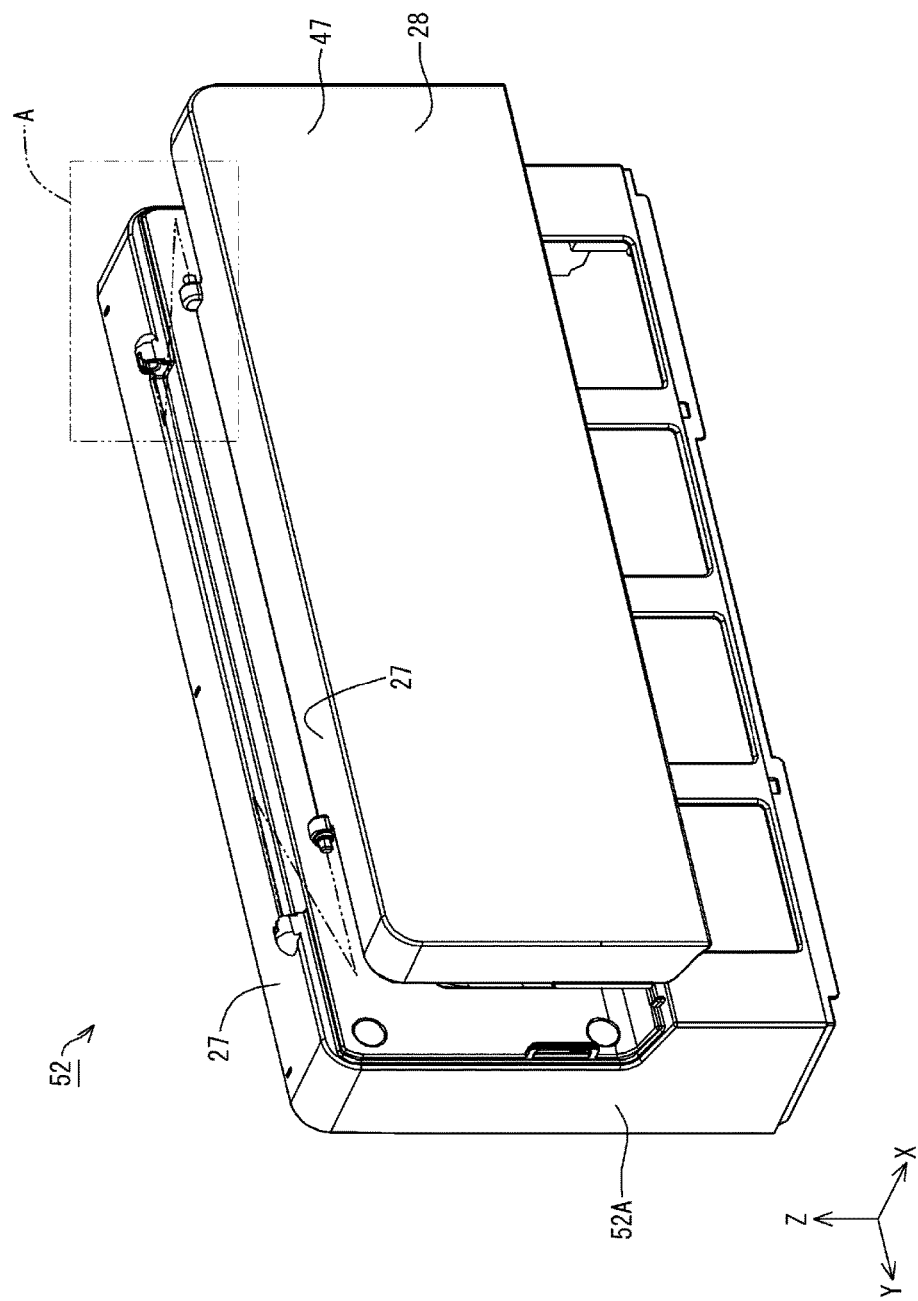
FIG. 27 is an exploded perspective diagram showing the housing of the tank unit in Working Example 1.

Here, the upper face 27 of the second housing 52 can be separated into the upper face 27 of the main body 52A and the upper face 27 of the cover 47 as shown in FIG. 27. At this time, the upper face 27 of the cover 47 is an example of a first outer wall face, and the upper face 27 of the main body 52A is an example of a second outer wall face. Also, the side face 28 of the cover 47 is an example of a third outer face. In the fifth embodiment, the upper face 27 of the main body 52A and the upper face 27 of the cover 47 are positioned in the same plane. In the state where the cover 47 is closed relative to the main body 52A, when the second housing 52 is viewed in the −Y axis direction, the upper face 27 extends in the X axis direction. Specifically, in the state where the cover 47 is closed relative to the main body 52A in the in-use orientation of the printer 1, the upper face 27 of the main body 52A and the upper face 27 of the cover 47 extend in the horizontal direction. In addition, in the state where the cover 47 is closed relative to the main body 52A in the in-use orientation of the printer 1, when the second housing 52 is viewed in the −Y axis direction, the side face 28 of the cover 47 intersects the upper face 27, and extends in the −Z axis direction, or in other words, vertically downward.

Figure 28:
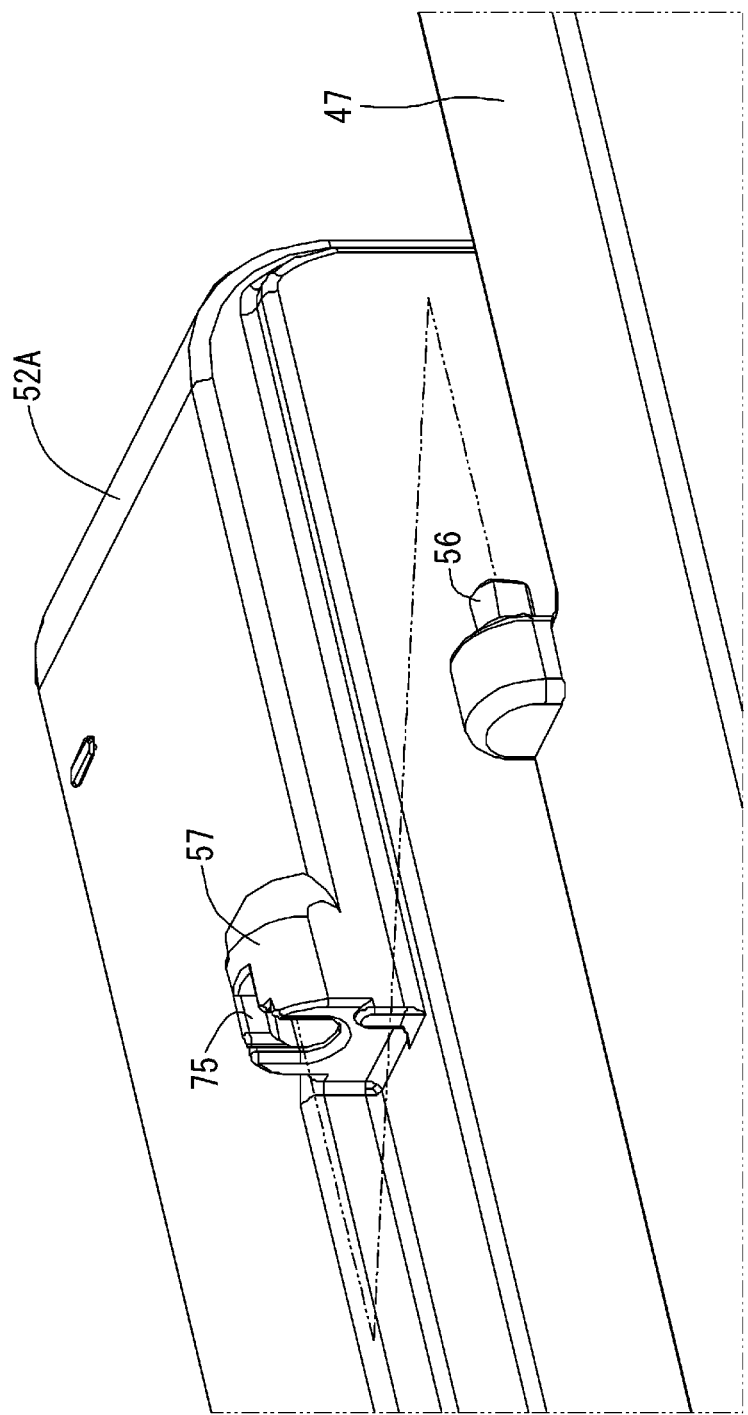
FIG. 28 is an enlarged diagram of a portion A in FIG. 27.

As shown in FIG. 28, which is an enlarged diagram of a portion A in FIG. 27, a slit 75 is formed in the bearing 57. The slit 75 passes from the outer periphery of the bearing 57 to the inside the bearing 57. The hinge shaft 56 can be mounted into the bearing 57 via the slit 75 formed in the bearing 57. By pressing the hinge shaft 56 into the slit 75 in the −Z axis direction, the hinge shaft 56 can be inserted into the bearing 57. This makes it possible to mount the hinge shaft 56 into the bearing 57. Also, by pulling the hinge shaft 56 out from the slit 75 in the Z axis direction, the hinge shaft 56 can be extracted from the bearing 57. This makes it possible to remove the hinge shaft 56 from the bearing 57. Accordingly, the cover 47 configured to be mountable/removable to/from the main body 52A.

Figure 29:
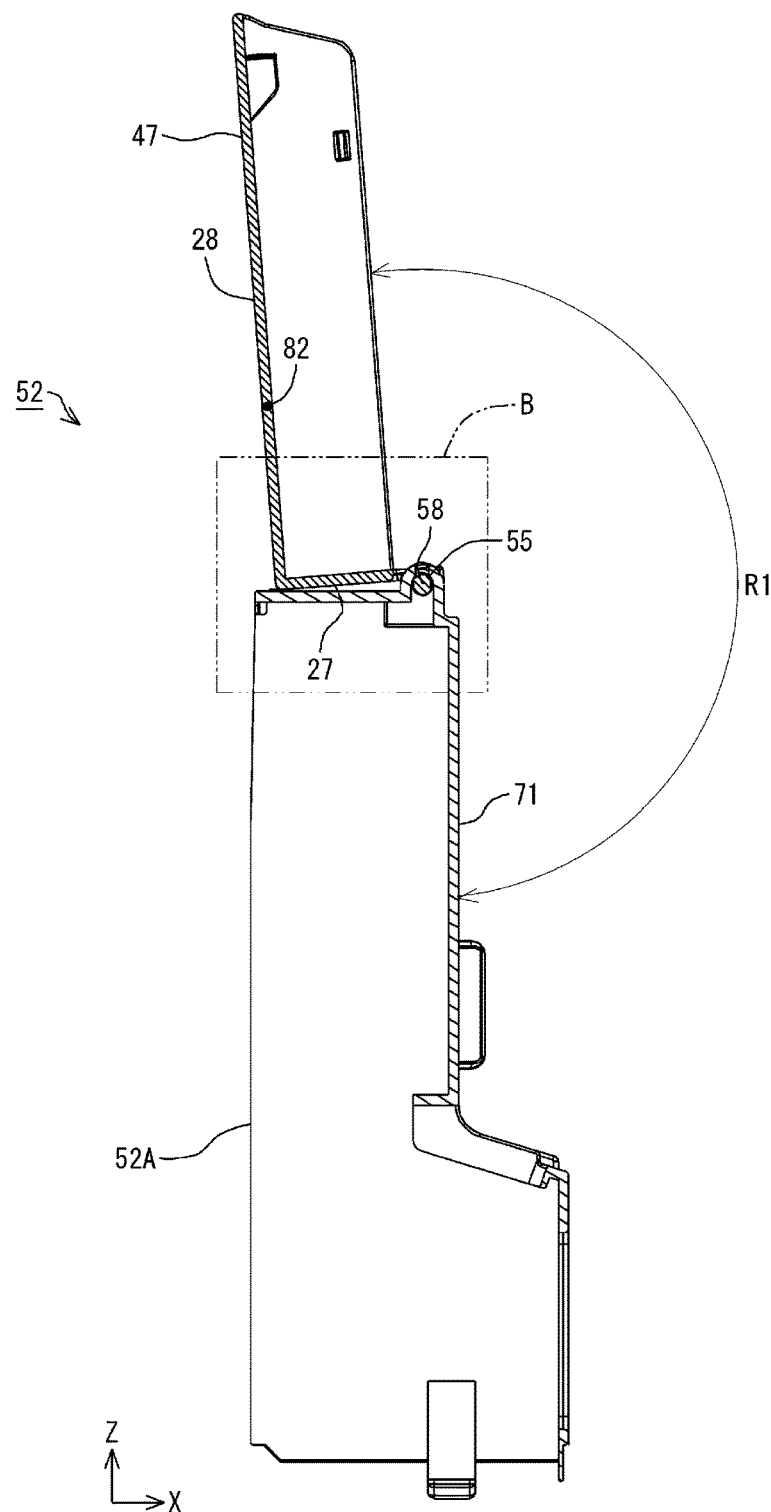
FIG. 29 is a cross-sectional diagram showing the housing of the tank unit in Working Example 1.

In the fifth embodiment, as shown in FIG. 29, the cover 47 can be opened to an angle R1 of 180° or an angle R1 exceeding 180° relative to the main body 52A centered on the hinge units 55. FIG. 29 shows a cross section of the second housing 52 when cut along the XZ plane passing through the hinge units 55. When the cover 47 is displaced from the closed position to a position where the cover 47 is opened at the angle R1 of 180° or the angle R1 exceeding 180° relative to the main body 52A centered on the hinge units 55, the upper face 27 and the side face 28 of the cover 47 are also displaced to a position where they are rotated at the angle of 180° or an angle exceeding 180°. The upper face 27 and the side face 28 of the cover 47 are examples of wall portions. The upper face 27 of the cover 47 is an example of a first outer wall face. The angle R1 of 180° or the angle R1 exceeding 180° are established by the following requirement 1 and requirement 2.

Requirement 1

Figure 30:
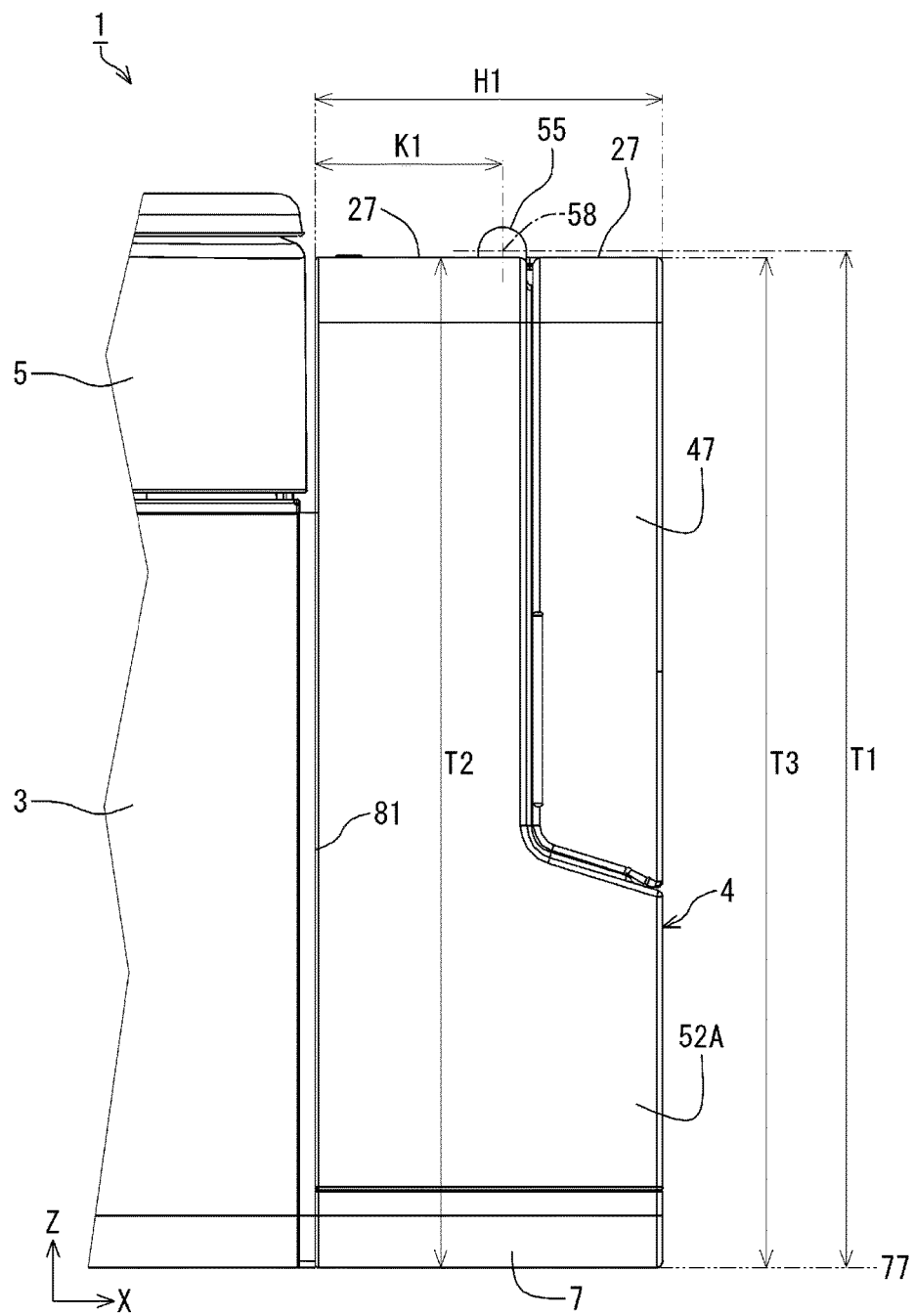
FIG. 30 is a front diagram showing the tank unit in Working Example 1.

In the in-use orientation of the printer 1, the rotation axis 58 of the hinge units 55 is positioned vertically above at least one of the upper face 27 of the main body 52A and the upper face 27 of the cover 47 as shown in FIG. 30. This requirement is assumed to be the requirement 1.

Requirement 2

As shown in FIG. 30, in the in-use orientation of the printer 1, when a distance along a vertical line from a mounting face 77 that is a face on which the printer 1 is placed to the rotation axis 58 is assumed as a distance T1, a distance along a vertical line from the mounting face 77 to the upper face 27 of the main body 52A is assumed as a distance T2, and a distance along the vertical line from the mounting face 77 to the upper face 27 of the cover 47 is assumed as a distance T3, the distance T1, the distance T2, and the distance T3 have a relationship (T1−T2)+(T1−T3) ≥0. This requirement is assumed to be Requirement 2. Note that in Working Example 1, the distance T1, the distance T2, and the distance T3 have a relationship T1>T2=T3. Therefore, Requirement 2 is satisfied.

According to the above-described configuration, the cover 47 can be opened to the angle R1 of 180° or the angle R1 exceeding 180° relative to the main body 52A. Therefore, it is possible to make it easier to avoid the cover 47 overlapping the injection portion 45 of the tank 10 from above when the cover 47 of the tank unit 4 is rotated in a direction in which the cover 47 is open relative to the main body 52A. As a result, it is possible to make it easier to inject ink into the injection portion 45.

In addition, in the fifth embodiment, as shown in FIG. 29, if the cover 47 is opened at the angle R1 of 180° relative to the main body 52A, in the state where the second housing 52 is seen in the −Z axis direction in a planar view, the cover 47 is included inside the outline of the main body 52A. At this time, the portion to be covered 71 of the main body 52A is positioned outward of a region in which the cover 47 and the main body 52A overlap each other (in the fifth embodiment, the X axis direction). This is established by Requirement 3 below.

Requirement 3

In the fifth embodiment, as shown in FIG. 30, when the tank unit 4 is viewed in the −Y axis direction, in the state where the cover 47 is at the closed position, the distance K1 along the X axis direction from the side portion 81 of the printing unit 3 of the housing 7A to the hinge unit 55 is at least half the width dimension H1 of the tank unit 4. This requirement is assumed to be Requirement 3.

Note that the state where the tank unit 4 is viewed in the −Y axis direction corresponds to the state where the tank unit 4 is viewed in the axial direction of the rotation axis 58 of the hinge units 55. In addition, when the tank unit 4 is viewed in the axial direction of the rotation axis 58 of the hinge units 55, the X axis direction corresponds to a direction intersecting this axial direction, that is, a first direction from the side portion 81 of the printing unit 3 toward the tank unit 4. Accordingly, in the fifth embodiment, the X axis direction is a direction from the side portion 81 of the printing unit 3 toward the tank unit 4.

According to the above-described configuration, as shown in FIG. 22, it is easy to avoid the cover 47 hitting the side portion 81 of the printing unit 3 when the cover 47 is opened. Therefore, the rotation range of the cover 47 can be widened, and thus it is possible to make it easier to avoid the cover 47 overlapping the injection portion 45 of the tank 10 from above when the cover 47 of the tank unit 4 is rotated in a direction while being open relative to the main body 52A. As a result, it is possible to make it easier to inject ink into the injection portion 45. Note that in the fifth embodiment, the value of the distance K1 is larger than the value of half of the width dimension H1. This makes it possible to further widen the rotatable range when the cover 47 is open relative to the main body 52A.

Accordingly, when the cover 47 is opened to the angle R1 of 180° relative to the main body 52A, in the state where the second housing 52 is seen in the −Z axis direction in a planar view, the cover 47 does not overlap the portion to be covered 71. Therefore, when the cover 47 is opened to the angle R1 of 180° relative to the main body 52A, nothing blocks the portion to be covered 71 in the Z axis direction. As a result, nothing blocks the injection portion 45 of the tank 10 (FIG. 25), and thus it is possible to make it easier to inject ink. The position of the cover 47 relative to the main body 52A in the state where the cover 47 is opened at least at the angle R1 of 180° relative to the main body 52A is written as an open position.

As described above, in the state where the cover 47 is closed relative to the main body 52A in the in-use orientation of the printer 1, the upper face 27 of the cover 47 extends in the horizontal direction. Therefore, when the cover 47 is rotated from the closed position at the angle R1 of 180°, the upper face 27 of the cover 47 extends in the horizontal direction. Therefore, when the cover 47 is rotated from the closed position at the angle R1 of 180°, the position of the cover 47 is likely to stay at the open position.

In addition, in the state where the cover 47 is closed relative to the main body 52A in the in-use orientation of the printer 1, the upper face 27 of the main body 52A and the upper face 27 of the cover 47 extend in the horizontal direction. Therefore, when the cover 47 is rotated from the closed position at the angle R1 of 180°, the upper face 27 of the cover 47 extends in the same horizontal direction as the upper face 27 of the main body 52A. Therefore, when the cover 47 is rotated from the closed position at the angle R1 of 180°, the position of the cover 47 can be restricted in a stable manner.

In addition, in the state where the cover 47 is closed relative to the main body 52A in the in-use orientation of the printer 1, when the second housing 52 is viewed in the −Y axis direction, the side face 28 of the cover 47 extends vertically downward. Therefore, it is possible to make it easier to avoid the cover 47 overlapping the injection portion 45 of the tank 10 from above when the cover 47 is rotated from the closed position at the angle R1 of 180°. As a result, it is possible to make it easier to inject ink into the injection portion 45.

In the fifth embodiment, in the in-use orientation of the printer 1, in the state where the cover 47 is at the open position, when viewed in the −Y axis direction, as shown in FIG. 29, a centroid 82 of the cover 47 is positioned in the −X axis direction relative to the rotation axis 58. According to this configuration, when the cover 47 is rotated from the closed position to the open position, the position of the cover 47 is likely to stay at the open position. Therefore, it is easy to avoid the cover 47 being closed due to an unintended external disturbance. As a result, a worker's hand is unlikely to be caught, and the worker can perform operations safely.

Figure 31:
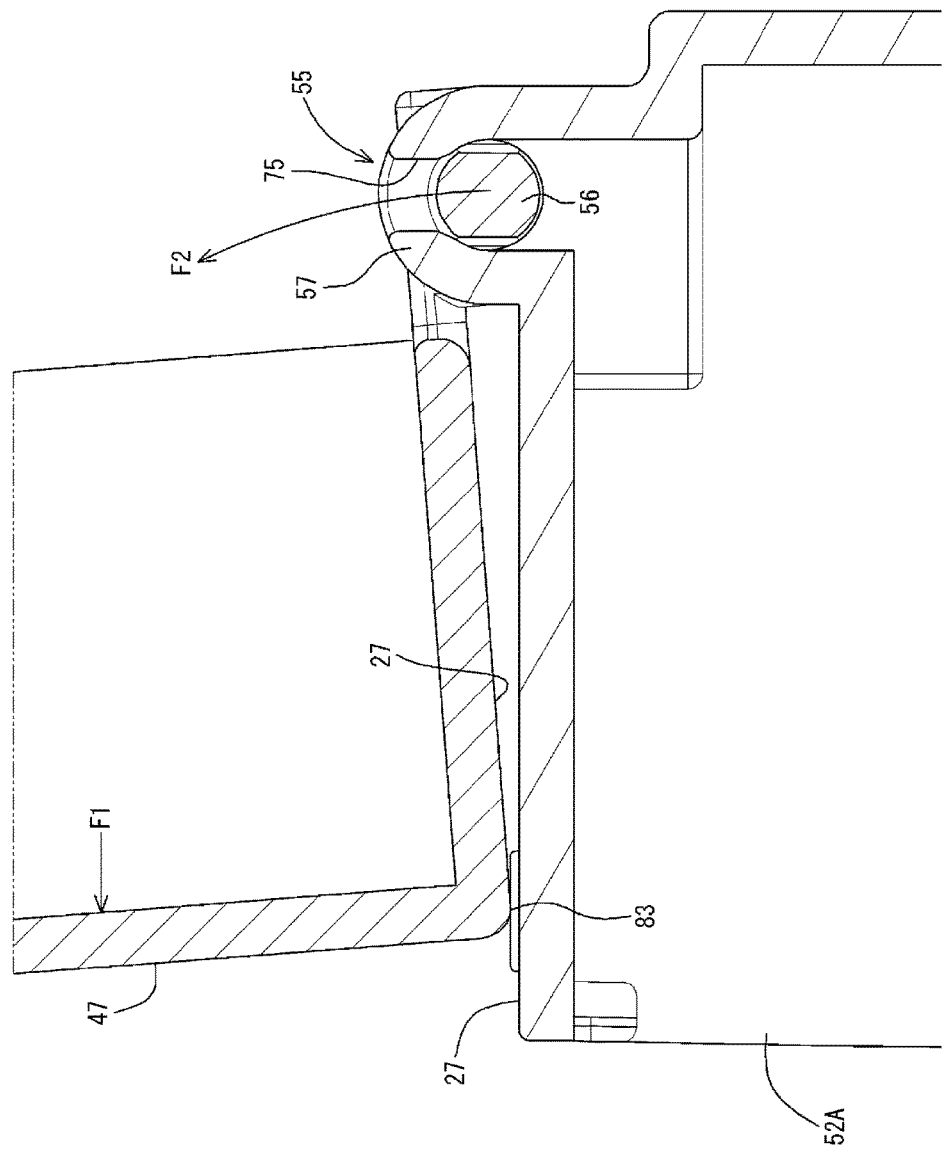
FIG. 31 is an enlarged diagram of a portion B in FIG. 29.

Note that in the fifth embodiment, when the cover 47 is completely open relative to the main body 52A, the angle R1 exceeds 180°. At this time, as shown in FIG. 31, which is an enlarged diagram of a portion B in FIG. 29, the upper face 27 of the cover 47 abuts against the upper face 27 of the main body 52A. This stops an increase in the angle R1 (FIG. 29) when the cover 47 is being opened relative to the main body 52A. Accordingly, the upper face 27 of the cover 47 functions as a contact when the cover 47 is being opened relative to the main body 52A.

Here, for example, in the state where the cover 47 is completely open relative to the main body 52A, if a force F1 is further applied to the cover 47 in a direction in which the angle R1 increases, as shown in FIG. 31, a force F2 is applied to the hinge shaft 56 using a contact portion 83 as a fulcrum. At this time, if the distance between the contact portion 83 and the position at which the force F1 is applied is longer than the distance between the contact portion 83 and the hinge shaft 56, the force F2 applied to the hinge shaft 56 becomes larger than the force F1 due to the principle of leverage. Accordingly, the force F2 acquired by amplifying the force F1 is applied to the hinge shaft 56. Therefore, an unintended large force is likely to be applied to the hinge shaft 56.

For this, in the fifth embodiment, the slit 75 is formed in the bearing 57, and thus when the force F2 applied to the hinge shaft 56 exceeds a predetermined force, the hinge shaft 56 is released from the bearing 57 via the slit 75. Therefore, even if an excessive force is applied to the hinge shaft 56, damage to the cover 47 is easily avoided. Thus, even if an unintended great force F1 is applied to the cover 47, damage to the cover 47 is easily avoided.

Figure 32:
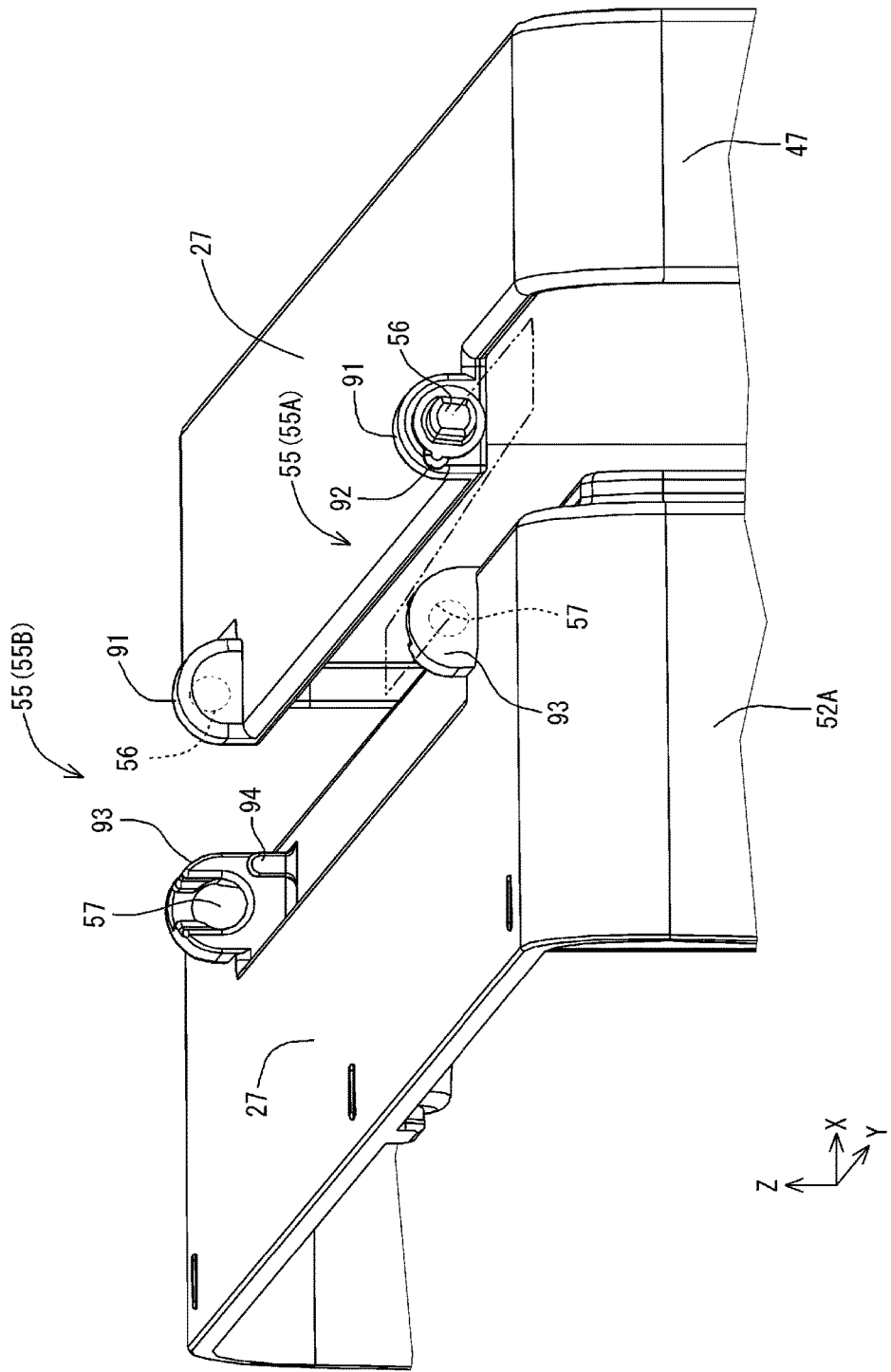
FIG. 32 is an exploded perspective diagram partially showing the housing of the tank unit in Working Example 1.

In addition, in the fifth embodiment, as shown in FIG. 32, in the cover 47, a protrusion 92 is formed in a base portion 91 in which the hinge shaft 56 is formed. Also, in the main body 52A, a protrusion 94 is formed in a base portion 93 in which the bearing 57 is formed. The base portion 91 protrudes in the Z axis direction relative to the upper face 27 of the cover 47. Also, the hinge shaft 56 protrudes from the base portion 91 along the Y axis. In the hinge unit 55A, the hinge shaft 56 is formed in the Y axis direction of the base portion 91, and protrudes from the base portion 91 in the Y axis direction. In the hinge unit 55B, the hinge shaft 56 is formed in the −Y axis direction of the base portion 91, and protrudes from the base portion 91 in the −Y axis direction.

In the hinge unit 55A, the protrusion 92 is formed in the Y axis direction of the base portion 91, and protrudes from the base portion 91 in the Y axis direction. In the hinge unit 55B, the protrusion 92 is formed in the −Y axis direction of the base portion 91, and protrudes from the base portion 91 in the −Y axis direction. When the hinge shaft 56 of the hinge unit 55A is viewed in the −Y axis direction, the protrusion 92 is provided outward of the hinge shaft 56. The same applies to the hinge unit 55B.

The base portion 93 protrudes in the Z axis direction relative to the upper face 27 of the main body 52A. In addition, the bearing 57 has a configuration in which the base portion 93 is carved in a recessed shape. In the hinge unit 55A, the bearing 57 is formed in the −Y axis direction of the base portion 93, and is perforated in the Y axis direction. In the hinge unit 55B, the bearing 57 is formed in the Y axis direction of the base portion 93, and is perforated toward the −Y axis direction. In the hinge unit 55B, the protrusion 94 is formed in the Y axis direction of the base portion 93, and protrudes from the base portion 93 in the Y axis direction. In the hinge unit 55A, the protrusion 94 is formed in the −Y axis direction of the base portion 93, and protrudes from the base portion 93 in the −Y axis direction. When the bearing 57 of the hinge unit 55A is viewed in the Y axis direction, the protrusion 94 is provided outward of the bearing 57. The same applies to the hinge unit 55B.

In the fifth embodiment, in the state where the cover 47 is mounted to the main body 52A, or in other words, in the state where the hinge shaft 56 is mounted to the bearing 57, in a process of opening the cover 47 relative to the main body 52A, the protrusion 92 and the protrusion 94 of the respective hinge units 55 come into contact with each other. When a further force is applied to the cover 47 in the state where the protrusion 92 and the protrusion 94 are in contact with each other, and the cover 47 is further opened relative to the main body 52A, the protrusion 92 climbs over the protrusion 94. At this time, the cover 47 and the main body 52A deform elastically. Thus, when the protrusion 92 climbs over the protrusion 94, a click is felt. Accordingly, the click is felt due to the protrusion 92 climbing over the protrusion 94 before the cover 47 is completely open relative to the main body 52A. Accordingly, for example, it is possible to alert the worker to weaken the force applied to the cover 47 before the cover 47 is completely open relative to the main body 52A.

In addition, when the cover 47 is open relative to the main body 52A, the cover 47 is brought into a state of being locked to the main body 52A by the protrusion 92 climbing over the protrusion 94. This makes it possible to hold the cover 47 at the open position. Therefore, when the cover 47 is rotated from the closed position to the open position, the position of the cover 47 is likely to stay at the open position, and thus it is easy to avoid the cover 47 being closed due to an unintended external disturbance. As a result, a worker's hand is unlikely to be caught, and the worker can perform operations safely. Note that the protrusion 92 and the protrusion 94 are examples of a holding portion that holds the cover 47 at the open position.

In the fifth embodiment, the second housing 52 has a holding portion for holding the cover 47 at the open position, and also has a barycenter requirement that, in the state where the cover 47 is at the open position, the centroid 82 of the cover 47 is positioned in the −X axis direction relative to the rotation axis 58. However, the configuration of the second housing 52 is not limited thereto, and a configuration can also be adopted in which only one of the holding portion and the barycenter requirement is provided. Also in this configuration, it is possible to make it easier to avoid the cover 47 being closed due to an unintended external disturbance. However, a configuration in which the second housing 52 has both the holding portion and the barycenter requirement is preferred from the viewpoint of being able to make it easier to avoid the cover 47 being closed due to an unintended external disturbance.

Figure 33:
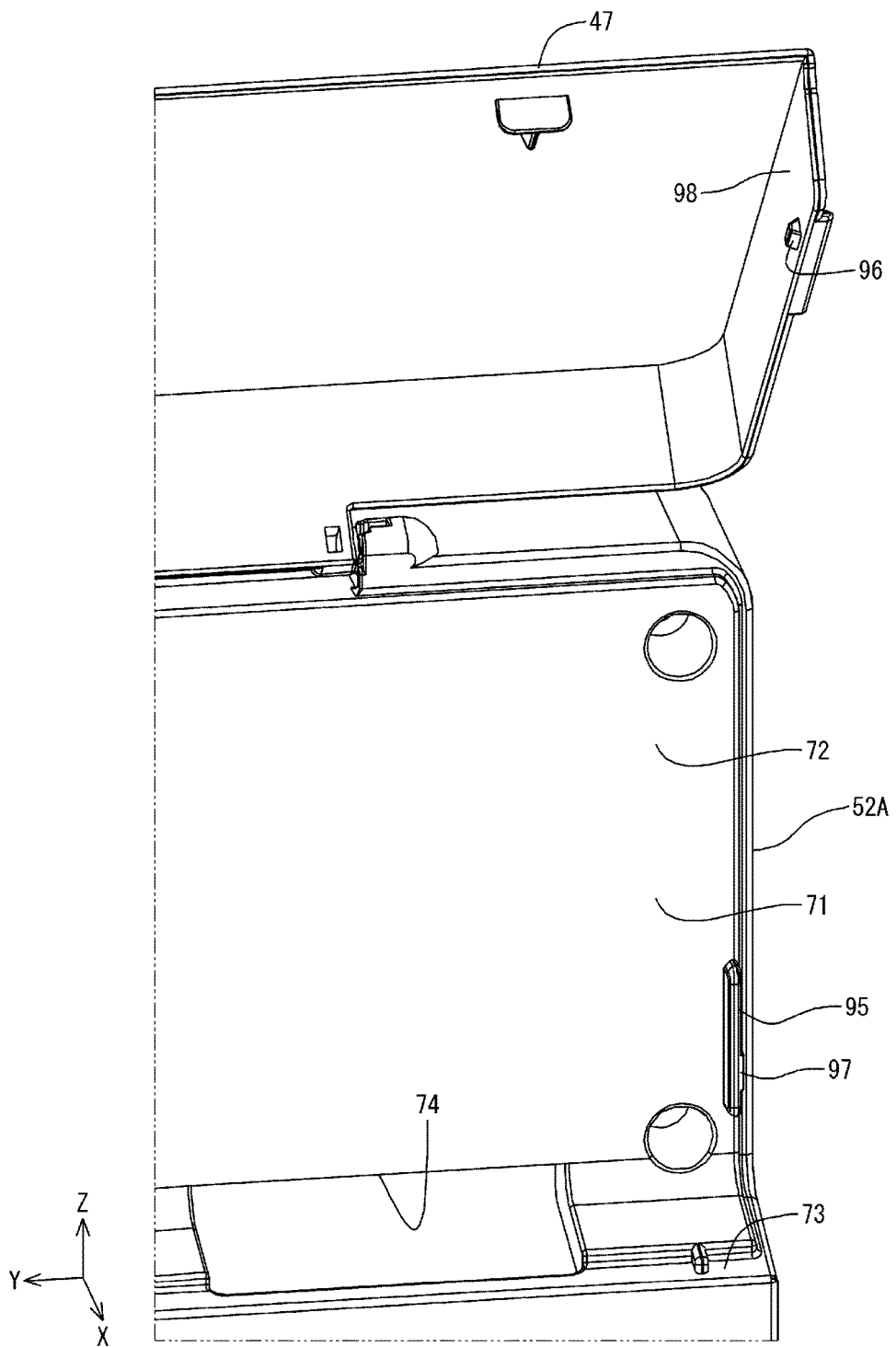
FIG. 33 is an enlarged diagram of a portion C in FIG. 25.

In addition, in the fifth embodiment, as shown in FIG. 33, which is an enlarged diagram of a portion C in FIG. 25, the main body 52A is provided with an engaging portion 95. Also, the cover 47 is provided with an engagement portion 96. In the fifth embodiment, a pair of the engaging portion 95 and the engagement portion 96 are provided at each of two positions symmetrical relative to the XZ plane. The two pairs of the engaging portions 95 and the engagement portions 96 are configured to be symmetrical relative to the XZ plane. Therefore, here, a pair of the engaging portion 95 and the engagement portion 96 positioned in the −Y axis direction out of the two pairs of the engaging portions 95 and the engagement portions 96 will be described as an example, and a detailed description regarding the other pair is omitted.

The engaging portion 95 is formed in the wall 72 in the portion to be covered 71 of the main body 52A. The engaging portion 95 protrudes from the wall 72 in the X axis direction. A protrusion portion 97 is formed in the engaging portion 95. The protrusion portion 97 is provided at the end portion in the X axis direction of the engaging portion 95. When the main body 52A is viewed in the −X axis direction, the protrusion portion 97 protrudes outward of the region of the wall 72. Regarding the pair of the engaging portion 95 and the engagement portion 96 shown in FIG. 33, the protrusion portion 97 protrudes from the engaging portion 95 in the −Y axis direction.

In the pair of the engaging portion 95 and the engagement portion 96 shown in FIG. 33, the engagement portion 96 is provided in a side wall 98 of the cover 47. The engagement portion 96 is formed in a face directed in the Y axis direction of the side wall 98, and protrudes from the side wall 98 in the Y axis direction. In the state where the cover 47 is closed relative to the main body 52A, when the cover 47 and the main body 52A are viewed in the −X axis direction, the engagement portion 96 is provided at a position overlapping the protrusion portion 97 of the engaging portion 95.

Figure 34:
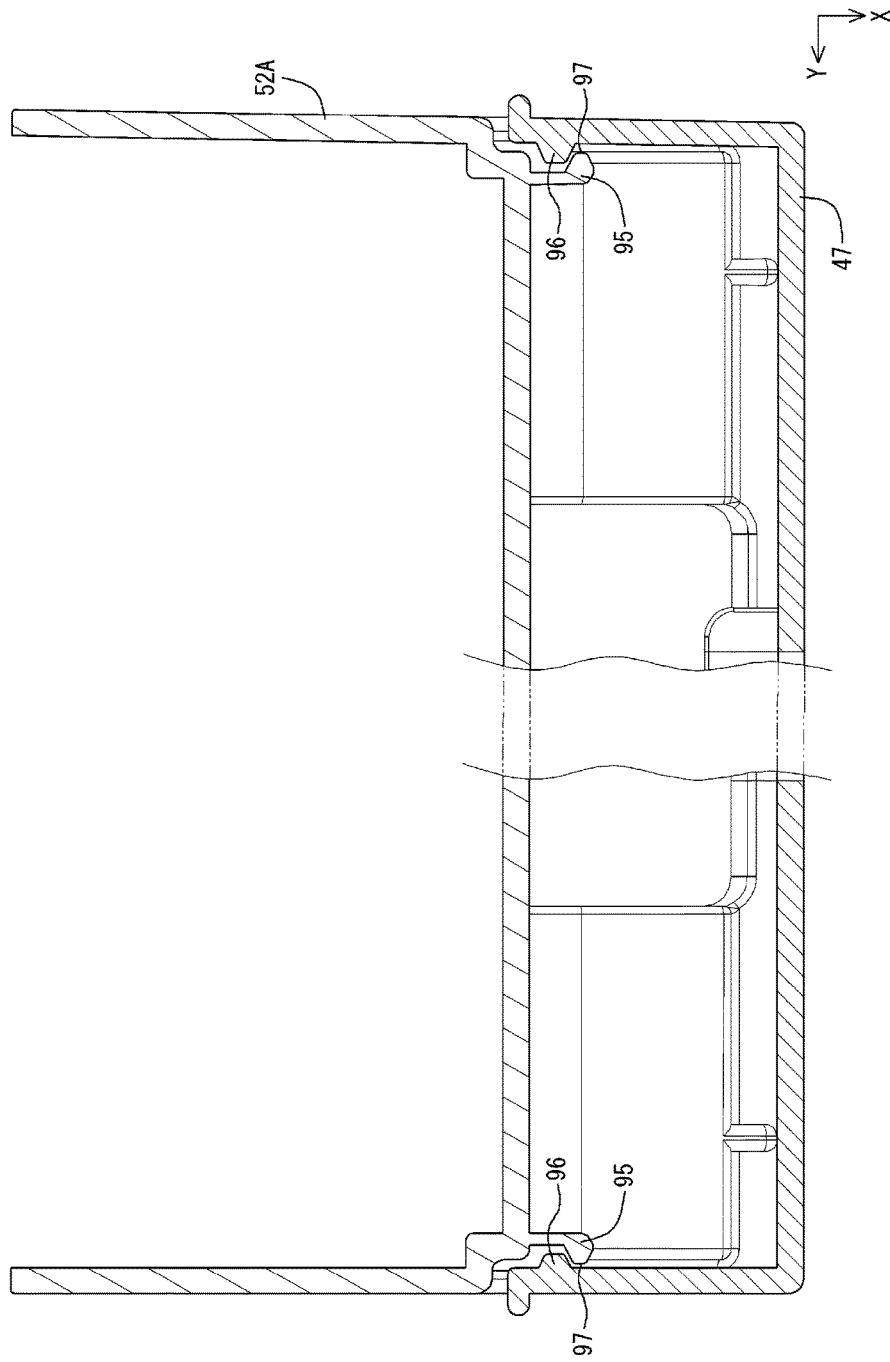
FIG. 34 is a cross-sectional diagram along a line D-D in FIG. 23

As shown in FIG. 34, which is a cross-sectional diagram along a line D-D in FIG. 23, in the state where the cover 47 is closed relative to the main body 52A, the top portion of the engagement portion 96 is positioned in the Y axis direction relative to the top portion of the protrusion portion 97 of the engaging portion 95. Accordingly, in the state where the cover 47 is closed relative to the main body 52A, the engagement portion 96 and the protrusion portion 97 of the engaging portion 95 are engaged. In other words, in the state where the cover 47 is closed relative to the main body 52A, the engagement portion 96 and the protrusion portion 97 of the engaging portion 95 are engaged with each other. This brings the cover 47 into a state of being locked to the main body 52A.

In addition, when the cover 47 is open relative to the main body 52A, the engagement portion 96 climbs over the protrusion portion 97 of the engaging portion 95. At this time, the cover 47 and the main body 52A deform elastically. Thus, when the engagement portion 96 climbs over the protrusion portion 97 of the engaging portion 95, a click is felt. Due to this click, for example, it is possible to recognize through the sense of touch that the locked state of the cover 47 has been released. On the other hand, also when the cover 47 is closed relative to the main body 52A, the engagement portion 96 climbs over the protrusion portion 97 of the engaging portion 95, and thus a click is felt. Due to this, for example, it is possible to confirm through the sense of touch that the cover 47 has been brought into a state of being locked to the main body 52A.

In addition, for example, when the cover 47 is closed relative to the main body 52A, when the cover 47 is closed very strongly, and the like, the strength of the cover 47 can be moderated by the engagement portion 96 being engaged with the protrusion portion 97 of the engaging portion 95. Accordingly, it is possible to reduce the shock when the cover 47 abuts against the main body 52A when the cover 47 is closed. In other words, the engagement portion 96 and the protrusion portion 97 of the engaging portion 95 function as a buffer apparatus between the cover 47 and the main body 52A.

Working Example 2

Figure 35:
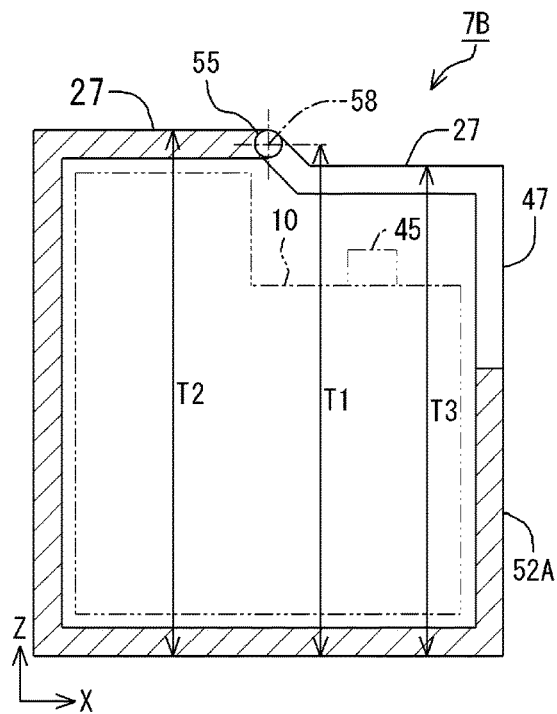
FIG. 35 is a cross-sectional diagram schematically showing a housing of Working Example 2.

A housing 7B of Working Example 2 will be described. In the housing 7B, as shown in FIG. 35, the relationship between the distance T1, the distance T2, and the distance T3 is different from Working Example 1. Except for this, Working Example 2 has a configuration similar to Working Example 1. Therefore, in the following description, the same reference numerals as Working Example 1 are given to the constituent elements similar to those in Working Example 1, and a detailed description thereof is omitted.

In Working Example 2, the distance T1, the distance T2, and the distance T3 has a relationship T2>T1>T3. Accordingly, in Working Example 2, an upper face 27 of a cover 47 is positioned vertically below the upper face 27 of a main body 52A. Therefore, in Working Example 2, the upper face 27 of the cover 47 and the upper face 27 of the main body 52A are not positioned in the same plane. In this regard, Working Example 2 is different from Working Example 1. However, in Working Example 2, due to the relationship T2>T1>T3, the above requirement 1 is satisfied.

In addition, in Working Example 2, due to the relationship T2>T1>T3, the term (T1−T2) in the above Requirement 2 will be a negative (minus) value. On the other hand, the term (T1−T3) in the above Requirement 2 will be a positive (plus) value. Relation (T1−T3)≥(T2−T1) then needs to be satisfied in order to satisfy Requirement 2. Specifically, in Working Example 2, the absolute value of the difference between the distance T1 and the distance T3 being larger than or equal to the absolute value of the difference between the distance T2 and the distance T1 is a requirement. Therefore, in Working Example 2, the distance T1, the distance T2, and the distance T3 have the relation (T1-T3)≥(T2−T1).

Figure 36:
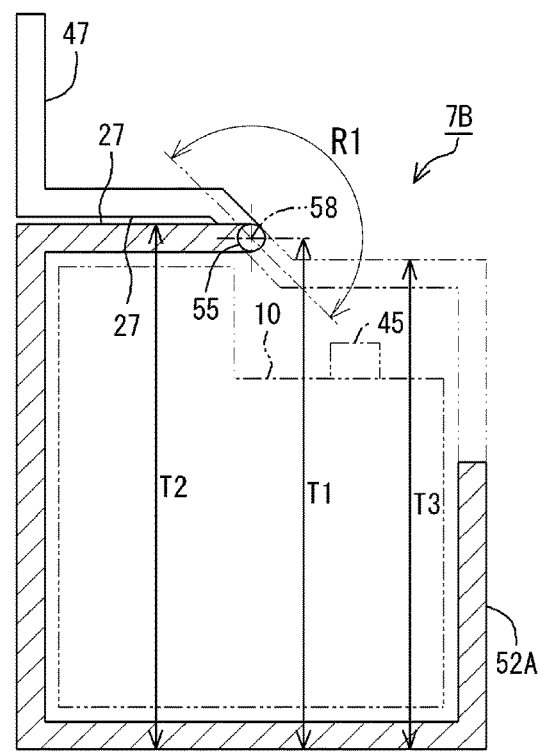
FIG. 36 is a cross-sectional diagram schematically showing the housing of Working Example 2.

Accordingly, also in Working Example 2, an effect similar to that of Working Example 1 is acquired. Specifically, also in Working Example 2, as shown in FIG. 36, the cover 47 can be opened to the angle R1 of 180° or the angle R1 exceeding 180° relative to the main body 52A. Therefore, when the cover 47 of a tank unit 4 is rotated in a direction of being opened relative to the main body 52A, it is possible to make it easier to avoid the cover 47 overlapping an injection portion 45 of a tank 10 from above. As a result, it is possible to easily to inject ink into the injection portion 45.

Working Example 3

Figure 37:
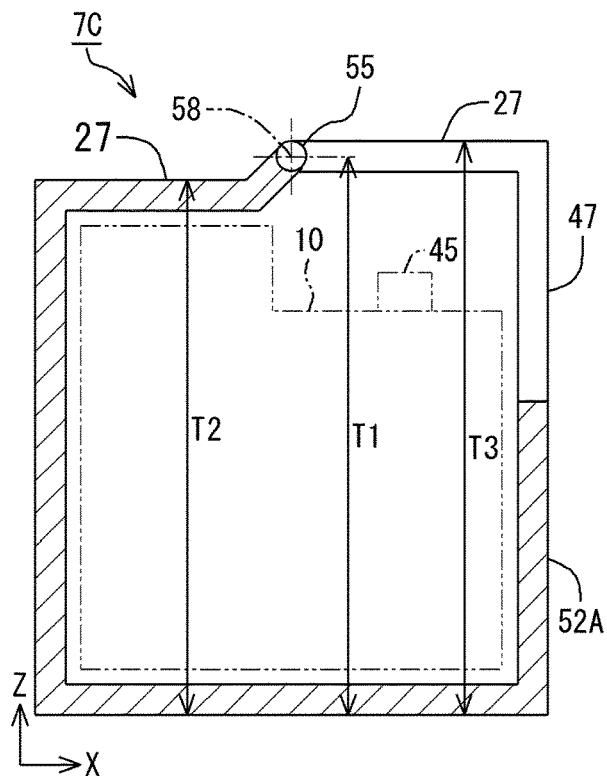
FIG. 37 is a cross-sectional diagram schematically showing a housing of Working Example 3.

A housing 7C of Working Example 3 will be described. As shown in FIG. 37, in the housing 7C, the relationship between the distance T1, the distance T2, and the distance T3 is different from Working Example 1. Except for this, Working Example 3 has a configuration similar to Working Example 1. Therefore, in the following description, the same reference numerals as Working Example 1 are given to constituent elements similar to those in Working Example 1, and detailed description thereof is omitted.

In Working Example 3, the distance T1, the distance T2, and the distance T3 has relationship of T3>T1>T2. Accordingly, in Working Example 3, an upper face 27 of a cover 47 is positioned vertically above the upper face 27 of a main body 52A. Therefore, in Working Example 3, the upper face 27 of the cover 47 and the upper face 27 of the main body 52A are not positioned in the same plane. In this regard, Working Example 3 is different from Working Example 3. However, in Working Example 3, due to the relationship of T3>T1>T2, the above Requirement 1 is satisfied.

In addition, in Working Example 3, due to the relationship T3>T1>T2, the term (T1−T3) in the above Requirement 2 will be a negative (minus) value. On the other hand, the term (T1−T2) in above Requirement 2 will be a positive (plus) value. Relationship (T1−T2)≥(T3-T1) then needs to be satisfied in order to satisfy Requirement 2. Accordingly, in Working Example 3, the absolute value of the difference between the distance T1 and the distance T2 being larger than or equal to the absolute value of the difference between the distance T3 and the distance T1 is a requirement. Therefore, in Working Example 3, the distance T1, the distance T2, and the distance T3 have the relationship (T1-T2)≥(T3-T1).

Figure 38:
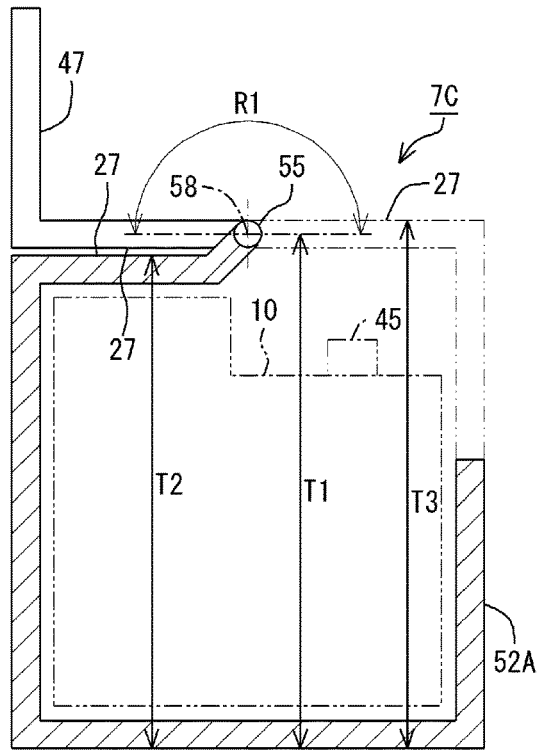
FIG. 38 is a cross-sectional diagram schematically showing the housing of Working Example 3.

Accordingly, also in Working Example 3, similar effects to Working Example 1 are acquired. Specifically, also in Working Example 3, as shown in FIG. 38, the cover 47 can be opened to the angle R1 of 180° or the angle R1 exceeding 180° relative to the main body 52A. Therefore, it is possible to make it easier to avoid the cover 47 overlapping an injection portion 45 of a tank 10 from above when the cover 47 of a tank unit 4 is rotated in a direction of being opened relative to the main body 52A. As a result, it is possible to make it easier to inject ink into the injection portion 45.

Working Example 4

Figure 39:
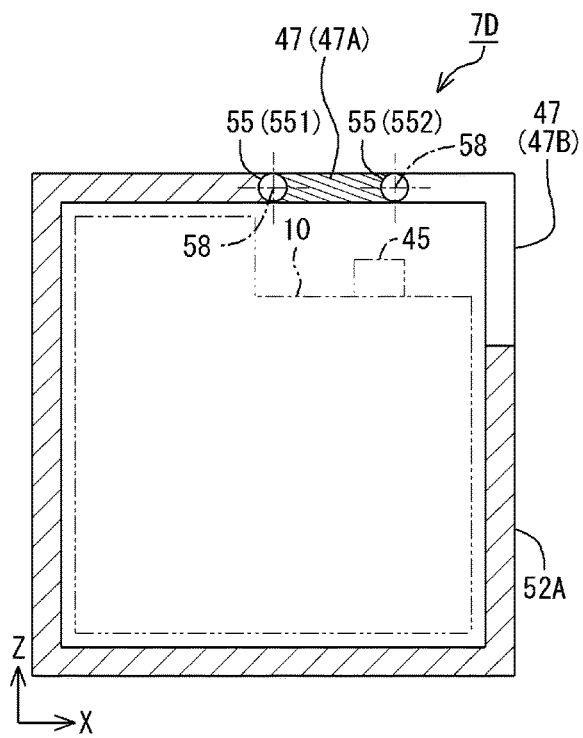
FIG. 39 is a cross-sectional diagram schematically showing a housing of Working Example 4.

A housing 7D of Working Example 4 will be described. As shown in FIG. 39, the housing 7D has, in the X axis direction of a hinge unit 55, another hinge unit 55 in the state where a cover 47 is at the closed position in the in-use orientation. Except for this, Working Example 4 has a configuration similar to Working Example 1. Therefore, in the following description, the same reference signals as Working Example 1 are given to constituent elements similar to those in Working Example 1, and detailed description thereof is omitted. In addition, hereinafter, the hinge unit 55 positioned in the −X axis direction out of the two hinge units 55 is written as a first hinge unit 551. Also, the new hinge unit 55 positioned in the X axis direction out of the two hinge units 55 is written as a second hinge unit 552. The second hinge unit 552 has a configuration similar to the hinge unit 55. Therefore, in the second hinge unit 552, the same reference numerals as the hinge unit 55 are given to constituent elements similar to those of the hinge unit 55, and a detailed description thereof is omitted.

Figure 40:
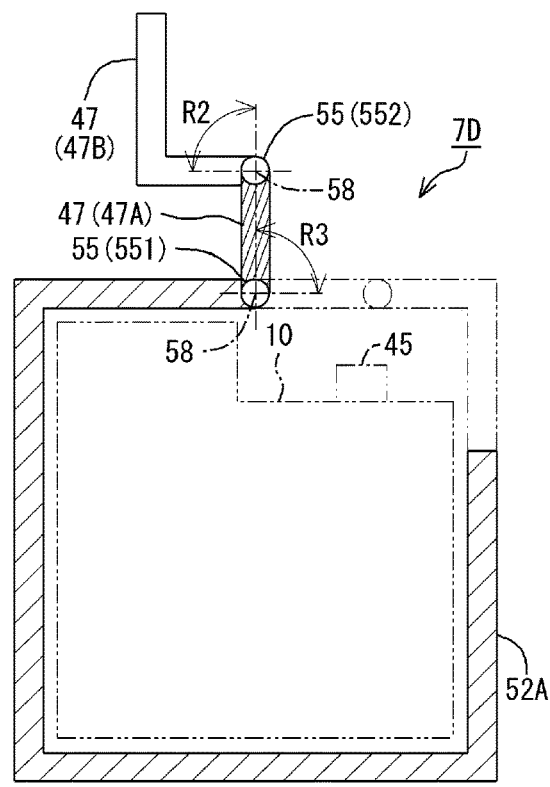
FIG. 40 is a cross-sectional diagram schematically showing the housing of Working Example 4.

In the housing 7D, the cover 47 is divided into a cover 47A and a cover 47B. The cover 47A and the cover 47B are rotatably coupled via the second hinge unit 552. The cover 47A is positioned in the −X axis direction of the second hinge unit 552. The cover 47A is rotatably coupled to the main body 52A via the first hinge unit 551. With this configuration, as shown in FIG. 40, the cover 47B is configured to be rotatable relative to the cover 47A, and the cover 47A is configured to be rotatable relative to the main body 52A.

In the housing 7D, the cover 47B can be opened to the angle R2 of 90° or the angle R2 exceeding 90° relative to the cover 47A. In addition, the cover 47A can be opened to an angle R3 of 90° or an angle R3 exceeding 90° relative to the main body 52A. Thus, the cover 47 can be opened to the angle of 180° or an angle exceeding 180° relative to the main body 52A. Accordingly, also in Working Example 4, effects similar to Working Example 1 are acquired. Note that in Working Example 4, a configuration can also be adopted in which the cover 47B can be opened to the angle of 180° or an angle exceeding 180° relative to the cover 47A. In addition, a configuration can also be adopted in which the cover 47A can be opened to the angle of 180° or an angle exceeding 180° relative to the main body 52A.

Working Example 5

Figure 41:
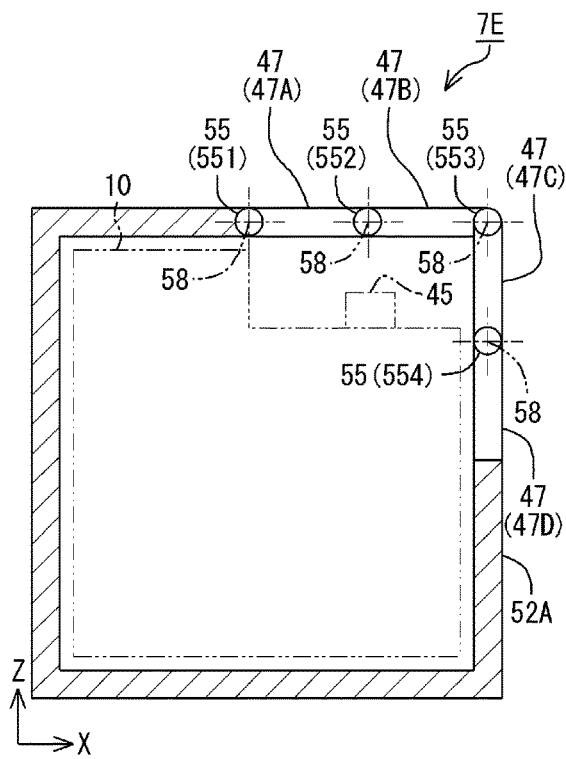
FIG. 41 is a cross-sectional diagram schematically showing a housing of Working Example 5.

In Working Example 4, the number of hinge units 55 is not limited to two. More than two hinge units 55 can also be adopted. An example in which three or more hinge units 55 are included will be described as Working Example 5. As shown in FIG. 41, a housing 7E of Working Example 5 has a third hinge unit 553 and a fourth hinge unit 554 in addition to a first hinge unit 551 and a second hinge unit 552. Except for this, Working Example 5 has a configuration similar to Working Example 1. Therefore, in the following description, the same reference numerals as Working Example 1 are given to constituent elements similar to those in Working Example 1, and detailed description thereof is omitted. The third hinge unit 553 and the fourth hinge unit 554 each have a configuration similar to the hinge unit 55. Therefore, in the third hinge unit 553 and the fourth hinge unit 554, the same reference numerals as the hinge unit 55 are given to constituent elements similar to those of the hinge unit 55, and detailed description thereof is omitted.

The third hinge unit 553 is positioned in the X axis direction relative to the second hinge unit 552. The fourth hinge unit 554 is positioned on the opposite side to the second hinge unit 552 side relative to the third hinge unit 553. In addition, in the housing 7E, a cover 47 is divided into a cover 47A, a cover 47B, a cover 47C, and a cover 47D. The cover 47A is positioned in the X axis direction of the first hinge unit 551. The cover 47A is rotatably coupled to a main body 52A via the first hinge unit 551. The cover 47B is positioned in the X axis direction of the second hinge unit 552. The cover 47B is rotatably coupled to the cover 47A via the second hinge unit 552.

The cover 47C is positioned on the opposite side to the cover 47B side of the third hinge unit 553. The cover 47C is rotatably coupled to the cover 47B via the third hinge unit 553. The cover 47D is positioned on the opposite side to the cover 47C side of the fourth hinge unit 554. The cover 47D is rotatably coupled to the cover 47C via the fourth hinge unit 554.

Figure 42:
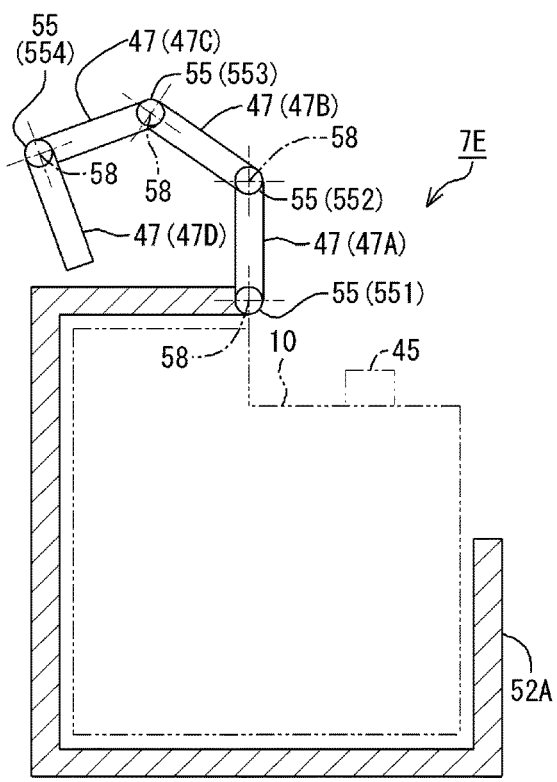
FIG. 42 is a cross-sectional diagram schematically showing the housing of Working Example 5.

In the housing 7E, as shown in FIG. 42, the cover 47D can be opened to the angle of 90° or an angle exceeding 90° relative to the cover 47C. In addition, the cover 47C can be opened to the angle of 90° or an angle exceeding 90° relative to the cover 47B. In addition, the cover 47B can be opened to the angle of 90° or an angle exceeding 90° relative to the cover 47A. In addition, the cover 47A can be opened to the angle of 90° or an angle exceeding 90° relative to the main body 52A. Thus, the cover 47 can be opened to the angle of 180° or an angle exceeding 180° relative to the main body 52A. Accordingly, also in Working Example 5, effects similar to those in Working Example 1 are acquired.

Note that in Working Example 5, a configuration can also be adopted in which the cover 47D can be opened to the angle of 180° or an angle exceeding 180° relative to the cover 47C. In addition, a configuration can also be adopted in which the cover 47C can be opened to the angle of 180° or an angle exceeding 180° relative to the cover 47B. In addition, a configuration can also be adopted in which the cover 47B can be opened to the angle of 180° or an angle exceeding 180° relative to the cover 47A. In addition, a configuration can also be adopted in which the cover 47A can be opened to the angle of 180° or an angle exceeding 180° relative to the main body 52A.

Figure 43:
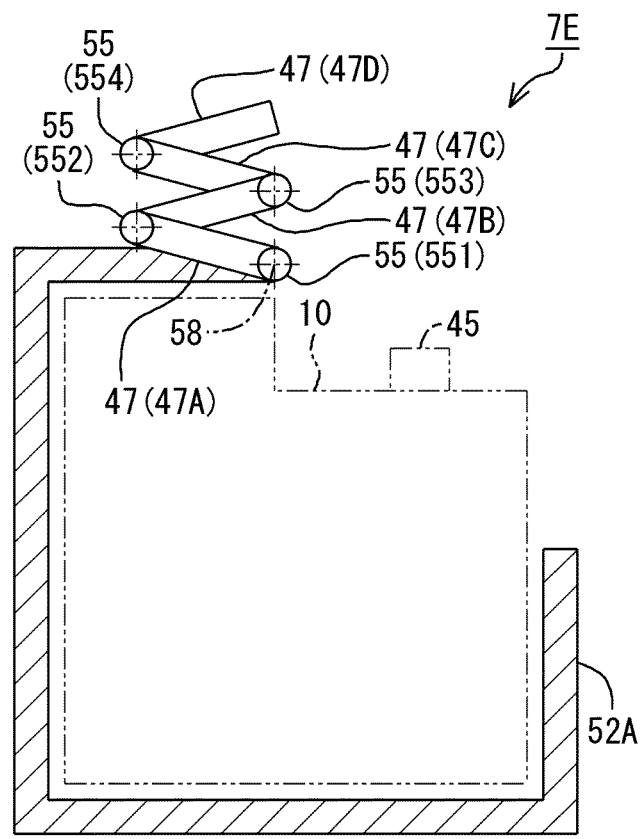
FIG. 43 is a cross-sectional diagram schematically showing the housing of Working Example 5.

Furthermore, in Working Example 5, the cover 47 can be configured to be foldable in an accordion shape as shown in FIG. 43. According to this configuration, a space occupied by the cover 47 when the cover 47 is open relative to the main body 52A can be reduced. Note that in Working Example 5, the number of hinge units 55 is not limited to four. Three or more than four hinge units 55 can also be adopted. Note that folding in an accordion shape refers to folding by rotating the cover 47A in the counterclockwise direction using the first hinge unit 551 as a rotation center, and rotating the cover 47B in the clockwise direction, with the second hinge unit 552 serving as a rotation center, for example, as shown in FIG. 43. Using another expression, this can be expressed as folding a plurality of covers 47 aligned continuously with the hinge units 55 therebetween such that rotation directions alternate for every other cover 47.

In the above embodiments and working examples, the liquid ejection device may be a liquid ejection device that consumes a liquid other than ink by ejecting, discharging, or applying the liquid. Note that the states of liquid discharged as very small droplets from the liquid ejection device includes a granular shape, a tear-drop shape, and a shape having a thread-like trailing end. Furthermore, the liquid mentioned here may be any kind of material that can be consumed by the liquid ejection device. For example, the liquid need only be a material whose substance is in the liquid phase, and includes fluids such as an inorganic solvent, an organic solvent, a solution, a liquid resin, and a liquid metal (metal melt) in the form of a liquid body having a high or low viscosity, a sol, gel water, or the like. Furthermore, the liquid is not limited to being a one-state substance, and also includes particles of a functional material made from solid matter, such as pigment or metal particles, that are dissolved, dispersed, or mixed in a solvent. Representative examples of the liquid include ink such as that described in the above embodiments, liquid crystal, or the like. Here, "ink" encompasses general water-based ink and oil-based ink, as well as various types of liquid compositions such as gel ink and hot melt-ink. Specific examples of the liquid ejection device include a liquid ejection device that ejects liquid including a material, such as an electrode material or a color material that is used for manufacturing a liquid crystal display, an EL (electro-luminescence) display, a surface emission display, or a color filter, for example, in the form of being dispersed or dissolved. The liquid ejection device may also be a liquid ejection device that ejects biological organic matter used in manufacturing of a biochip, a liquid ejection device that is used as a precision pipette and ejects a liquid serving as a sample, a textile printing apparatus, a microdispenser, or the like. Furthermore, the liquid ejection device may be a liquid ejection device that ejects lubricating oil in a pinpoint manner to a precision machine such as a watch or a camera, or a liquid ejection device that ejects, onto a substrate, transparent resin liquid such as UV-cured resin for forming, for example, a micro-hemispherical lens (optical lens) that is used in an optical communication element or the like. The liquid ejection device may also be a liquid ejection device that ejects acid or alkaline etchant, for example, for etching substrates or the like.

Note that the invention is not limited to the above embodiments and working examples, and can be achieved as various configurations without departing from the gist of the invention. For example, the technical features in the embodiments and working examples that correspond to the technical features in the modes described in the summary of the invention may be replaced or combined as appropriate in order to solve a part of, or the entire foregoing problem, or to achieve some or all of the above-described effects. The technical features that are not described as essential in the specification may be deleted as appropriate.

REFERENCE SIGNS LIST 1001, 1010, 1100, 1110 . . . Printer
1002 . . . Housing
1003 . . . Operation panel
1005 . . . Tank unit
1006 . . . Tank
1007 . . . Power supply button
1008 . . . Display panel
1011 . . . Paper discharge unit
1013 . . . Front face
1015 . . . Upper face
1017 . . . Side wall
1019 . . . Side wall
1021 . . . Window portion
1023 . . . Cover
1031 . . . Recording head
1032 . . . Control unit
1033 . . . Liquid injection port,
1034 . . . Outer shape face
1035 . . . Liquid injection portion
1036 . . . End face
1037 . . . Ink supply tube
1041 . . . Visual checking face
1042 . . . Upper limit mark
1043 . . . Lower limit mark
1047 . . . Bottle
1051 . . . Indicator
1052 . . . Line of sight
1061 . . . Cover
1062 . . . Cover
1063 . . . Paper feeding unit
1065 . . . Scanner unit
1071 . . . First tank unit
1072 . . . Second tank unit
1073 . . . Cover
1076 . . . Tank unit
1077 . . . Step portion
1078 . . . Cover
1079 . . . Cover
1081 . . . End face
P1 . . . Recording medium
1 . . . Printer
3 . . . Printing unit
4 . . . Tank unit
5 . . . Scanner unit
6 . . . Housing
7, 7A, 7B, 7C, 7D, 7E . . . Housing
10 . . . Tank
21 . . . Paper discharge unit
22 . . . Front face
23 . . . Upper face
25 . . . Window portion
26 . . . Front face
27 . . . Upper face
28 . . . Side face
31 . . . Document cover
32 . . . Document placing face
41 . . . Mechanism unit
42 . . . Printing portion
43 . . . Ink supply tube
45 . . . Injection portion
46 . . . Visual checking face
47, 47A, 47B, 47C, 47D . . . Cover
48 . . . Upper limit mark
49 . . . Lower limit mark
51 . . . First housing
52 . . . Second housing
52A . . . Main body
55, 55A, 55B . . . Hinge unit
56 . . . Hinge shaft
57 . . . Bearing
58 . . . Rotation axis
61 . . . Handle portion
63 . . . Back face
64 . . . Back face
67 . . . Supply port
68 . . . Lid
71 . . . Portion to be covered
72 . . . Wall
73 . . . Wall
74 . . . Opening portion
75 . . . Slit
77 . . . Mounting face
81 . . . Side portion
82 . . . Centroid
83 . . . Contact portion
91 . . . Base portion
92 . . . Protrusion
93 . . . Base portion
94 . . . Protrusion
95 . . . Engaging portion
96 . . . Engagement portion
97 . . . Protrusion portion
98 . . . Side wall
551 . . . First hinge unit
552 . . . Second hinge unit
553 . . . Third hinge unit
554 . . . Fourth hinge unit
P . . . Printing medium

The invention claimed is:

1. A tank unit that can be arranged along with and to a side of a printing unit of a printer including the printing unit provided with a printing head capable of ejecting ink, and a scanner unit that includes a document placing face positioned above the printing unit, and that can read out an image drawn on a document placed on the document placing face, the tank unit comprising:
 a tank that can store the ink to be supplied to the printing head; and
 a housing that covers the tank,
 wherein the tank has an injection portion that enables the ink to be injected,
 the housing includes:
  a main body that covers a portion of the tank excluding the injection portion,
  a cover that openably/closably rotates relative to the main body, and in a state of being closed relative to the main body, covers the injection portion, and
  a hinge unit that rotatably couples the main body and the cover, and
 when an orientation when the printer is used is assumed to be an in-use orientation of the printer, a rotation axis of the hinge unit is positioned at substantially the same height as the document placing face or higher than the document placing face in the in-use orientation.

2. The tank unit according to claim 1,
 wherein a handle portion is provided in a portion of the cover facing in the same direction as a direction in which a front face of the printing unit is directed.

3. The tank unit according to claim 1,
 wherein when the tank unit is viewed from a direction along a rotation axis of the hinge unit, assuming a direction from the side of the printing unit toward the tank unit to be a first direction, in a state where the cover is closed relative to the main body, a distance along the first direction from an end portion on the printing unit side of the housing to the hinge unit is at least half a width dimension along the first direction of the tank unit.

4. A tank unit that can be arranged along with and to a side of a printing unit provided with a printing head capable of ejecting ink, the tank unit including:
 a tank that can store the ink to be supplied to the printing head; and
 a housing that covers the tank,
 wherein the tank has an injection portion that enables the ink to be injected,
 the housing includes:
  a main body that covers a portion of the tank excluding the injection portion,
  a cover that openably/closably rotates relative to the main body, and in a state of being closed relative to the main body, covers the liquid injection portion, and
  a hinge unit that rotatably couples the main body and the cover, and
 when the tank unit is viewed from a direction along a rotation axis of the hinge unit, assuming a direction from the side of the printing unit toward the tank unit to be a first direction, in a state where the cover is closed relative to the main body, a distance along the first direction from an end portion on the printing unit side of the housing to the hinge unit is at least half a width dimension along the first direction of the tank unit.

5. The tank unit according to claim 4,
 wherein a handle portion is provided in a portion of the cover facing in the same direction as a direction in which a front face of the printing unit is directed.

6. A tank unit that can be arranged along with and to a side of a printing unit of a printer that includes the printing unit provided with a printing head capable of ejecting ink, the tank unit comprising:
 a tank that can store the ink to be supplied to the printing head; and
 a housing that covers the tank,
 wherein the tank has an injection portion that enables the ink to be injected,
 the housing includes:
  a main body that covers a portion of the tank excluding the injection portion,
  a cover that openably/closably rotates relative to the main body, and in a state of being closed relative to the main body, covers the injection portion, and
  a hinge unit that rotatably couples the main body and the cover,
 the cover is configured to be rotatable between a closed position at which the injection portion is covered and an open position at which the injection portion is exposed,
 when the tank unit is viewed in an axial direction of a rotation axis of the hinge unit, when a direction intersecting the axial direction that is a direction from the side of the printing unit toward the tank unit is assumed to be a first direction, in a state where the cover is at the closed position, a distance along the first direction from an end portion on the printing unit side of the housing to the hinge unit is at least half a width dimension along the first direction of the tank unit, and
 the cover has a wall portion that is displaced to a position at which the cover rotated to an angle of 180° or an angle exceeding 180° using the rotation axis as a rotation center when the cover is changed from the closed position to the open position.

7. The tank unit according to claim 6,
 wherein the wall portion has a first outer wall face extending in the first direction in the state where the cover is at the closed position, when viewed in the axis direction.

8. The tank unit according to claim 7,
 wherein when an orientation when the printer is used is assumed to be an in-use orientation of the printer, in the in-use orientation,
 in the state where the cover is at the closed position, the first outer wall face extends in a horizontal direction.

9. The tank unit according to claim 7,
 wherein the main body has a second outer wall face extending in the first direction when viewed in the axis direction.

10. The tank unit according to claim 7,
 wherein when an orientation when the printer is used is assumed to be an in-use orientation of the printer, in the in-use orientation,
 the cover further has a third outer face that intersects the first outer wall face and extends in a vertical downward direction in the state where the cover is at the closed position, when viewed in the axis direction.

11. The tank unit according to claim 6,
 wherein when the orientation when the printer is used is assumed to be the in-use orientation of the printer, in the in-use orientation,
 in a state where the cover is at the open position, when viewed in the axis direction, a centroid of the cover is positioned in an opposite direction to the first direction relative to the rotation axis.

12. The tank unit according to claim 6, wherein the tank unit includes a holding portion for holding the cover at the open position.

13. The tank unit according to claim 6, wherein the tank unit includes a second hinge unit positioned in the first direction of the hinge unit in a state where the cover is at the closed position in the in-use orientation.

14. The tank unit according to claim 6, wherein the cover is configured to be foldable into an accordion shape.

15. The tank unit according to claim 6, wherein when viewed in the axis direction, at least a portion of the injection portion is positioned in the first direction relative to the rotation axis.

* * * * *